United States Patent [19]
Shibayama

[11] Patent Number: 5,920,435
[45] Date of Patent: Jul. 6, 1999

[54] ZOOM LENS

[75] Inventor: Atsushi Shibayama, Tokyo, Japan

[73] Assignee: Nikon Corporation, Tokyo, Japan

[21] Appl. No.: 08/899,640

[22] Filed: Jul. 24, 1997

Related U.S. Application Data

[62] Division of application No. 08/756,770, Nov. 26, 1996, Pat. No. 5,717,527.

[30] Foreign Application Priority Data

| Nov. 28, 1995 | [JP] | Japan | 7-350703 |
| Jun. 14, 1996 | [JP] | Japan | 8-175920 |
| Jun. 14, 1996 | [JP] | Japan | 8-175923 |

[51] Int. Cl.$^6$ ................................................. G02B 15/14
[52] U.S. Cl. ........................ 359/686; 359/683; 359/676
[58] Field of Search ................................ 359/686, 683, 359/676

[56] References Cited

U.S. PATENT DOCUMENTS

| 4,759,617 | 7/1988 | Tokumaru et al. | 359/686 |
| 5,132,848 | 7/1992 | Nishio et al. | 359/686 |
| 5,276,553 | 1/1994 | Tatsuno | 359/686 |

Primary Examiner—Georgia Epps
Assistant Examiner—Jordon M. Schwartz
Attorney, Agent, or Firm—Shapiro and Shapiro

[57] ABSTRACT

A zoom lens comprises, in order from an object side, a first lens group G1 having a negative refracting power, a second lens group G2 having a positive refracting power, a third lens group G3 having a negative refracting power, and a fourth lens group G4 having a positive refracting power. A focal length of the zoom lens is changed from a wide angle end to a telephoto end by changing an air gap between the first lens group G1 and the second lens group G2, increasing an air gap between the second lens group G2 and the third lens group G3, and reducing an air gap between the third lens group G3 and the fourth lens group G4. When a focal length of the first lens group G1 is f1, a focal length of the total lens system at the wide angle end is fw, and an axial air gap between the first lens group G1 and the second lens group G2 in an infinity in-focus state at the wide angle end is D12W, the zoom lens satisfies following conditions: $0.8 < |f1|/fw < 1.6$, and $D12W/fw < 0.1$. A preferred zoom lens can be constructed to allow focusing continuously from infinity to an object distance which is about double the focal length at the telephoto end in the infinity in-focus state at any focal length from the wide angle end to the telephoto end, by moving said first lens group G1.

14 Claims, 56 Drawing Sheets

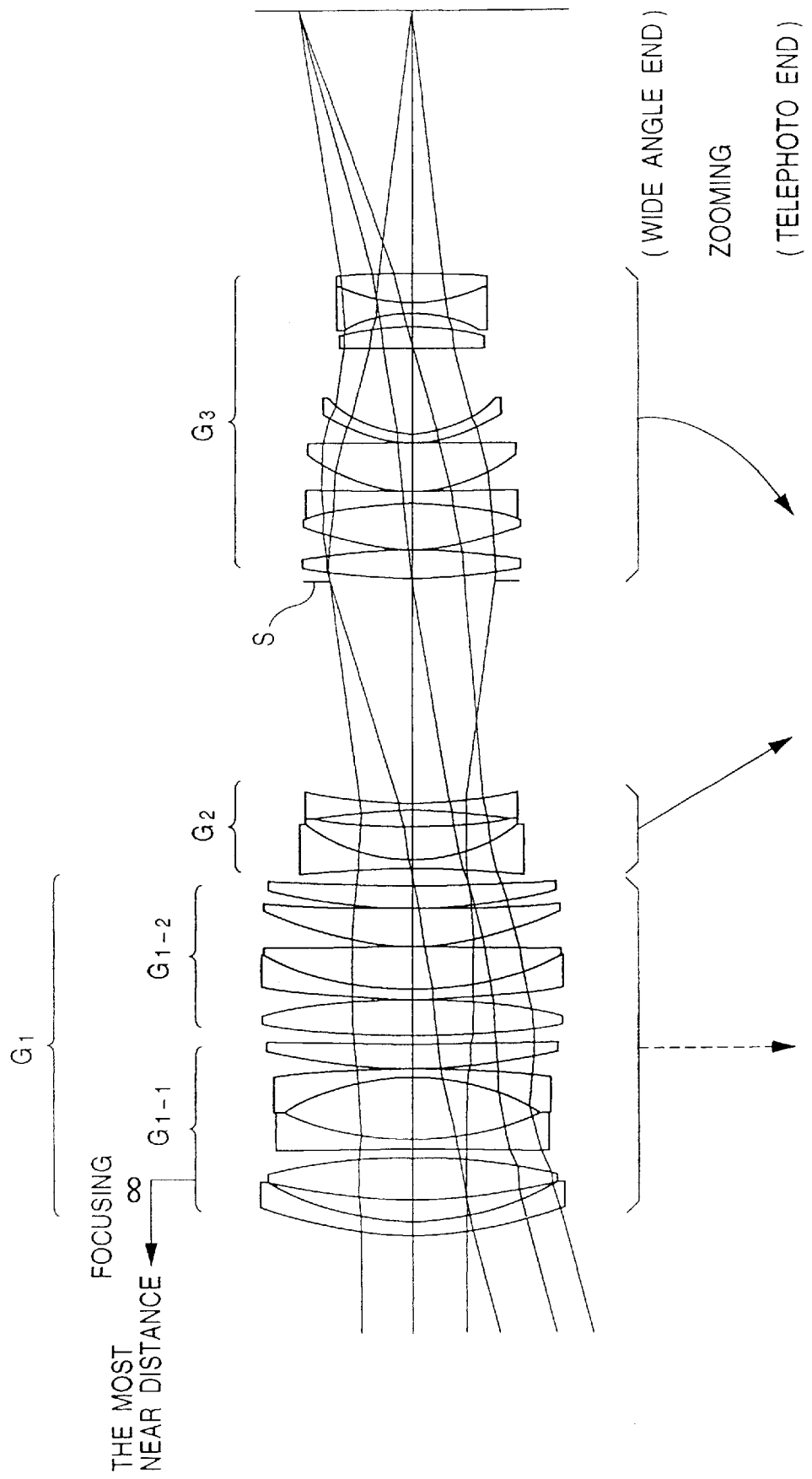

FIG. 3A
SPHERICAL
ABERRATION
F$_{NO}$ = 4.00
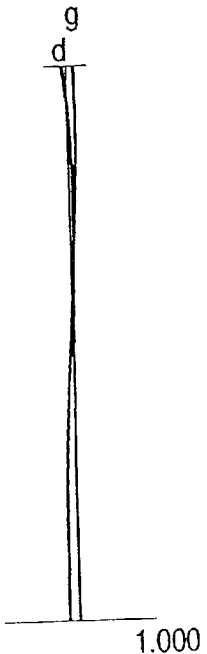
1.000
FIG. 3B
ASTIGMATISM
Y = 21.60
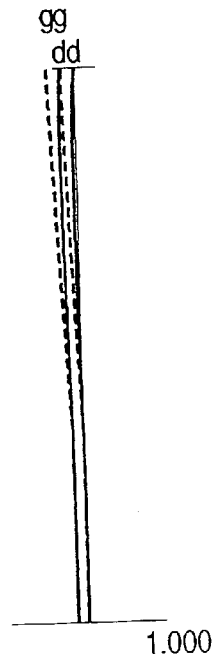
1.000
FIG. 3C
DISTORTION
Y = 21.60
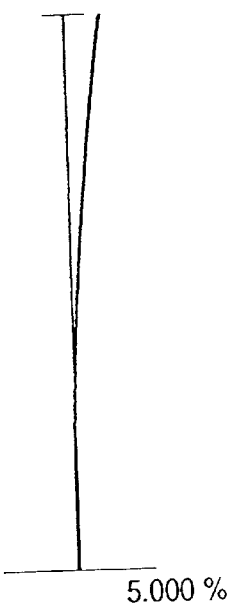
5.000 %
FIG. 3D
LATERAL CHROMATIC ABERRATION

SPHERICAL
ABERRATION
F_NO = 4.00

1.000

ASTIGMATISM
Y = 21.60

1.000

DISTORTION
Y = 21.60

5.000 %

LATERAL CHROMATIC ABERRATION

SPHERICAL
ABERRATION
$F_{NO} = 4.00$ 1.000

ASTIGMATISM
Y = 21.60

1.000

DISTORTION
Y = 21.60

5.000 %

LATERAL CHROMATIC ABERRATION

SPHERICAL
ABERRATION
NA = 0.12

1.000

ASTIGMATISM
Y = 21.60

1.000

DISTORTION
Y = 21.60

5.000 %

LATERAL CHROMATIC ABERRATION

SPHERICAL
ABERRATION
NA = 0.12

1.000

ASTIGMATISM
Y = 21.60

1.000

DISTORTION
Y = 21.60

5.000 %

LATERAL CHROMATIC ABERRATION

SPHERICAL
ABERRATION
NA = 0.12

1.000

ASTIGMATISM
Y = 21.60

1.000

DISTORTION
Y = 21.60

5.000 %

−0.100

LATERAL CHROMATIC ABERRATION

SPHERICAL
ABERRATION
$F_{NO} = 4.42$ 1.000

ASTIGMATISM
Y = 21.60

1.000

DISTORTION
Y = 21.60

5.000 %

LATERAL CHROMATIC ABERRATION

SPHERICAL ABERRATION
F_NO = 4.87

1.000

ASTIGMATISM
Y = 21.60

1.000

DISTORTION
Y = 21.60

5.000 %

LATERAL CHROMATIC ABERRATION

SPHERICAL
ABERRATION
$F_{NO} = 5.75$ 1.000

ASTIGMATISM
Y = 21.60

1.000

DISTORTION
Y = 21.60

5.000 %

LATERAL CHROMATIC ABERRATION

SPHERICAL ABERRATION
NA = 0.11

1.000

ASTIGMATISM
Y = 21.60

1.000

DISTORTION
Y = 21.60

5.000 %

LATERAL CHROMATIC ABERRATION

SPHERICAL
ABERRATION
NA = 0.10

1.000

ASTIGMATISM
Y = 21.60

1.000

DISTORTION
Y = 21.60

5.000 %

LATERAL CHROMATIC ABERRATION

SPHERICAL
ABERRATION
NA = 0.09

1.000

ASTIGMATISM
Y = 21.60

1.000

DISTORTION
Y = 21.60

5.000 %

LATERAL CHROMATIC ABERRATION

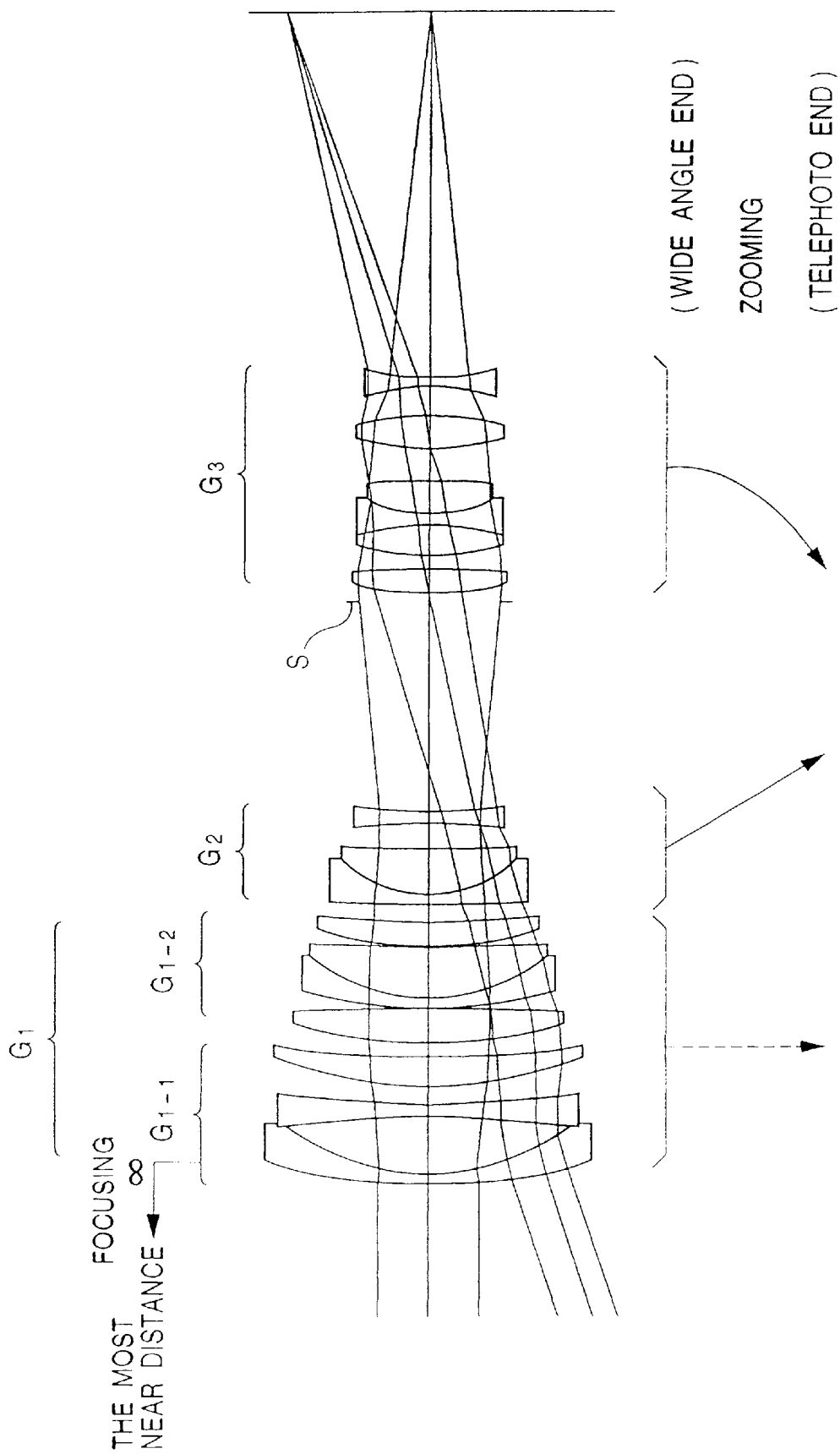

SPHERICAL
ABERRATION
F$_{NO}$ = 4.63

1.000

ASTIGMATISM
Y = 21.60

1.000

DISTORTION
Y = 21.60

5.000 %

LATERAL CHROMATIC ABERRATION

SPHERICAL
ABERRATION
F_NO = 4.91

1.000

ASTIGMATISM
Y = 21.60

1.000

DISTORTION
Y = 21.60

5.000 %

LATERAL CHROMATIC ABERRATION

SPHERICAL
ABERRATION
F_NO = 5.48

1.000

ASTIGMATISM
Y = 21.60

1.000

DISTORTION
Y = 21.60

5.000 %

LATERAL CHROMATIC ABERRATION

SPHERICAL ABERRATION
NA = 0.11

1.000

ASTIGMATISM
Y = 21.60

1.000

DISTORTION
Y = 21.60

5.000 %

LATERAL CHROMATIC ABERRATION

SPHERICAL
ABERRATION
NA = 0.10

1.000

ASTIGMATISM
Y = 21.60

1.000

DISTORTION
Y = 21.60

5.000 %

LATERAL CHROMATIC ABERRATION

SPHERICAL
ABERRATION
NA = 0.09

1.000

ASTIGMATISM
Y = 21.60

1.000

DISTORTION
Y = 21.60

5.000 %

LATERAL CHROMATIC ABERRATION

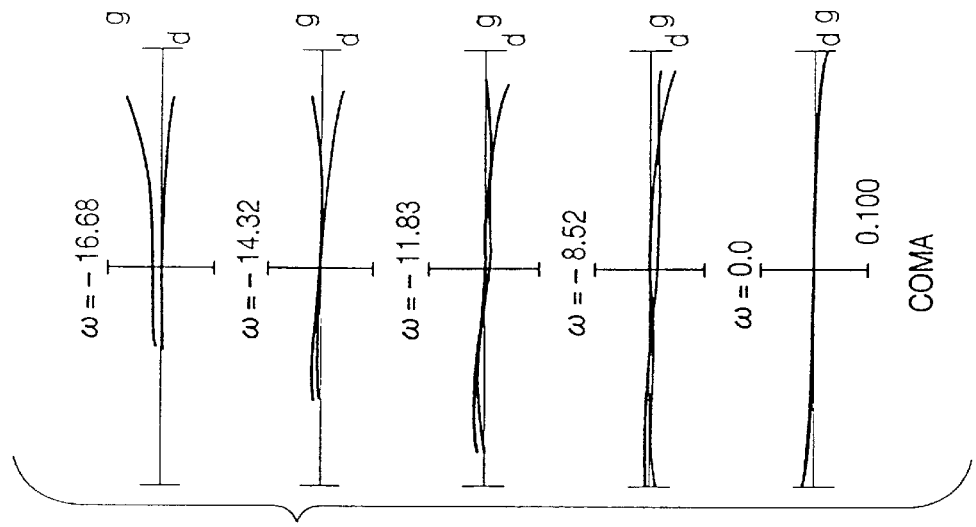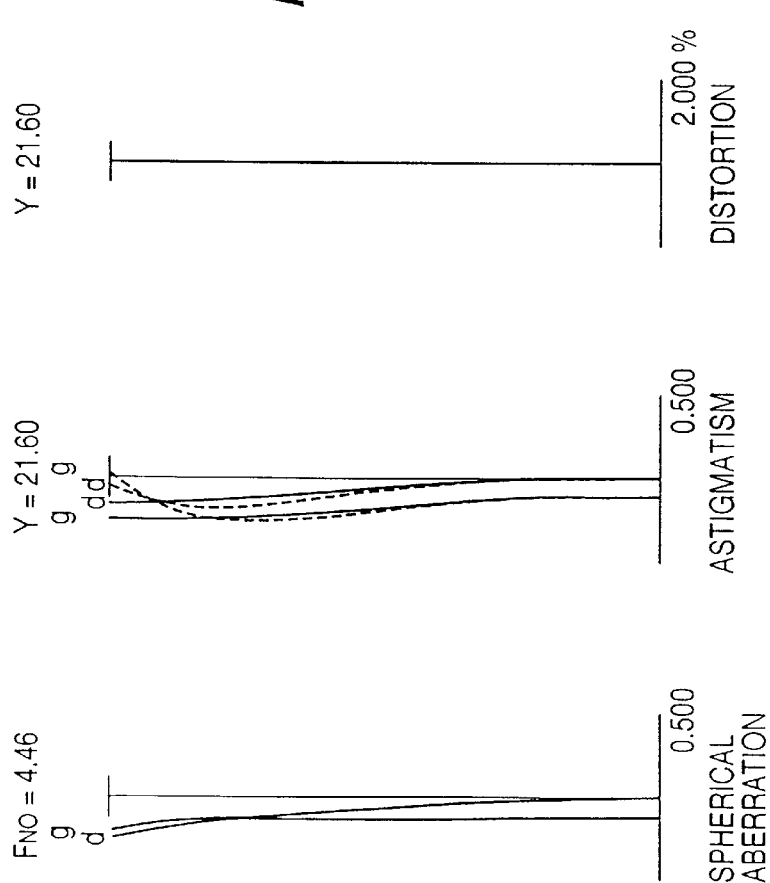

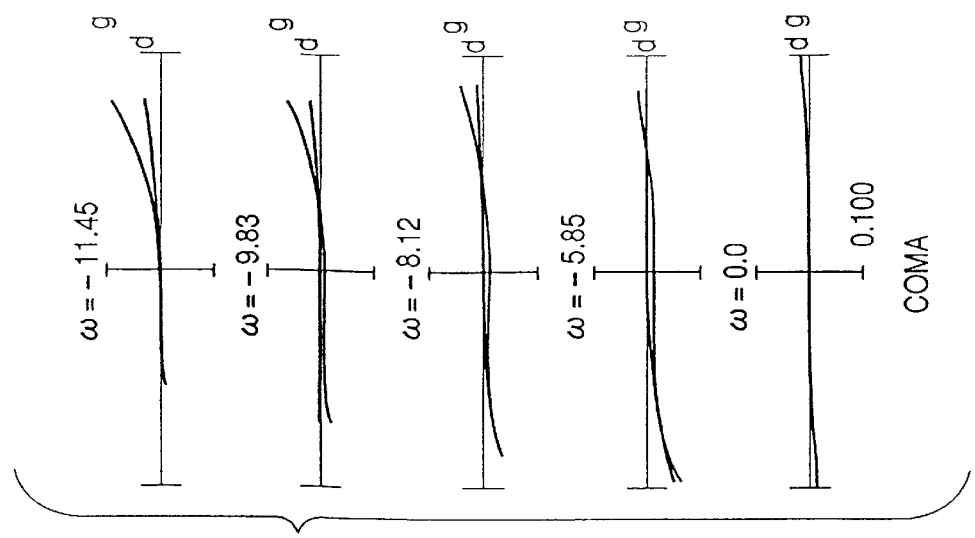
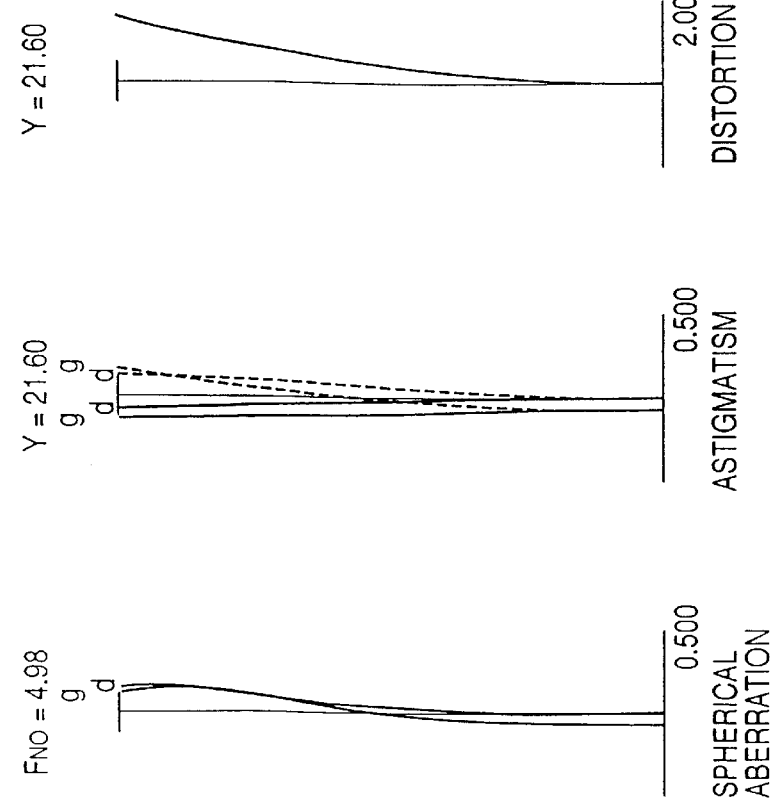

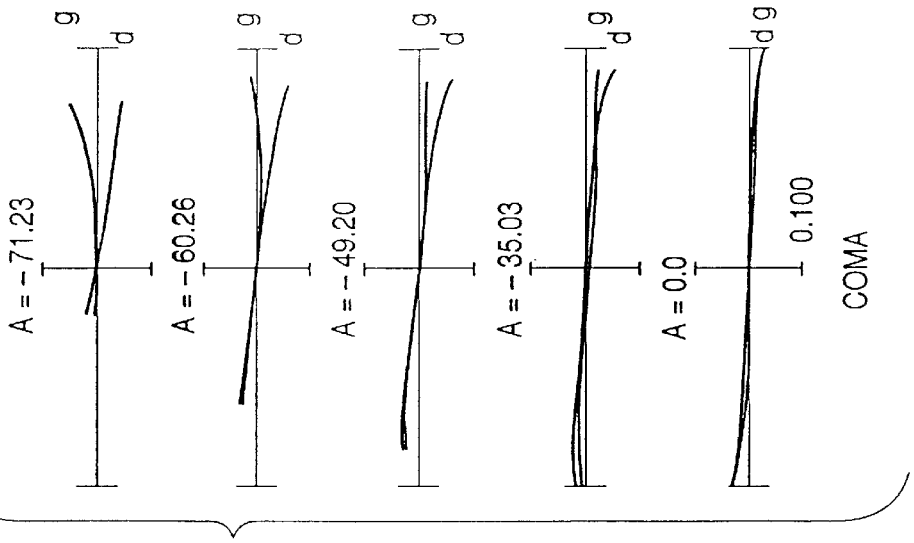
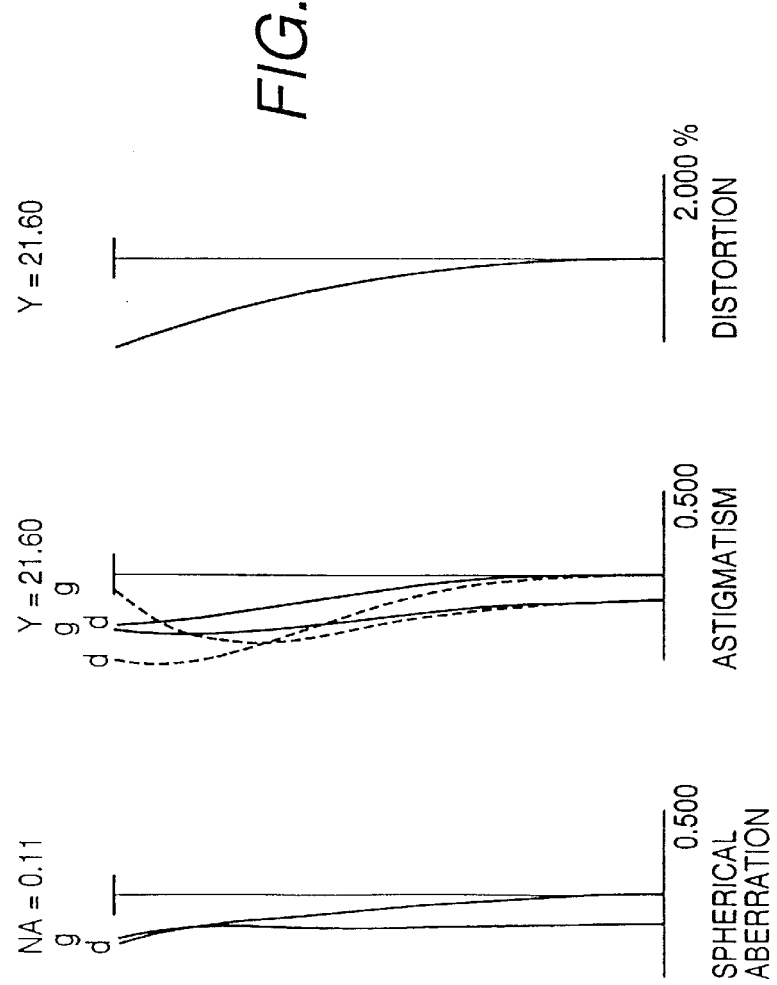

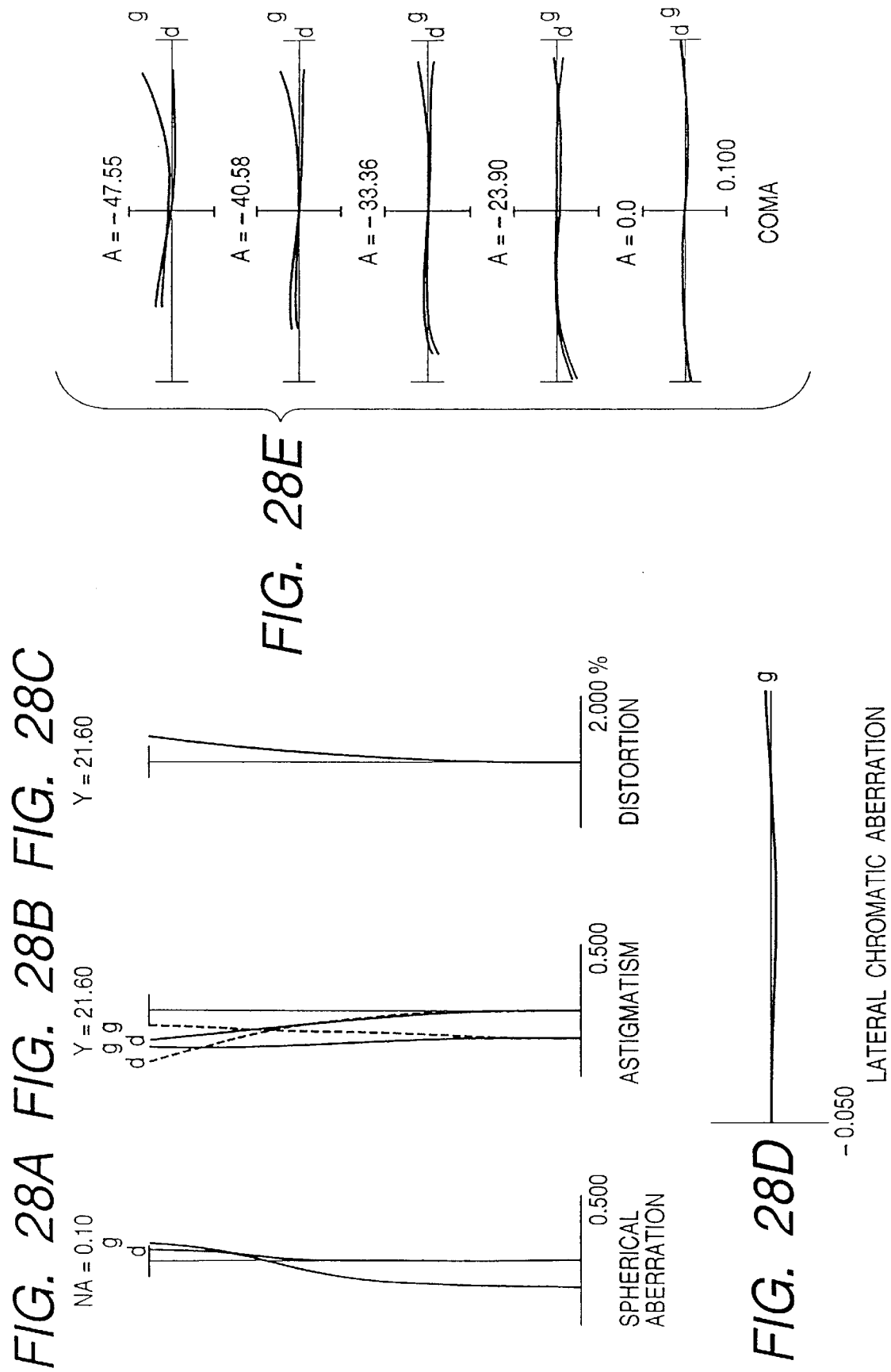

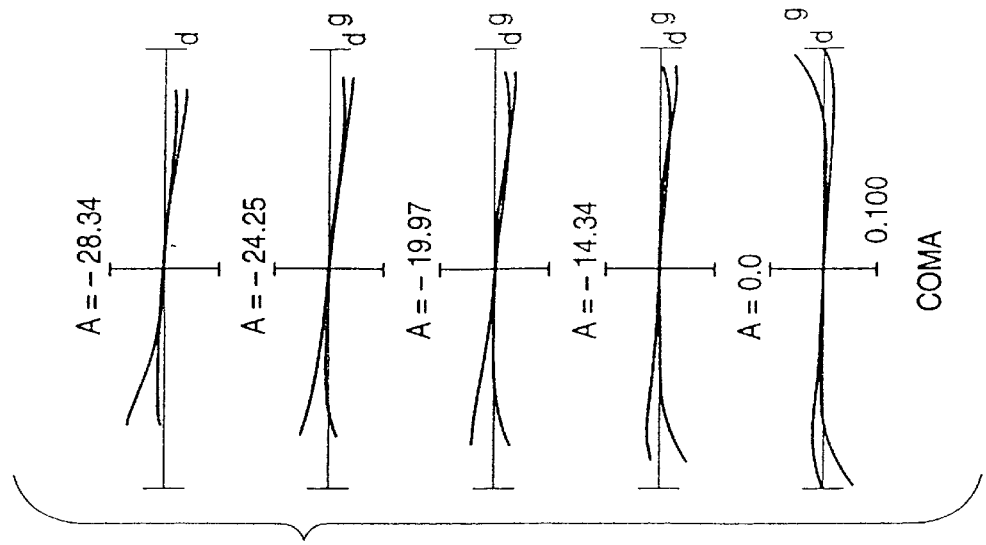
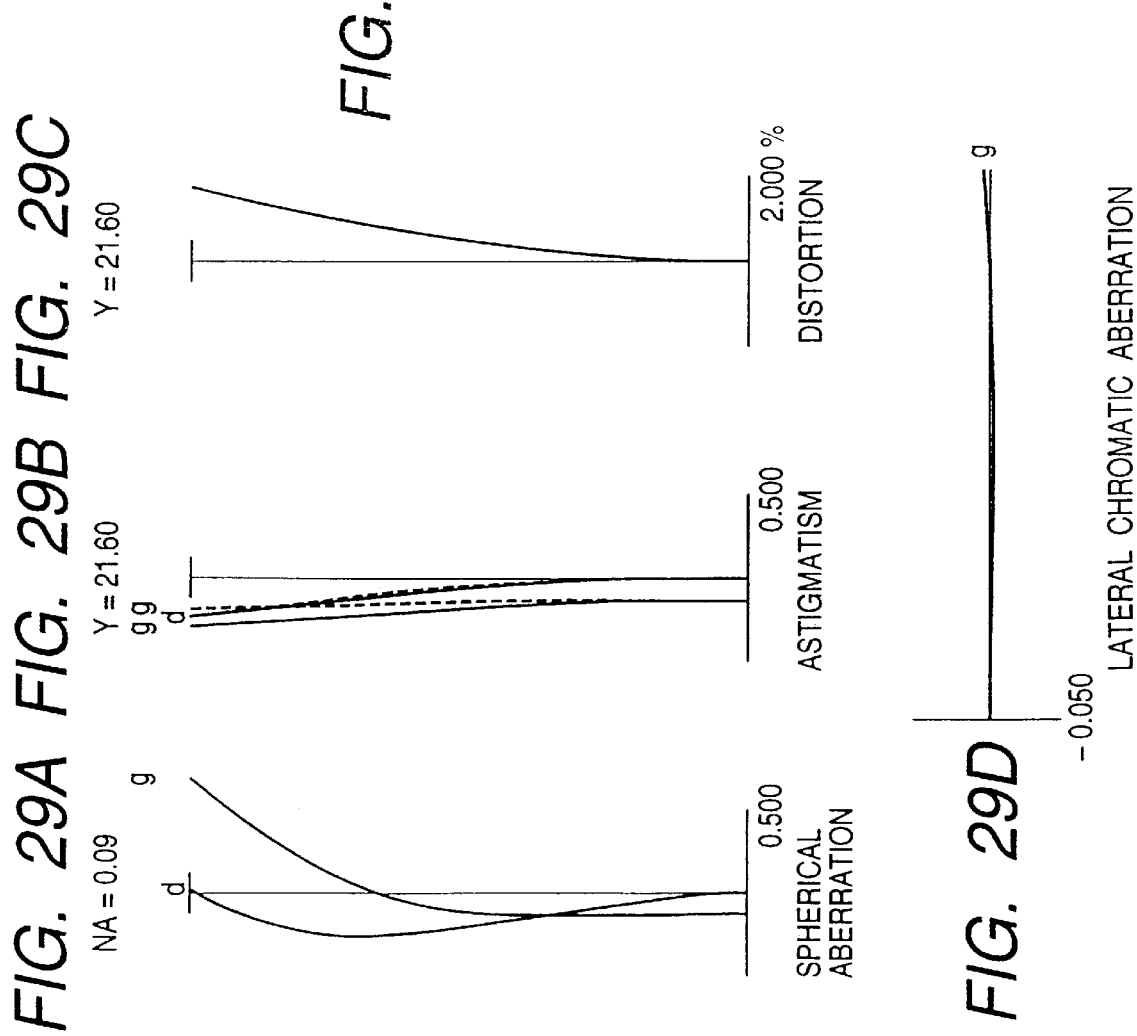
FIG. 29A  FIG. 29B  FIG. 29C  FIG. 29E
FIG. 29D

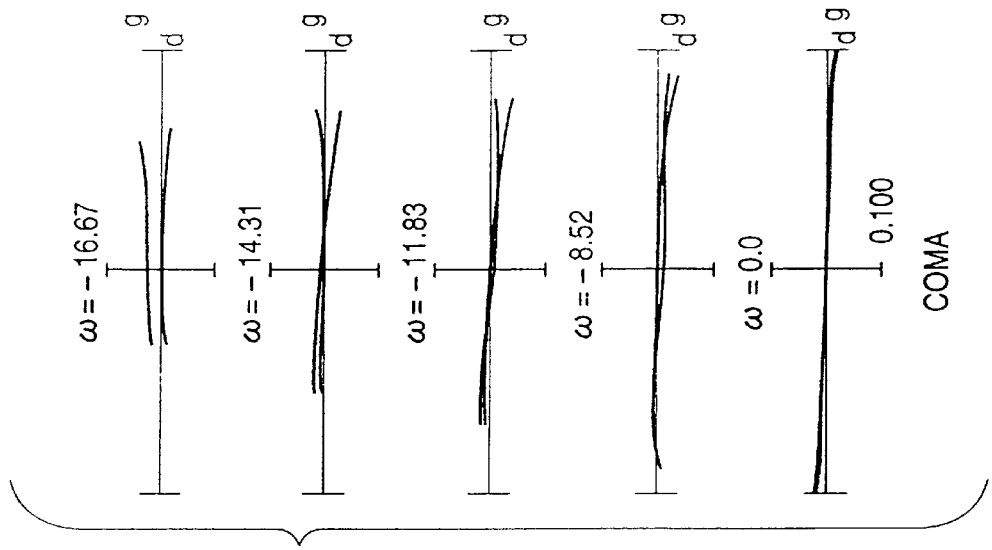
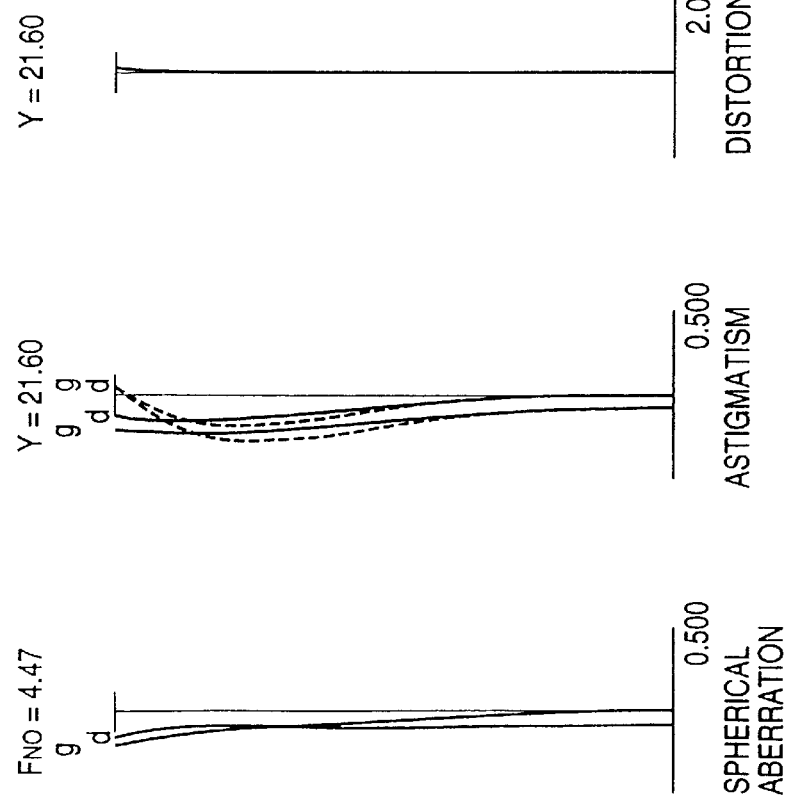

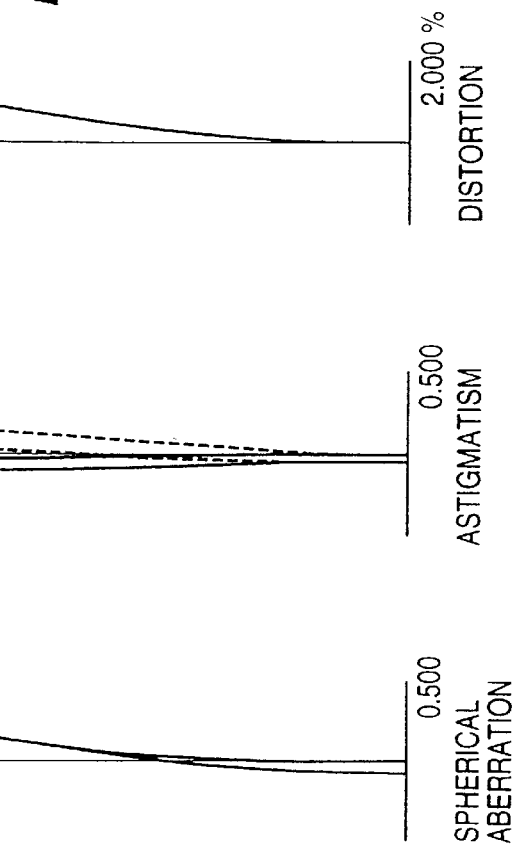

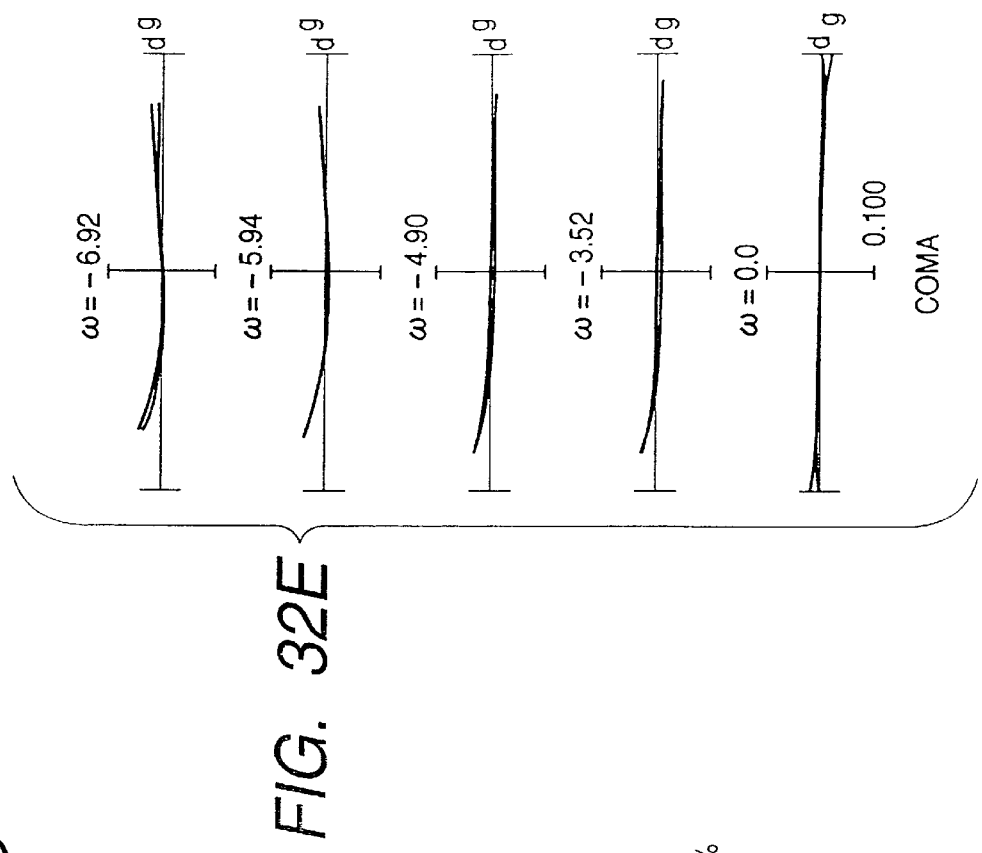
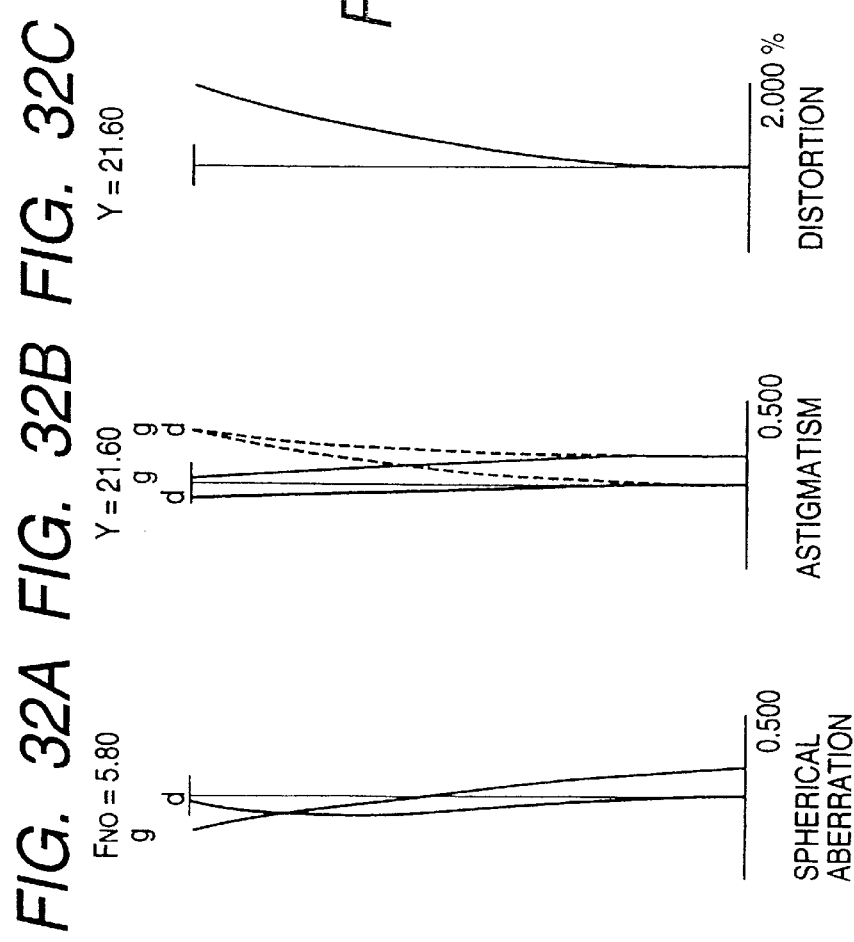
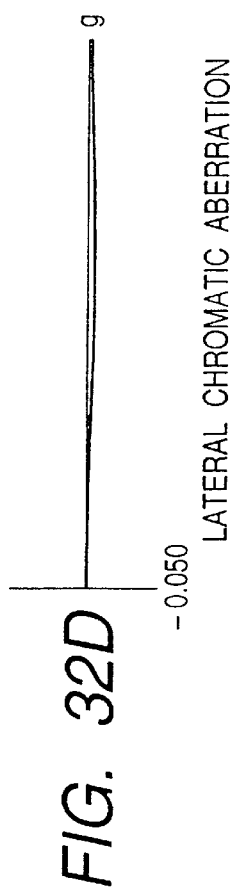
FIG. 32A  FIG. 32B  FIG. 32C
FIG. 32D
FIG. 32E

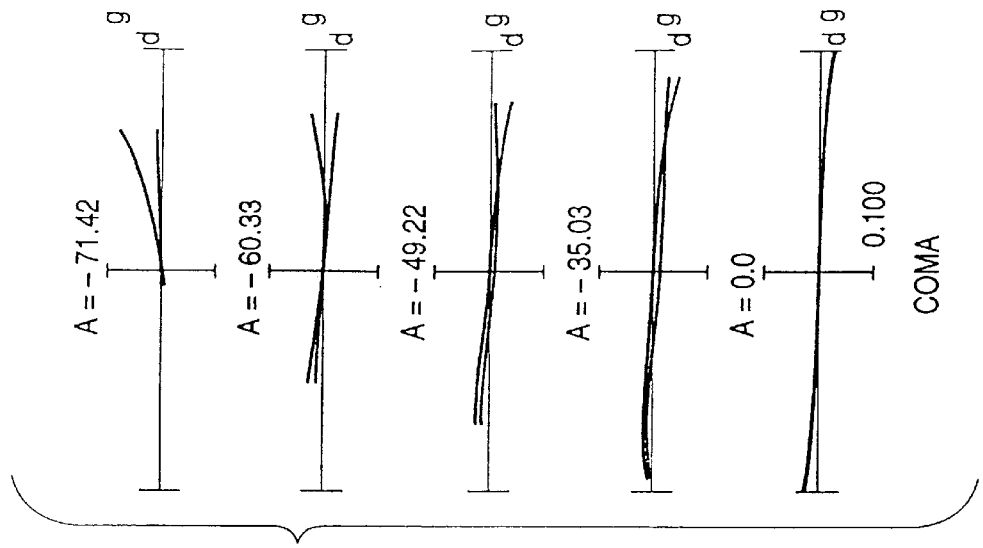
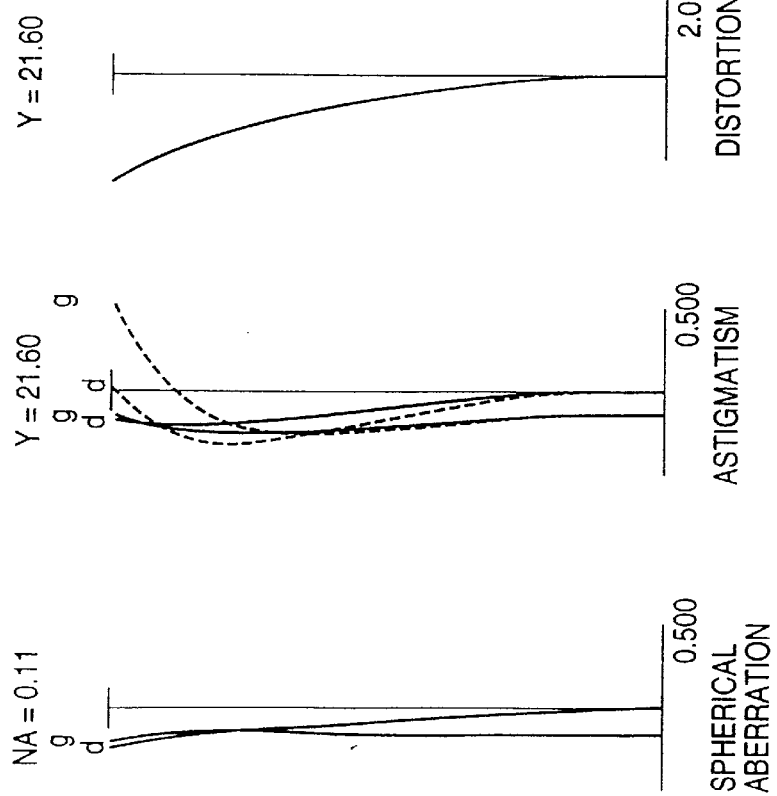
FIG. 33A  FIG. 33B  FIG. 33C
FIG. 33D
FIG. 33E

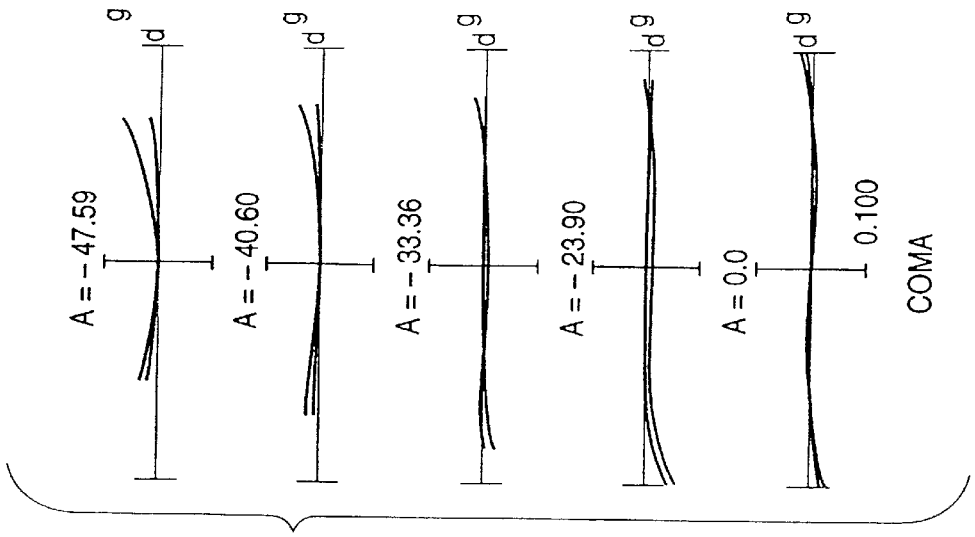
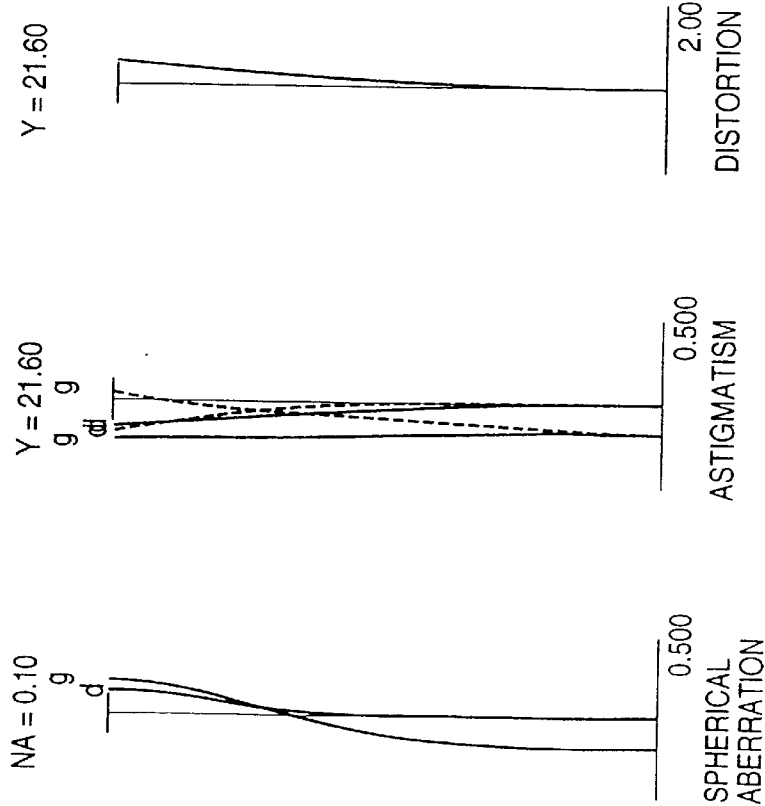

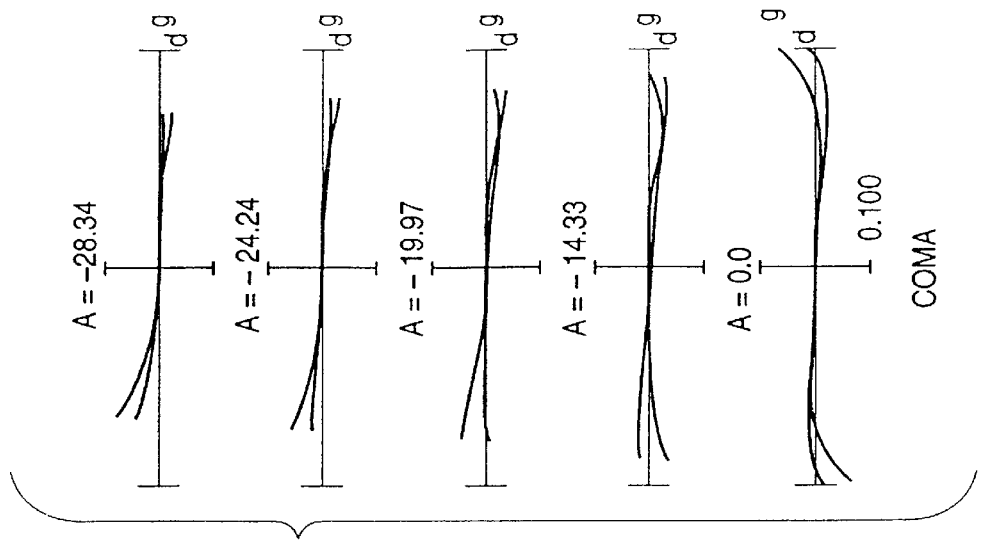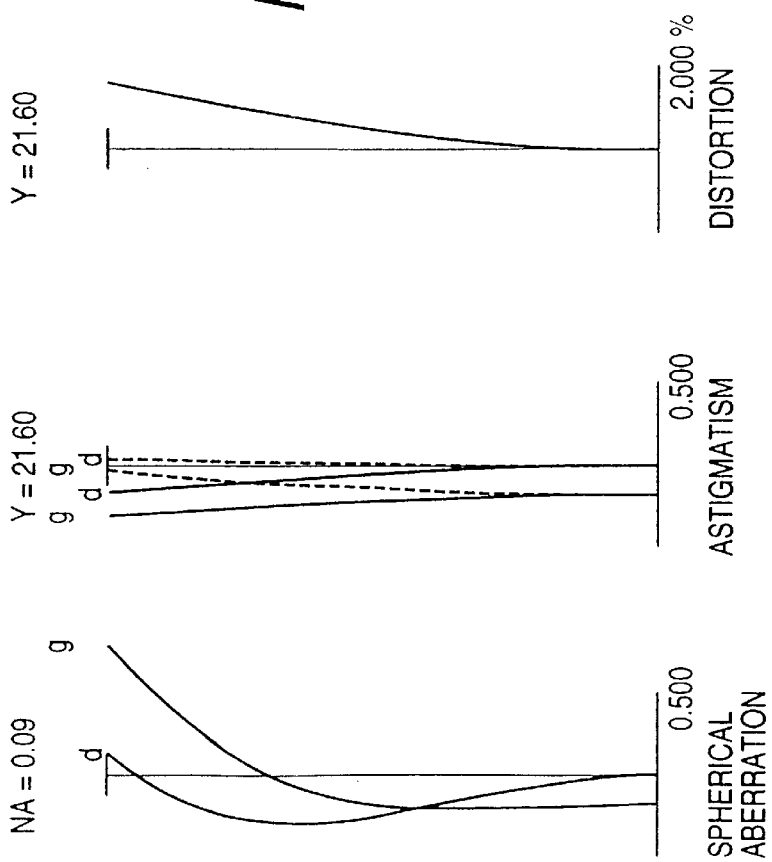

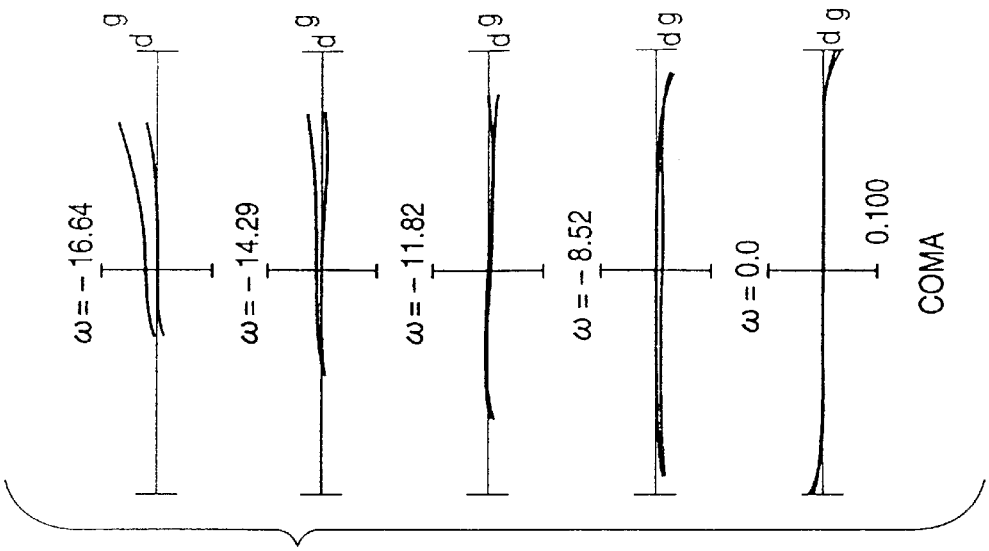
FIG. 37A  FIG. 37B  FIG. 37C
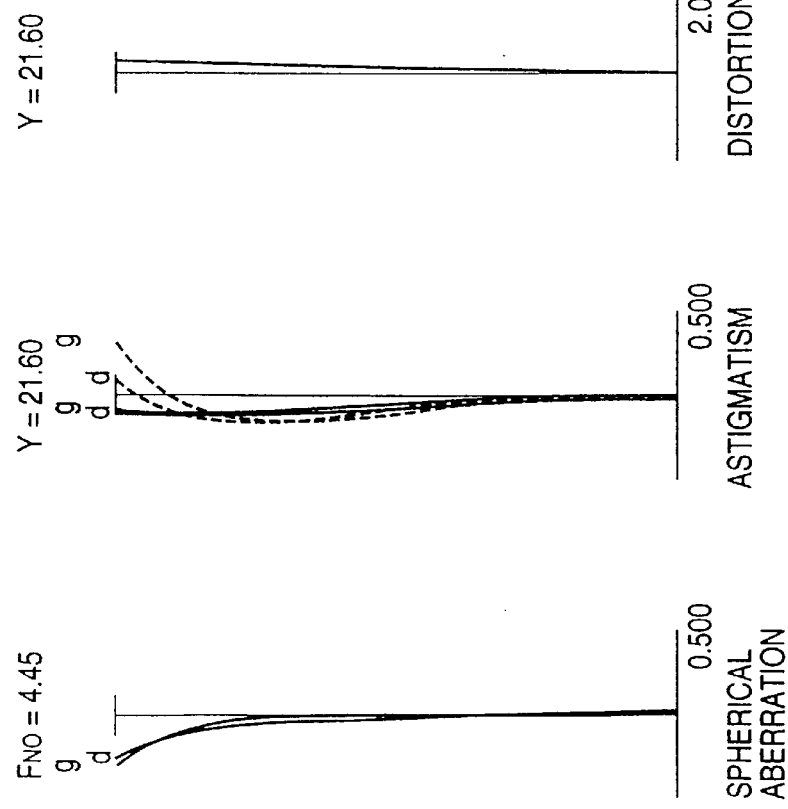
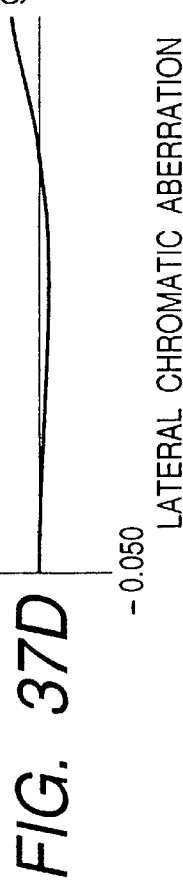

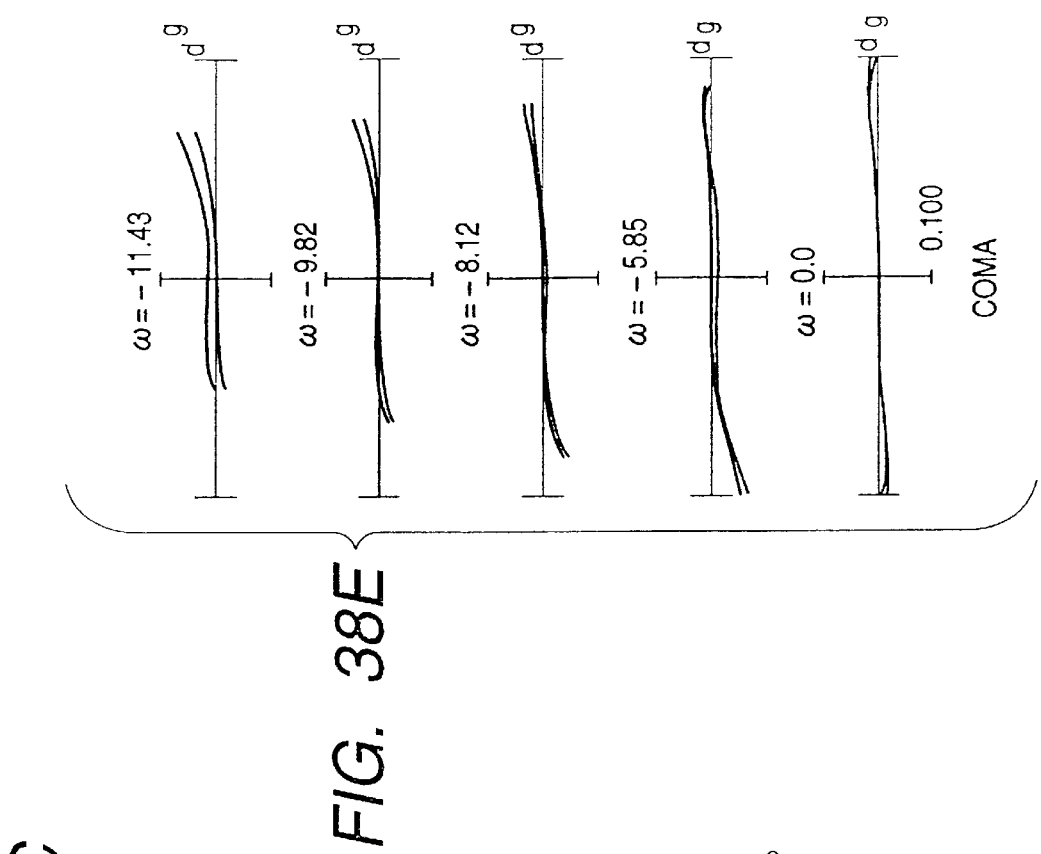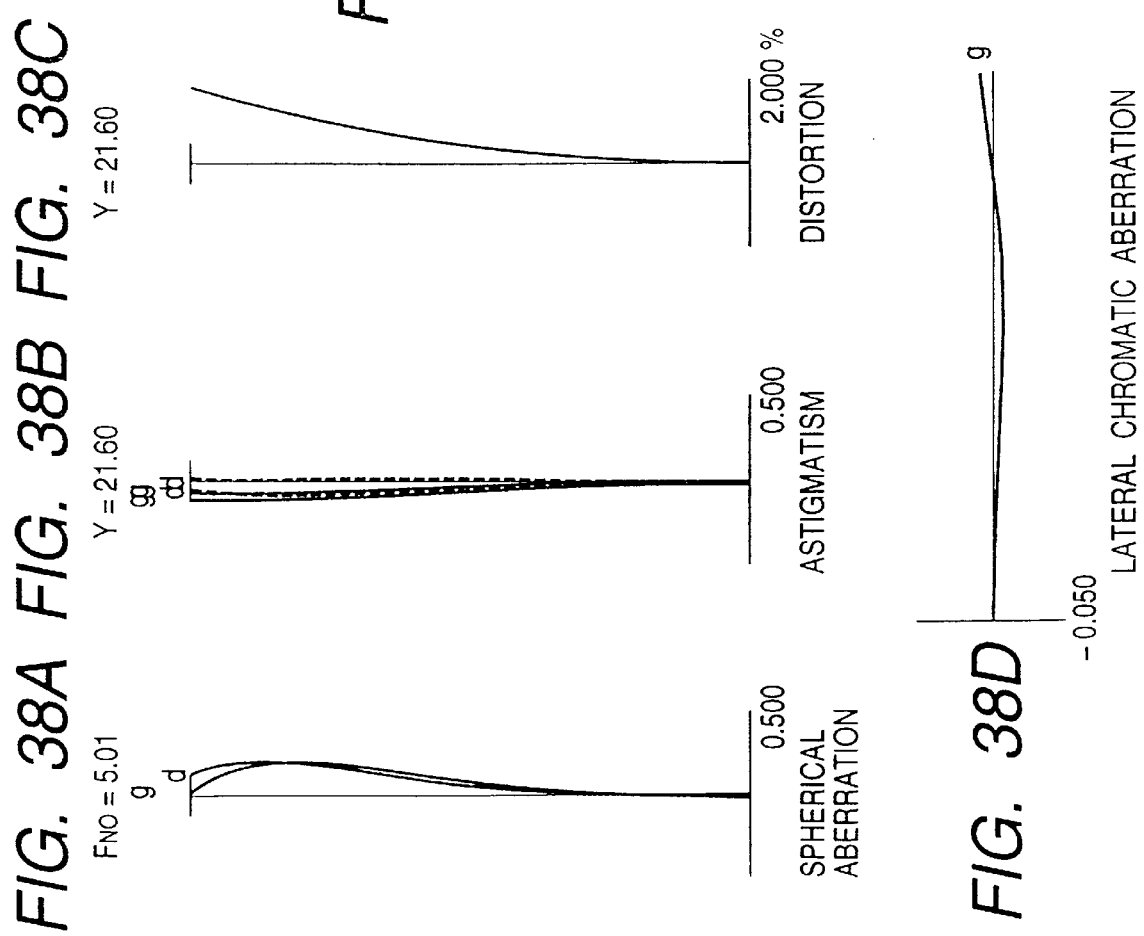

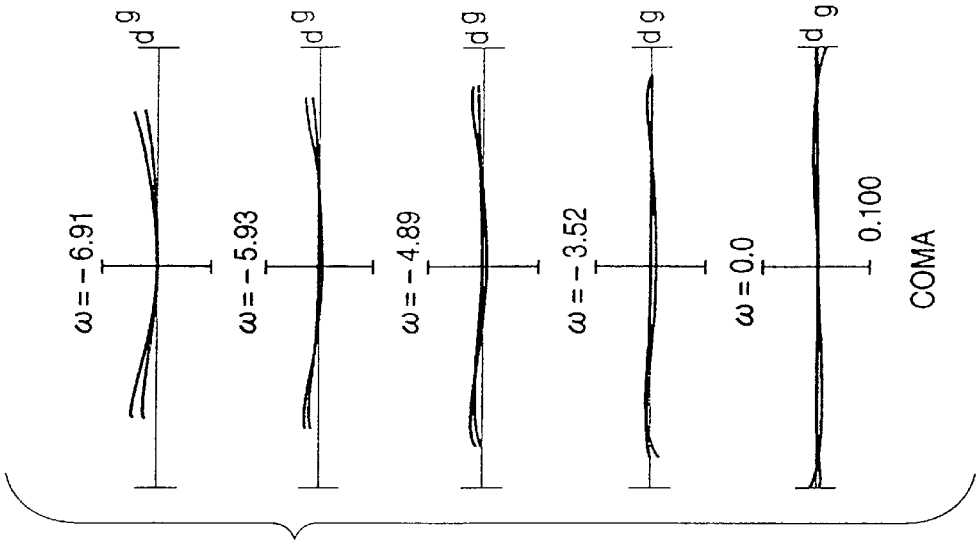
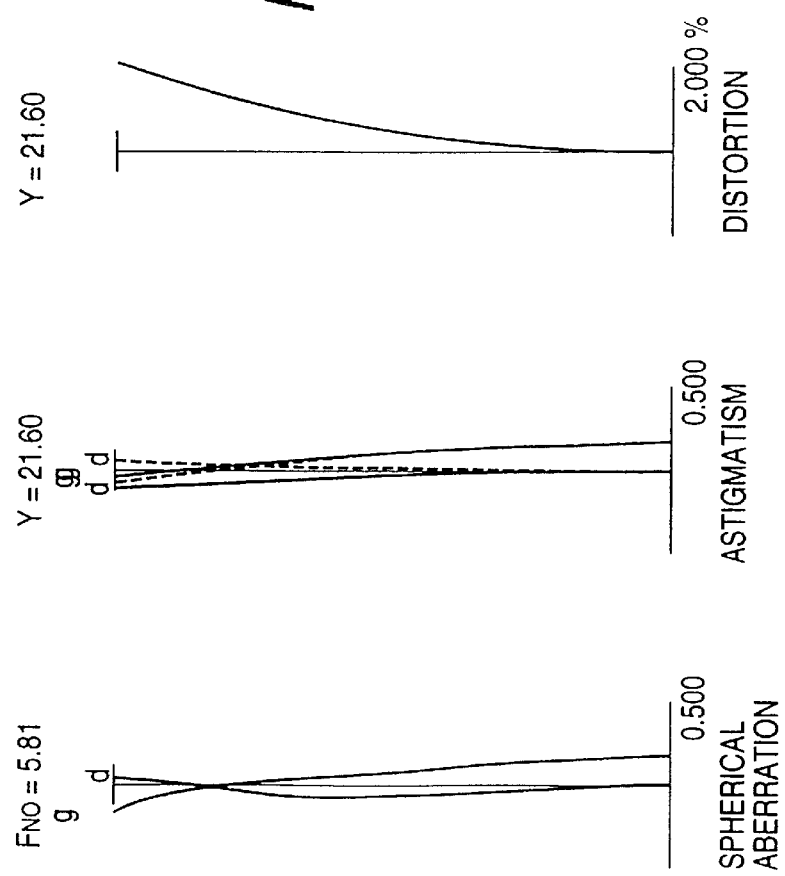

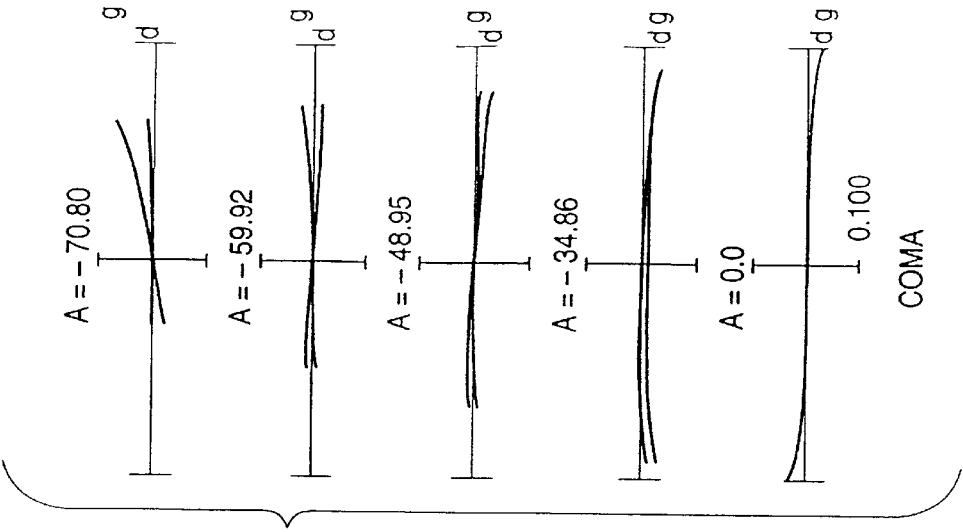
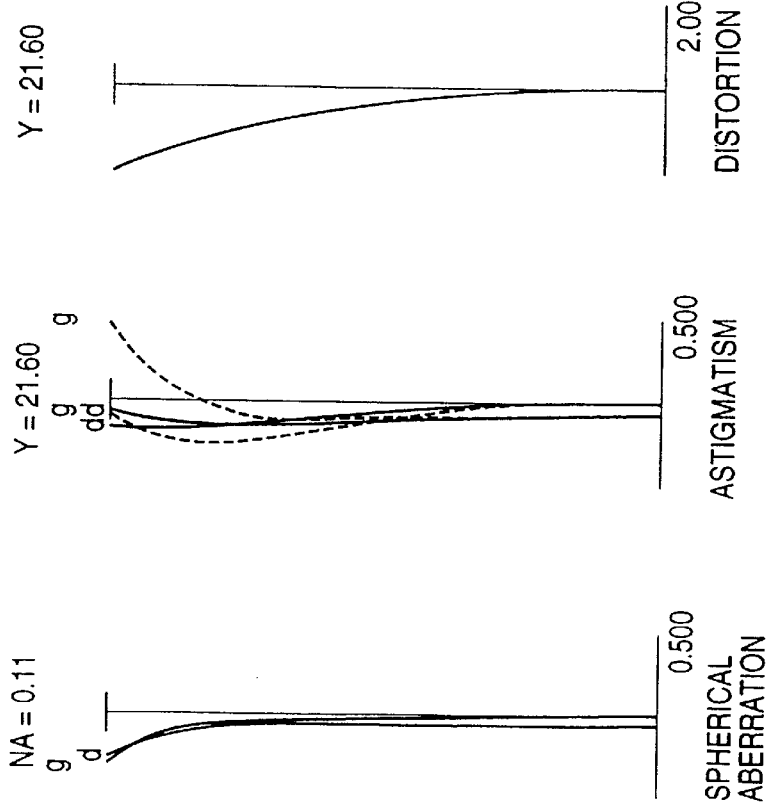

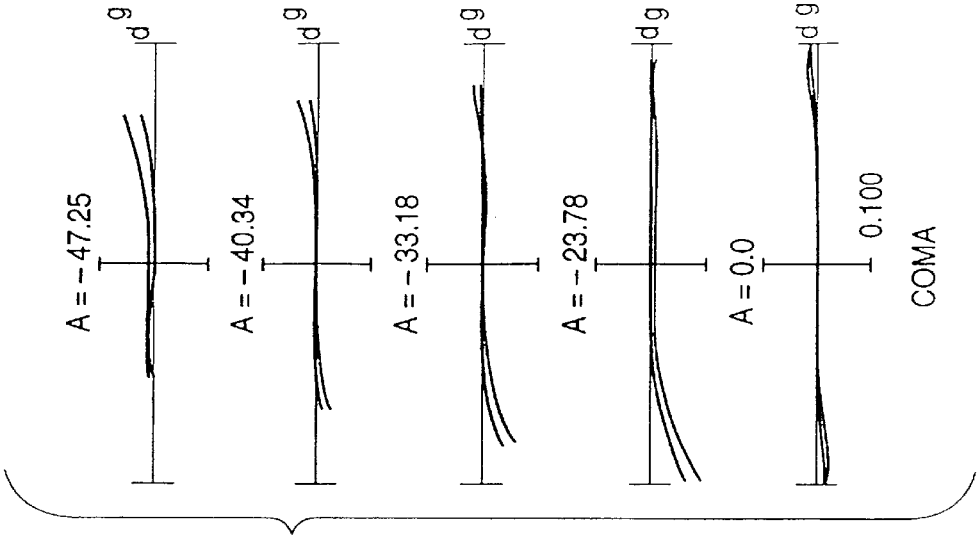
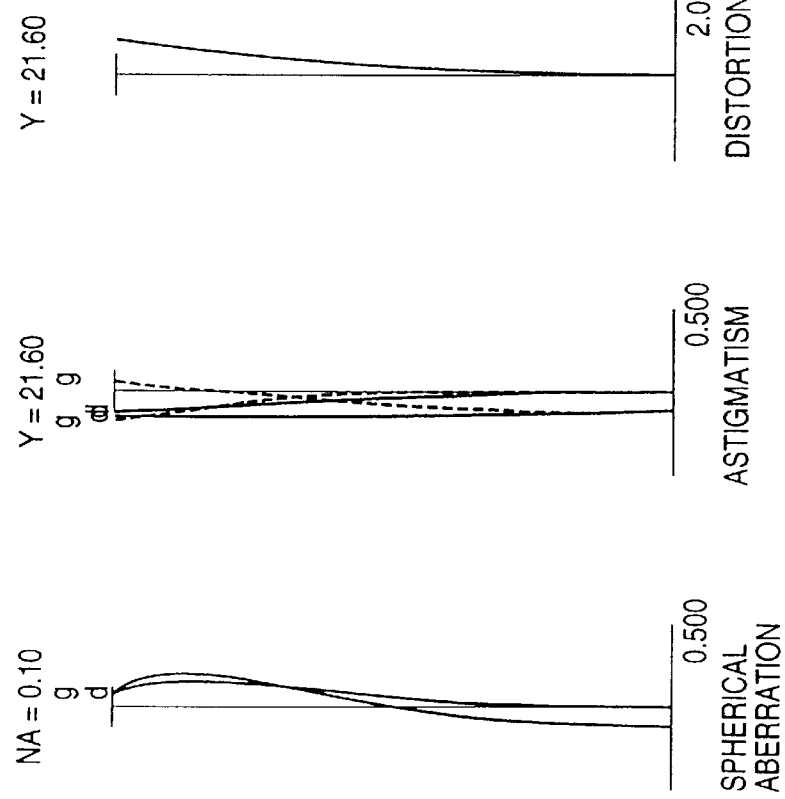
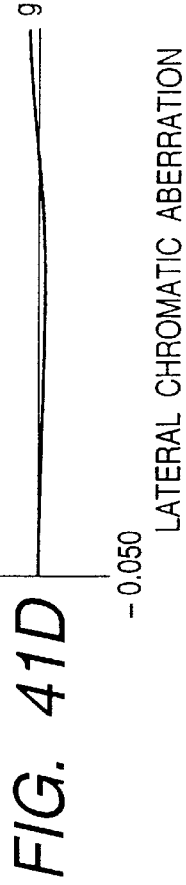

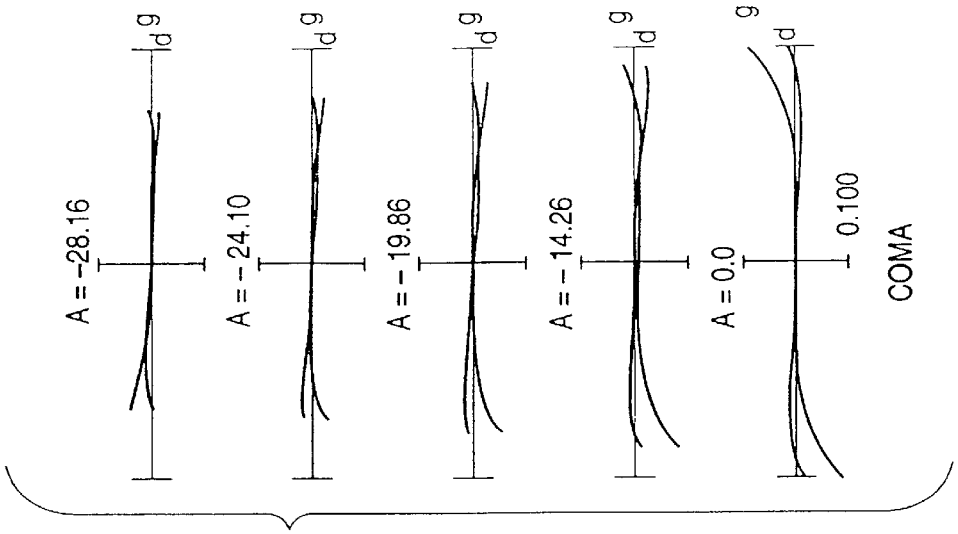
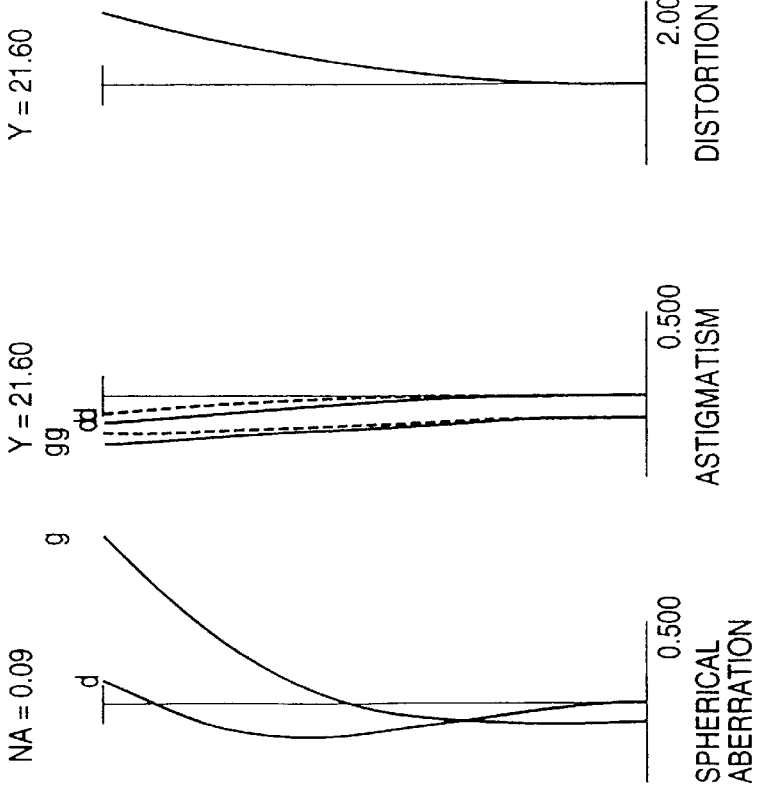
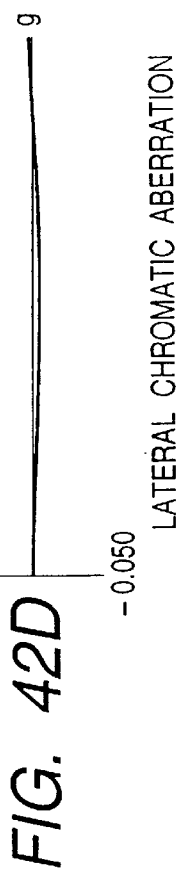

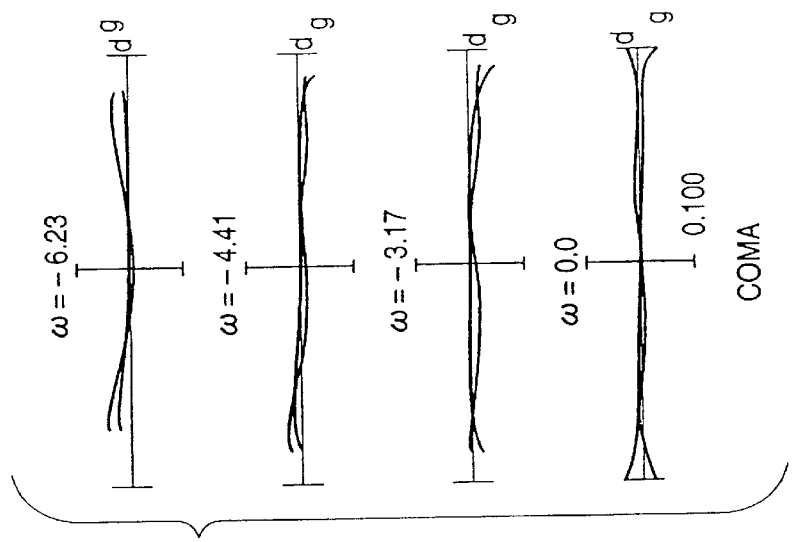
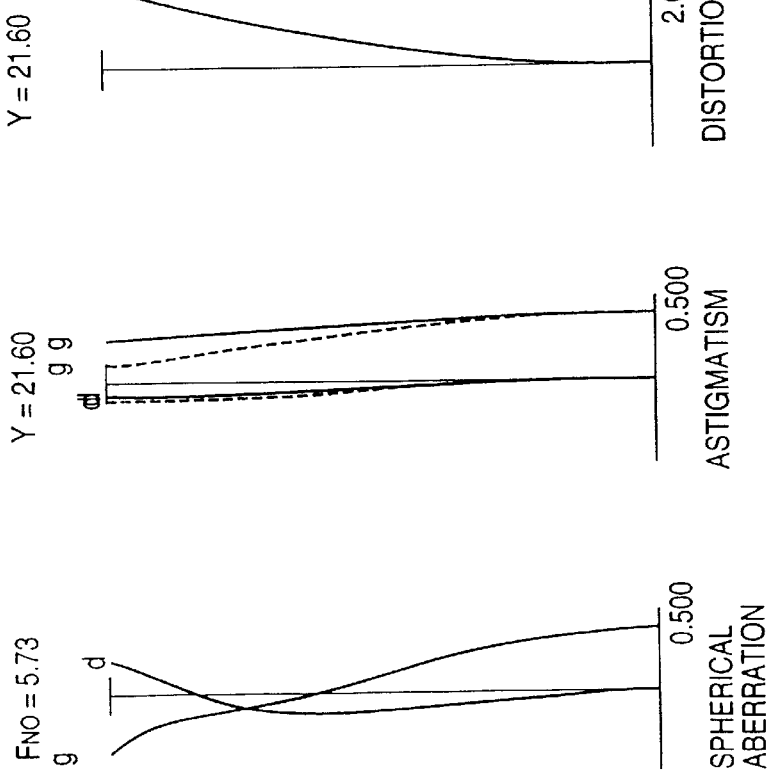

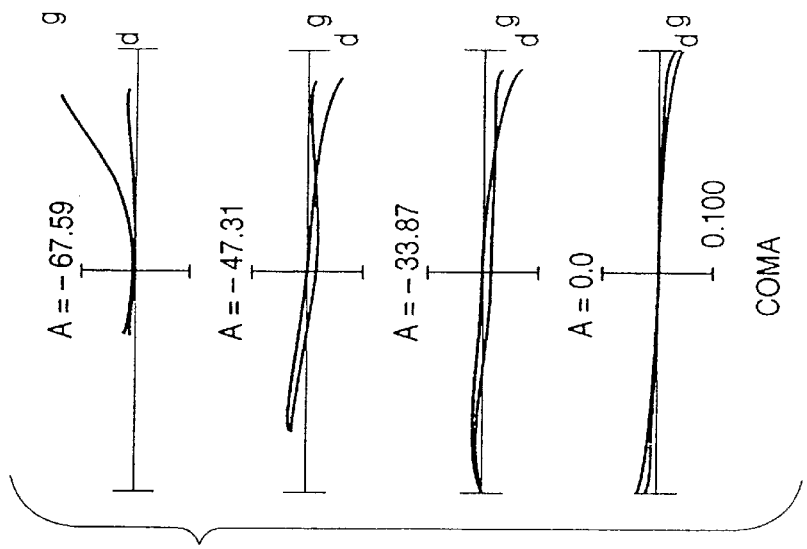
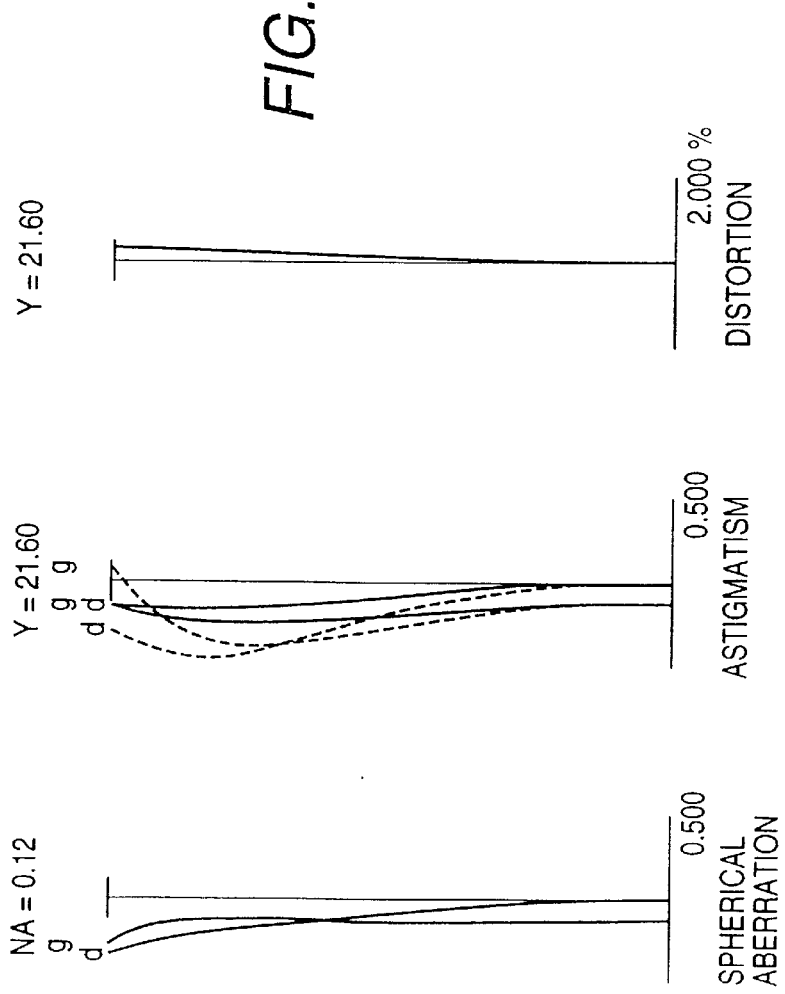
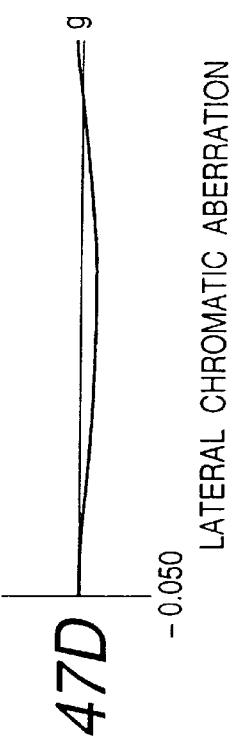

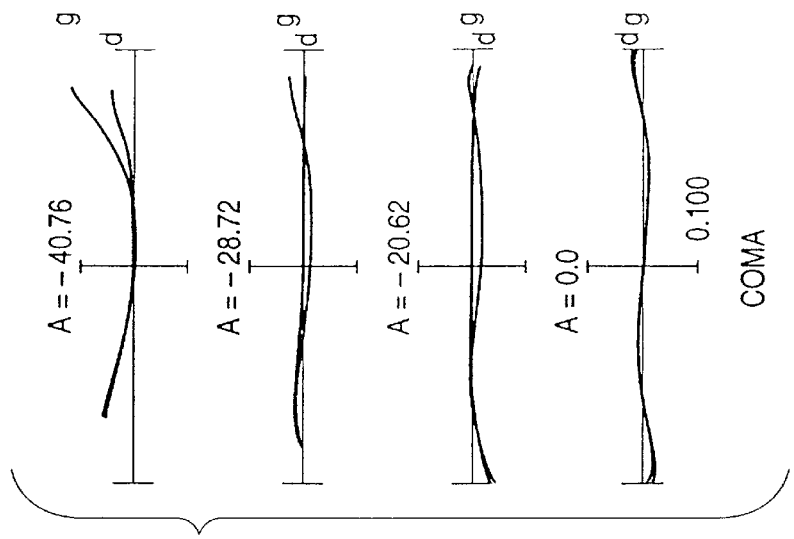
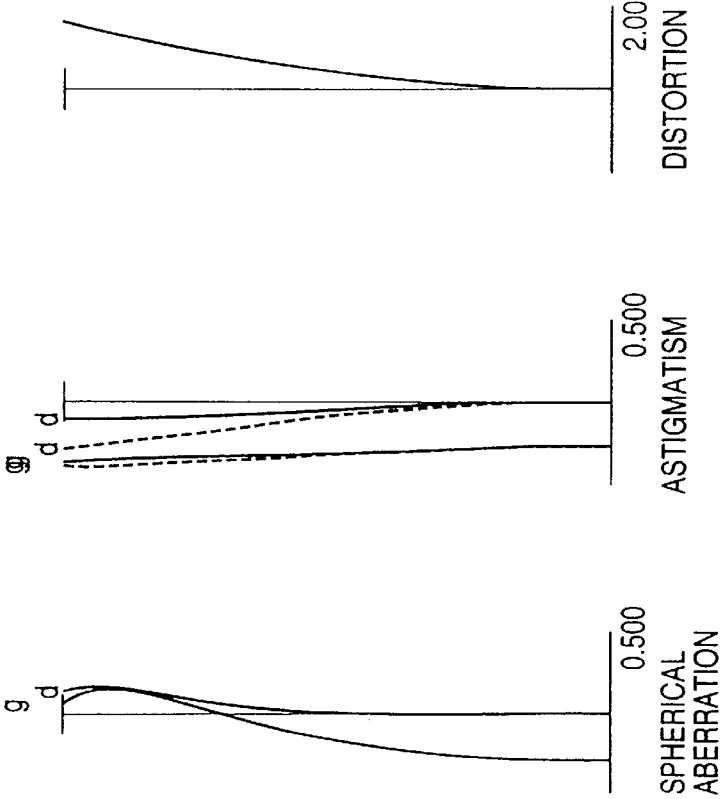

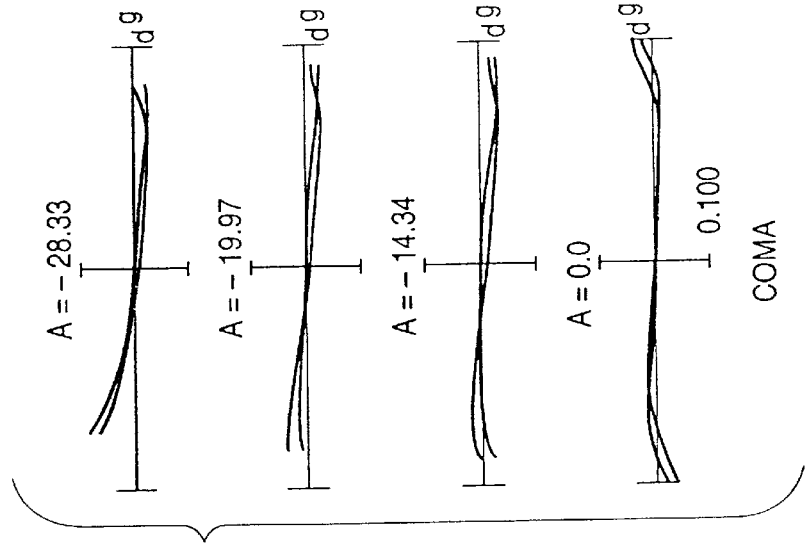
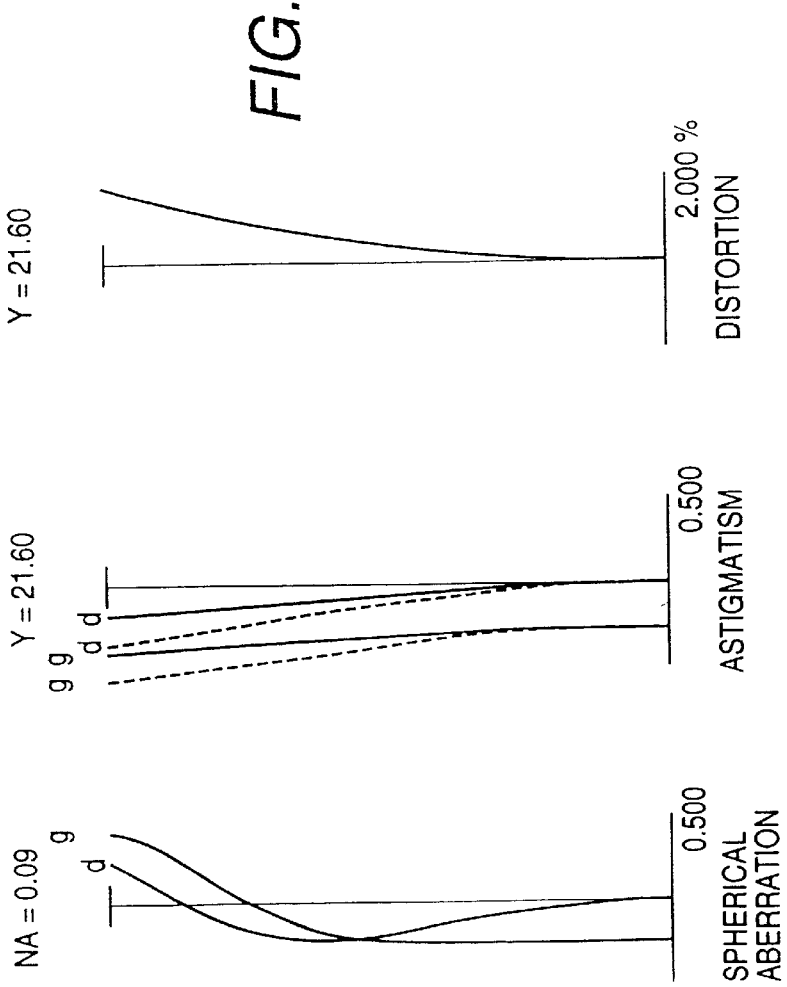
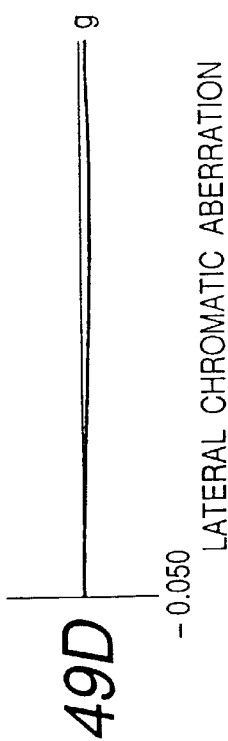
FIG. 49A   FIG. 49B   FIG. 49C
FIG. 49D
FIG. 49E

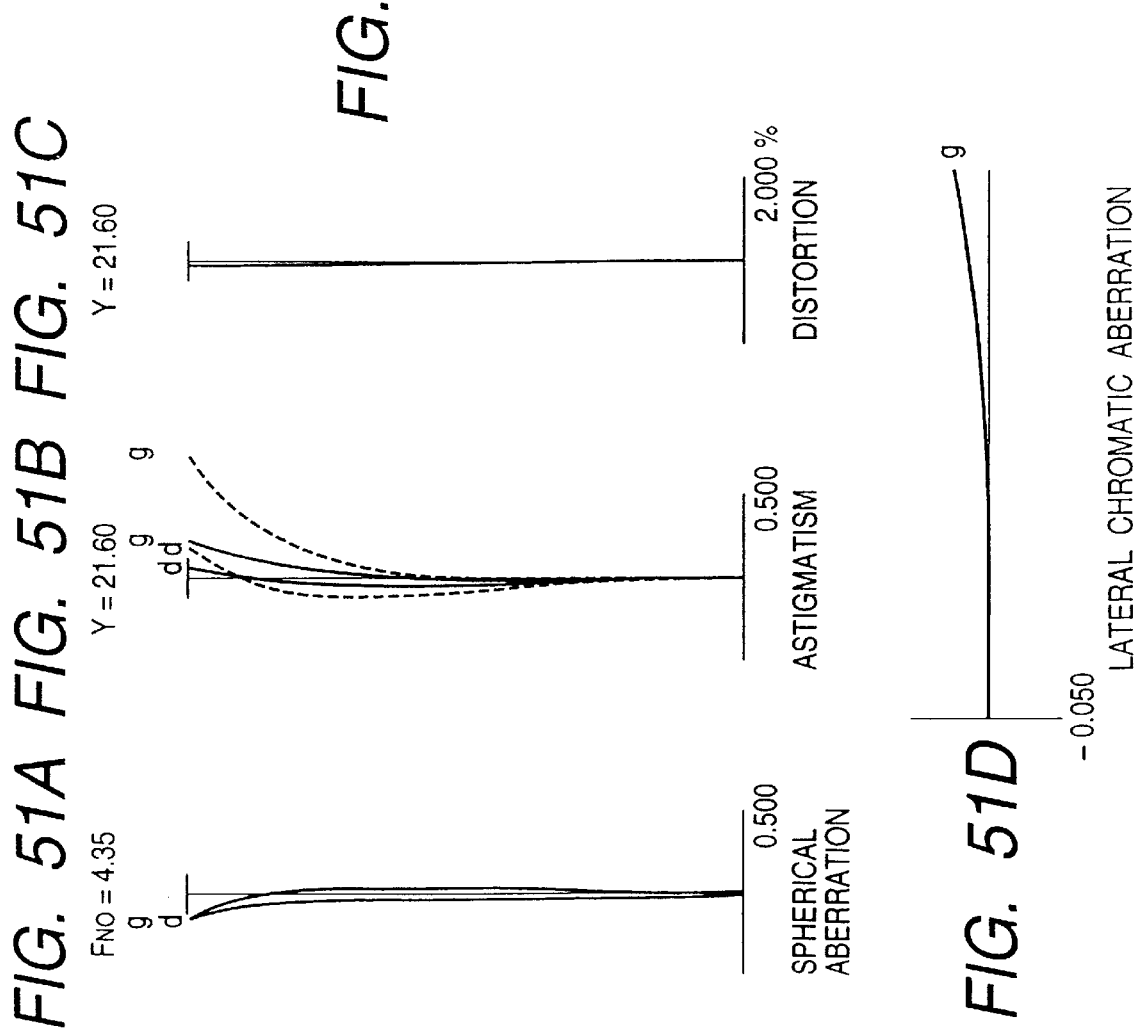

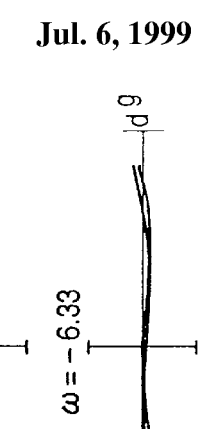
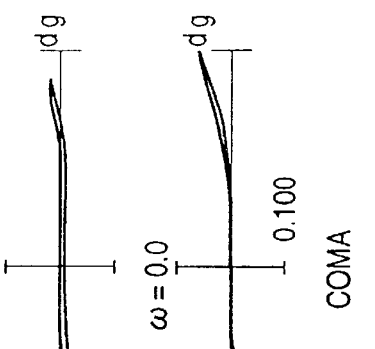
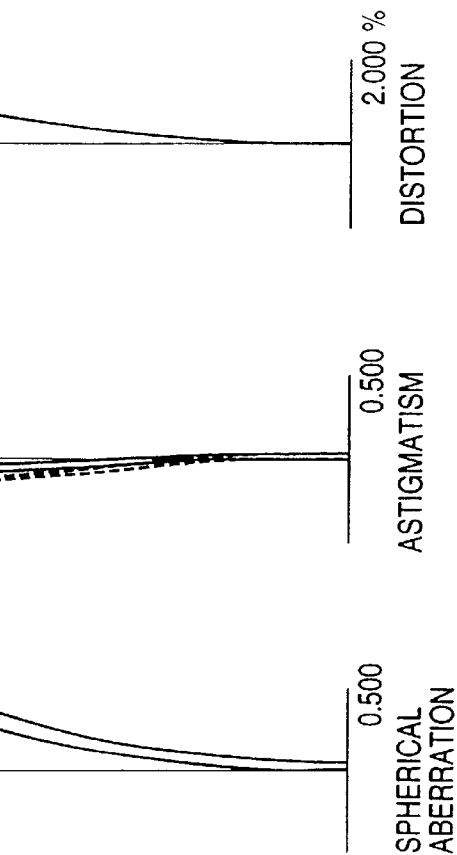
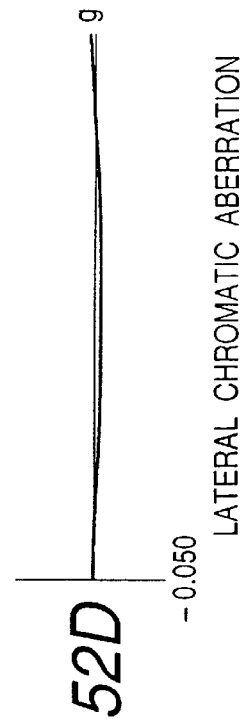
FIG. 52A  FIG. 52B  FIG. 52C
FIG. 52D
FIG. 52E

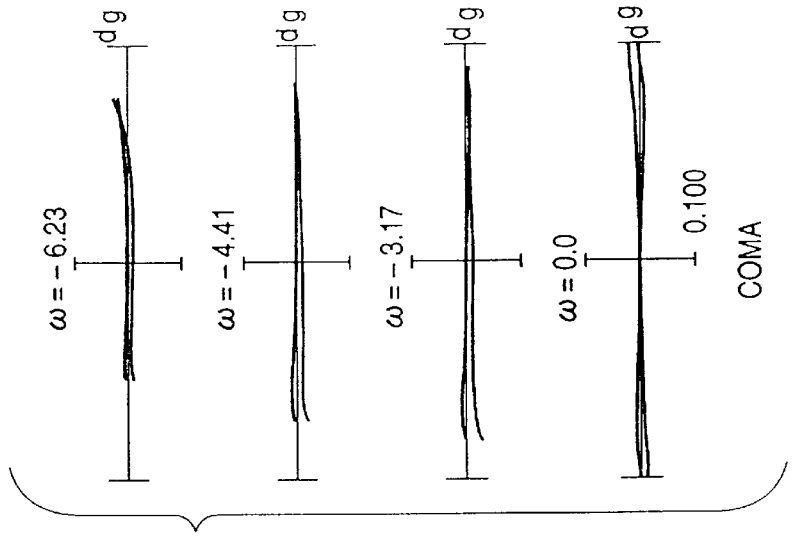
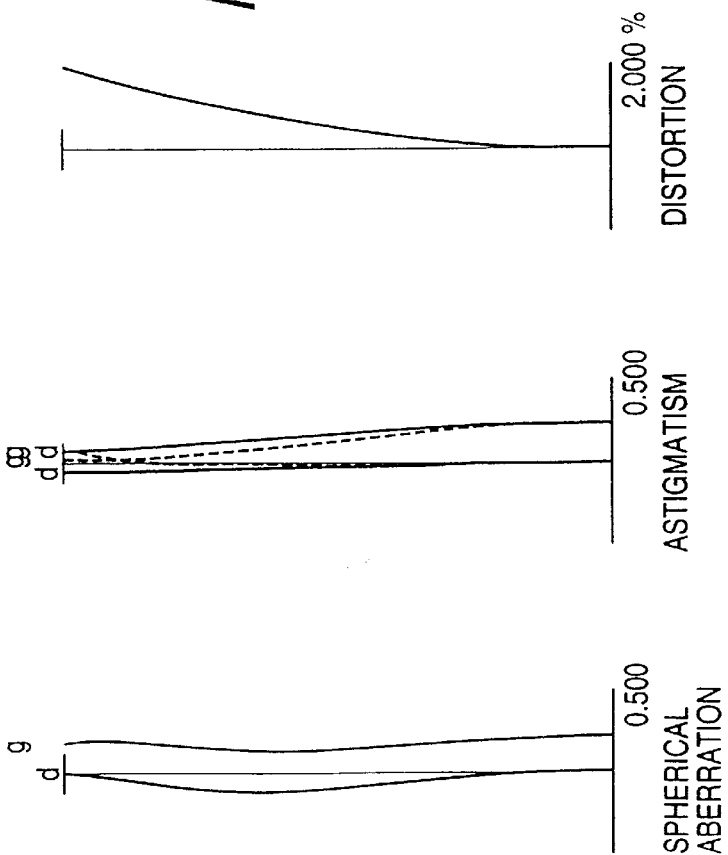

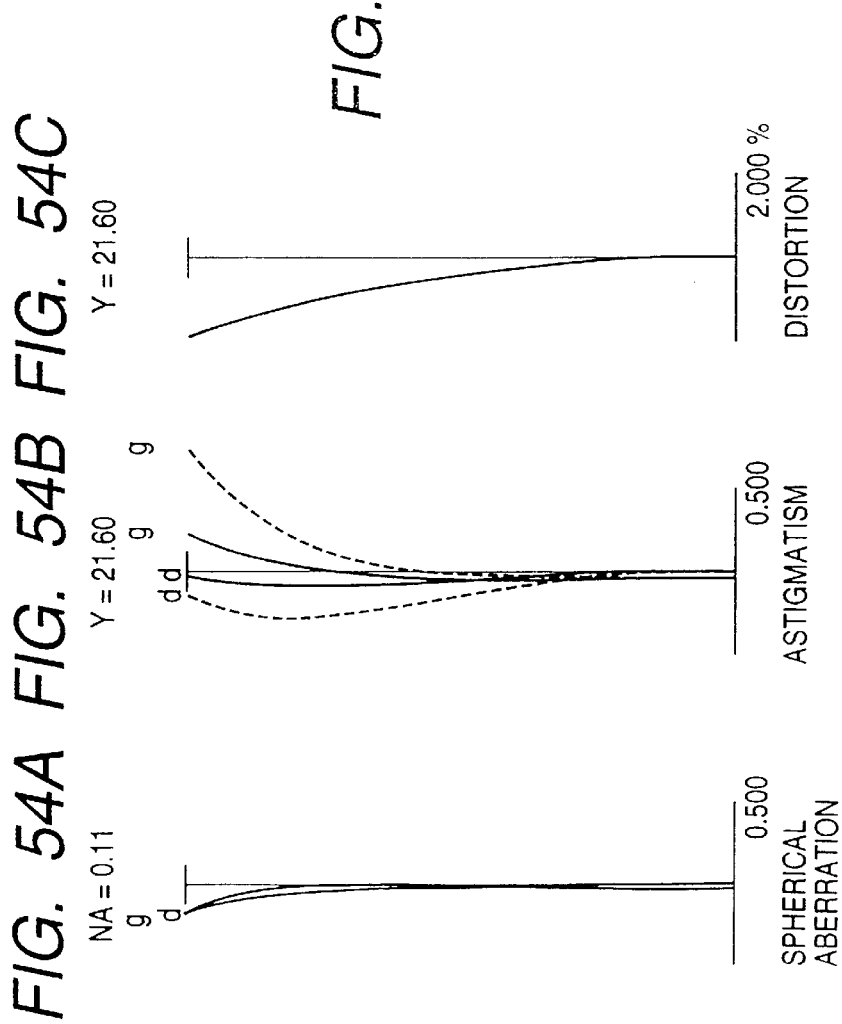
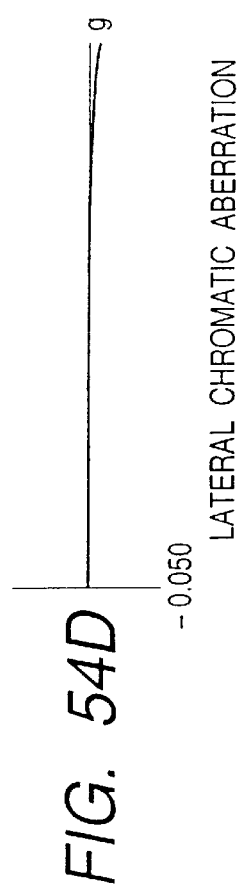

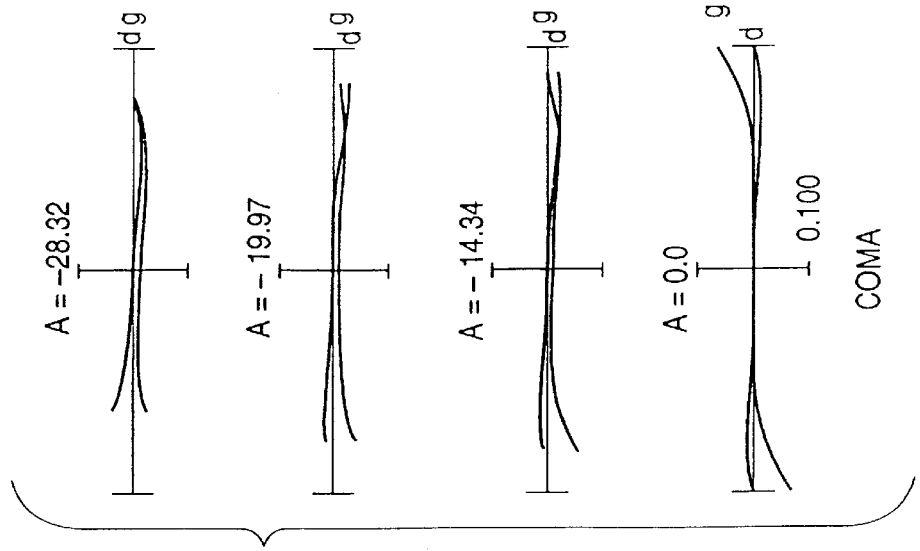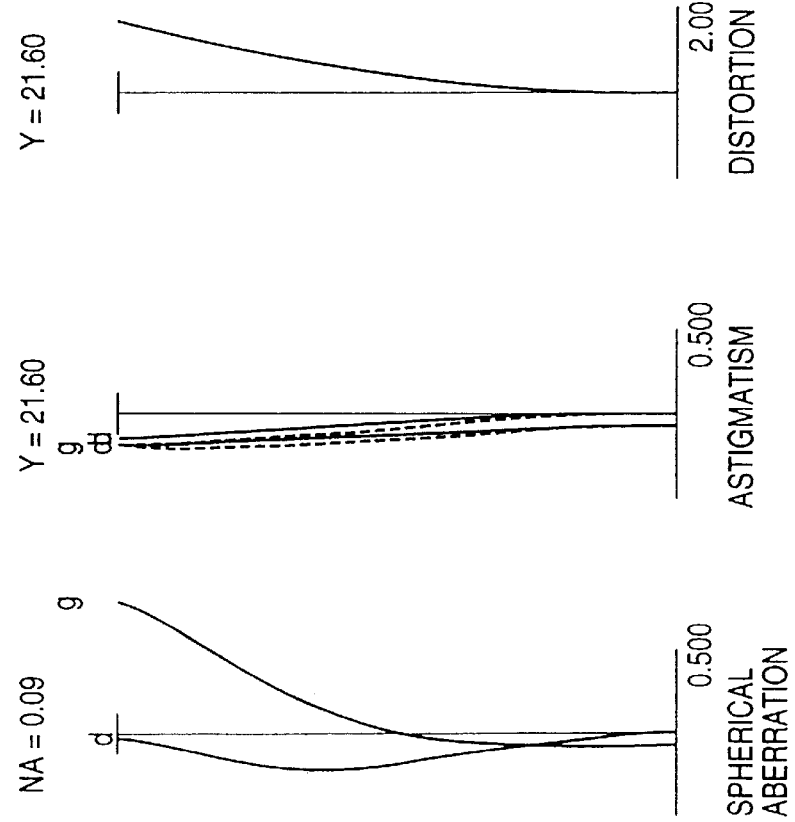
FIG. 56A  FIG. 56B  FIG. 56C
FIG. 56D
FIG. 56E

ZOOM LENS

This is a division of application Ser. No. 08/756,770 filed Nov. 26, 1996 now U.S. Pat. No. 5,717,527.

BACKGROUND OF THE INVENTION

1. Field of the Invention

The present invention relates to a zoom lens for a single lens reflex camera, and particularly to a zoom lens which is capable of effecting focusing from infinity to an extreme near distance at any zoom position.

2. Related Background Art

Conventionally, there is provided for a single lens reflex camera a so-called macro lens which is capable of focusing from infinity to an extreme near distance with image magnification of about −0.5 to −1.

Also, there is provided a kind of zoom lens which additionally has a function capable of photographing with a shorter distance than an ordinary closest object distance, which is called a macro mechanism.

Or, there is provided a close-up lens which is attached to the object side of the photographing lens, in order to reduce the closest object distance.

However, either of the conventional macro lenses is a single focus lens, which requires an operation for changing a distance between an object to be photographed and the camera and, simultaneously, an operation for focusing, in order to change an image magnification. For this reason, it is troublesome to alter a photo composition when using a tripod for photographing an object at a close distance.

Also, a majority of the macro mechanism of a zoom lens can be used only at either one of the wide angle end (so-called wide macro) or the telephoto end (so-called tele macro), so that zooming can not be carried out at macro photographing. As a result, the operability of such lens is equal to or worse than that of a macro lens with a single focus. Moreover, the maximum image magnification of such lens is about −0.3, which is not sufficient when an object is to be photographed as a larger image.

Though some type of the macro mechanism of zoom lens allows close photographing at all zoom positions, the maximum image magnification in this case is about −0.25, which is also not sufficient when an object is desired to be photographed as a larger image.

When accessories such as a close-up lens and the like is used, such accessories are to be attached or detached, depending on whether an object to be photographed is at a far distance or a close distance, which is troublesome.

SUMMARY OF THE INVENTION

Accordingly, an object of the present invention is to provide a zoom lens capable of extreme close photographing suitable for a single lens reflex camera, in which zooming can be carried out at any object distance from infinity to closest without deviation of the image plane, with the maximum image magnification of about −0.75 to −1 or around and a zoom ratio of 2 or more, an excellent image performance and a sufficient amount of light at marginal area can be obtained in every photographing condition.

Focusing methods for the zoom lens include, in addition to a method of moving a first lens group, an inner focus method and a rear focus method. However, the inner focus method or the rear focus method has a problem that the position of an image plane deviates when zooming is carried out while a near object is focused. Further, since it is required to arrange a space for moving the focusing lens in an optical path, then the extreme close photographing is carried out, and a movement amount of the focusing lens is large, the zoom lens becomes large-sized inevitably.

Also, according to the focusing method for moving the first lens group, a refracting power of the first lens group may be positive in one case and negative in the other.

When the refracting power of the first lens group is positive, an angle of the oblique chief ray (the ray passing through the center of the stop) exiting from the first lens group and the optical axis is larger than an angle of the oblique chief ray entering the first lens group and the optical axis, as shown in FIG. 1A. Accordingly, when the first lens group is moved to the direction of the object for focusing, a necessary effective diameter of the first lens group is extremely increased.

On the other hand, when the refracting power of the first lens group is negative, an angle of the oblique chief ray (the ray passing through the center of the stop) exiting from the first lens group and the optical axis is smaller than an angle of the oblique chief ray entering the first lens group and the optical axis, as shown in FIG. 1B. Accordingly, the necessary effective diameter of the first lens group is not so much increased even when the first lens group is moved to the direction of the object for focusing.

For this reason, when a movement amount of the first lens group becomes large for performing an extreme close photographing, it is desirable that the refracting power of the first lens group should be negative.

However, according to a zoom lens in which the refracting power of the first lens group is negative, the total length of the zoom lens is liable to be large with respect to a focal length of the zoom lens. Therefore, when the first lens group having a negative refracting power is employed in such zoom lens having a larger focal length, the total length of the lens system increases which is not practical in some cases.

When a macro photographing, which is an aspect of the present invention, is conducted, a larger working distance (distance from an object to be photographed to the tip end of the zoom lens) is practically advantageous. In order to secure a sufficient working distance, a larger focal length is desirable.

Then, the zoom lens capable of extreme close photography of the present invention is arranged, as shown in FIG. 1C, in such a manner that the refracting power of the first lens group is positive so as to reduce the total length of the lens system and secure the working distance simultaneously, the first lens group is composed of a negative 1-1 lens group and a positive 1-2 lens group, and only the 1-1 lens group is moved to the object direction so as to effect focusing.

There are some kind of zoom lenses in which the first lens group is moved for zooming and another in which the first lens group is not moved for zooming. With a zoom lens in which the first lens is moved for zooming, when the zooming is performed at extreme close focusing state, a distance from the object to the tip end of the zoom lens is changed, and the image plane deviates. Then, in the zoom lens capable of extreme close photography of the present invention, the first lens group is arranged to be fixed in zooming.

The present invention, in one of its aspects, is to realize a zoom lens suitable for obtaining a comparatively large focal length by using a first lens group having the above-mentioned characteristics. More specifically, the present invention provides a zoom lens which has a first lens group having a positive refracting power, a second lens group having a negative refracting power and a third lens group having a positive refracting power in the named order from the object, wherein the first lens group has a 1-1 lens group having a negative refracting power and a 1-2 lens group having a positive refracting power in the named order from the object side, zooming from a wide angle end to a telephoto end is effected by enlarging a gap between the first lens group and the second lens group and reducing a gap between the second lens group and the third lens group while fixing the first lens group, focusing from infinity to near is effected by moving the 1-1 lens group to the object direction, and the following condition is satisfied when fw is a focal length of the total system in a state that an object at infinity is focused at the wide angle end, and f1 is a focal length of the first lens group in a state that the object at infinity is focused:

$$0.5 < f1/fw < 2.0 \tag{1}.$$

The condition (1) presents an appropriate range for the focal length of the first lens group in a state that an object at infinity is focused. Above the upper limit of the condition (1), the total length of the zoom lens becomes larger. Conversely, below the lower limit of the condition (1), the positive refracting power of the 1-2 lens group when the first lens group is divided into the negative 1-1 lens group and the positive 1-2 lens group becomes large so that a spherical aberration and a chromatic aberration generated in the 1-2 lens group increase undesirably.

In the present invention, it is preferable when $f_{1-1}$ is the focal length of the 1-1 lens group, the following condition should be satisfied:

$$0.5 < |f_{1-1}/fw| < 2.0 \tag{2}.$$

The condition (2) presents an appropriate range for the focal length of the 1-1 lens group. Above the upper limit of the condition (2), a movement amount of the 1-1 lens group required for focusing is increased so that the total length of the zoom lens becomes larger. Conversely, below the lower limit of the condition (2), the negative refracting power of the 1-1 lens group becomes great and the positive refracting power of the 1-2 lens group is also increased so that it is difficult to correct aberrations including a spherical aberration and a chromatic aberration, and further fluctuations in the aberrations in focusing are increased.

Also, in the present invention, it is preferable when $f_{1-2}$ is the focal length of the 1-2 lens group, the following condition should be satisfied:

$$0.25 < f_{1-2}/fw < 1.5 \tag{3}.$$

The condition (3) presents an appropriate range for the focal length of the 1-2 lens group. Above the upper limit of the condition (3), the total length of the zoom lens becomes larger. Conversely, below the lower limit of the condition (3), the positive refracting power of the 1-2 lens group becomes great so that it is difficult to correct the spherical aberration and the chromatic aberration.

Also, in the present invention, it is preferable when Z2 is β2T/β2W, Z3 is β3T/β3W, β2T is an imaging magnification of the second lens group at an telephoto end, β2W is an imaging magnification of the second lens group at a wide angle end, β3T is an imaging magnification of the third lens group at the telephoto end, and β3W is an imaging magnification of the third lens group at the wide angle end, the following condition should be satisfied:

$$0.6 < Z2/Z3 < 2.0 \tag{4}.$$

The condition (4) presents an appropriate range for a variable magnification effect ratio to be born by the second and third lens groups. Above the upper limit of the condition (4), the magnification change effect born by the second lens group becomes large so that fluctuations in the aberrations in zooming are increased. Conversely, below the lower limit of the condition (4), the magnification change effect of the third lens group becomes larger so that it is difficult to maintain the total length of the zoom lens to be the same and it is also difficult to make the f-number of the lens at the telephoto end fast.

Also, in the present invention, it is preferable when f2 is the focal length of the second lens group, the following condition should be satisfied:

$$0.25 < |f2/f1| < 0.7 \tag{5}.$$

The condition (5) presents an appropriate range for the focal length of the second lens group. Below the lower limit of the condition (5), the refracting power of the second lens group becomes greater and fluctuations in the aberrations in zooming are increased. Conversely, above the upper limit of the condition (5), the variable magnification change effect of the second lens group becomes smaller so that it is difficult to obtain a high zoom ratio.

Also, in the present invention, the third lens group may be fixed or may be moved to the object side or the image side so long that a gap between the second lens group and the third lens group can be reduced in zooming. However, it is preferable for making ratio of the variable magnification effect born by the second lens group and the third lens group to be appropriate that the third lens group should be disposed as being movable and is moved in such a manner that the position of the third lens group at the telephoto end is closer to the object than the position at the wide angle end.

Note that a gap which is changeable in zooming may be arranged amid the second lens group or the third lens group so as to correct fluctuations in the aberrations in zooming more satisfactorily.

Moreover, in order to achieve the above object, according to the present invention, there is provided a zoom lens capable of extreme close photographing, which comprises a first lens group G1 having a positive refracting power and at least two lens groups disposed on the image side of the first lens group G1, in which the focal length of the total lens system is varied by changing at least two air gaps between the lens groups, the first lens group G1 has a 1-1 lens group G11 with a negative refracting power and a 1-2 lens group G12 with a positive refracting power in the named order from the object, focusing is effected from an object at infinity to an object at a close distance by moving the 1-1 lens group G11 to the object side, and the following condition is satisfied when the focal length of the 1-1 lens group G11 is f11 and the focal length of the total lens system in an infinite in-focus state at the wide angle end is fw:

$$0.8 < |f11|/fw < 1.6.$$

According to a preferable arrangement of the present invention, the 1-1 lens group G11 comprises a front group GF having a positive refracting power and a rear group GR having a negative refracting power in the named order from the object, and the following condition is satisfied when a focal length of the front group GF is fF and the focal length of the 1-1 lens group G11 is f11:

$$0.9 < fF/|f11| < 1.9.$$

For zoom lenses, the focusing method of moving the first lens group located closest to the object side when an object at a close distance is focused is generally employed. However, when the first lens group has a positive refracting power, if focusing from infinity to an extreme close object distance is attempted by this method, the necessary effective diameter of the first lens group is extremely increased to be unpractical.

Therefore, the present invention employs an arrangement that the first lens group G1 with the positive refracting power has the 1-1 lens group G11 with the negative retracting power and the 1-2 lens group G12 with the positive refracting power, and focusing of an object at a close distance is effected by moving only the 1-1 lens group G11 with the negative refracting power to the object side.

In such an arrangement of the present invention, the following condition (6) is satisfied when f11 is the focal length of the 1-1 lens group G11, and fw is the focal length of the total lens system in an infinite in-focus state at the wide angle end, in order to suppress fluctuations in the aberrations caused by focusing and to reduce a movement amount (focusing moving amount) of the 1-1 lens group G11 for effecting focusing:

$$0.8 < |f11|/fw < 1.6 \qquad (6).$$

The condition (6) stipulates an appropriate range for the focal length of the 1-1 lens group G11.

Above the upper limit of the condition (6), the focusing movement amount of the 1-1 lens group G11 becomes large and the total lens length (a distance between the lens surface closest to the object and the image surface along the optical axis) is increased.

Conversely, below the lower limit of the condition (6), the negative refracting power of the 1-1 lens group G11 increases and the positive refracting power of the 1-2 lens group G12 also increases. As a result, it becomes difficult to correct aberrations including a spherical aberration or a chromatic aberration, and further the fluctuations in the aberrations caused by focusing increase.

Also, if the present invention employs an arrangement that the 1-1 lens group G11 has the front group GF with the positive refracting power and the rear group GR with the negative refracting power in the named order from the object side, it is effective for reducing the total length of the lens, and decreasing the effective diameter of the first lens group G1, and it is further effective for reducing a fluctuation in a spherical aberration and coma caused by focusing. Further, in this case, it is preferable when fF is the focal length of the front group GF, to satisfy the following condition (7):

$$0.9 < fF/|f11| < 1.9 \qquad (7).$$

The condition (7) stipulates an appropriate range for the focal length of the front lens group GF in the 1-1 lens group G11.

Above the upper limit of the condition (7), the positive refracting power of the front group GF becomes smaller, so that it is difficult to reduce the total length of the lens and the effective diameter of the first lens group G1. Further, a fluctuation in a spherical aberration and that in a coma caused by focusing become undesirably excessive in this case.

Conversely, below the lower limit of the condition (7), the positive refracting power of the front group GF increases and, together with this, the negative refracting power of the rear group GR also increases. As a result, it is necessary to increase the number of constituent lenses of the front group GF and that of the rear group GR in order to correct aberrations generated in the front group GF and the rear group GR, which is undesirable.

Further, in order to correct aberrations or suppress fluctuations in the spherical aberration and the coma caused by focusing, it is desirable that the front group GF should comprise a negative meniscus lens being convex on the object side and a biconvex lens in the named order from the object side. It is also desirable that the rear group GR should comprise a negative lens having a surface with a larger curvature on the image side, a negative lens having a surface with a larger curvature on the object side, and a positive lens with a larger curvature on the object side in the named order from the object side.

Also, in the present invention, it is desirable that the following conditions (8) and (9) should be satisfied:

$$R'/ft < 4 \qquad (8),$$

and $$ft'/ft < 0.7 \qquad (9),$$

where R' is an axial distance between the object and the image surface when the image magnification at the telephoto end is −0.5, ft is the focal length of the entire lens system in an infinite in-focus state at the telephoto end, and ft' is the focal length of the entire lens system when the image magnification at the telephoto end is −0.5. Note that the axial distance is a distance along the optical axis.

If the conditions (8) and (9) are satisfied, the focal length of the entire lens system is reduced when the 1-1 lens group G11 is moved to the object side at the telephoto end to focus an object at a close distance, whereby the closest object distance can be extremely short.

Also, in the present invention, it is desirable to satisfy the following condition (10):

$$1.05 < TL'/TL < 1.4 \qquad (10),$$

where TL is an axial distance between the surface closest to the object and the image surface in an infinite in-focus state at the telephoto end, and TL' is an axial distance between the surface closest to the object and the image surface when the image magnification at the telephoto end is −0.5.

Above the upper limit of the condition (10), a change in the total length of the lens caused by focusing becomes large, and it becomes undesirably difficult to simplify the constitution of a lens barrel.

Conversely, below the lower limit of the condition (10), a change in the image magnification per unit movement amount of the 1-1 lens group G11, which serves as a focusing lens group, becomes larger so that a higher precision is required for positioning the focusing lens group. For this reason, focusing with a higher precision becomes undesirably difficult both in manual focusing and auto focusing.

In addition, according to the present invention, there is provided a zoom lens which comprises a first lens group G1 having a negative refracting power, a second lens group G2 having a positive refracting power, a third lens group G3 having a negative refracting power, and a fourth lens group G4 having a positive refracting power disposed in the named order from the object side, wherein the focal length is changed from a wide angle end to a telephone end by changing an air gap between the first lens group G1 and the second lens group G2, increasing an air gap between the second lens group G2 and the third lens group G2, and reducing an air gap between the third lens group G3 and the fourth lens group G4, and the following conditions are satisfied when the focal length of the first lens group G1 is f1, the focal length of the entire system at the wide angle end is fw, the axial air gap between the first lens group G1 and the second lens group G2 in a infinity photographing state at the wide angle end is D12W:

$$0.8 < |f1|/fw < 1.6;$$

and $$D12W/fw < 0.1.$$

According to a preferable arrangement of the present invention, the first lens group G1 is fixed or the second lens group G2 is fixed during zooming.

Also, it is preferable to satisfy the following condition when a distance between a position of the first lens group G1 at which it is closest to the image surface and a position of the first lens group G1 at which it is farthest from the image surface along the optical axis is Δ1, and the focal length of the entire system at the wide angle end is fw:

$$\Delta 1/fw < 0.1.$$

Also, according to the present invention, in order to prevent the necessary effective diameter of the first lens group from increasing, there are provided the first lens group G1 having the negative refracting power, the second lens group G2 having the positive refracting power, the third lens group G3 having the negative refracting power, and the fourth lens group G4 having the positive refracting power disposed in the named order from the object side. Then, zooming from the wide angle end to the telephoto end by changing the air gap between the first lens group G1 and the second lens group G2, increasing the air gap between the second lens group G2 and the third lens group G3, and reducing the air gap between the third lens group G3 and the fourth lens group G4. With such arrangement of the present invention, it is rendered possible to reduce the effective diameter of the first lens group G1.

According to the present invention, in addition to the above-mentioned arrangements, the following conditions (11) and (12) are satisfied:

$$0.8 < |f1|/fw < 1.6 \tag{11},$$

and $$D12W/fw < 0.1 \tag{12},$$

where fw is the focal length of the total system at the wide angle end, f1 is the focal length of the first lens group G1, and D12W is the axial air gap between the first lens group and the second lens group G2 in an infinity photographing state at the wide angle end.

The condition (11) relates to the focal length of the first lens group G1. The condition (11) stipulates a condition for making the focusing movement amount to be proper when focusing is effected by the first lens group G1 and for reducing fluctuations in the aberrations caused by the focusing.

Above the upper limit of the condition (11), the refracting power of the first lens group G1 is reduced and the focusing movement amount of the first lens group G1 is increased. As a result, a focusing mechanism of the lens barrel becomes bulky or complicated.

Conversely, below the lower limit of the condition (11), the refracting power of the first lens group G1 is increased and fluctuations in the aberrations including a spherical aberration caused by focusing are increased.

The condition (12) relates to the air gap between the first lens group G1 and the second lens group G2 at the wide angle end, and stipulates a condition for reducing the necessary effective diameter of the first lens group G1.

Above the upper limit of the condition (12), the air gap between the first lens group G1 and the second lens group G2 is increased so that the first lens group G1 becomes extremely larger than the second lens group G2. Further, since the photographing is conducted at an extreme close distance, the necessary effective diameter for the first lens group G1 becomes further larger.

Also, according to the present invention, it is desirable to fix the first lens group G1 or the second lens group G2 during zooming in order to simplify the barrel structure.

Also, a zoom lens, in which the first lens group is largely moved during zooming, is characterized in that an image position is changed when zooming is effected in a state that an object at a close distance is focused, which is a serious problem when extreme close photographing is to be conducted. For this reason, it is most preferable to fix the fist lens group G1 during zooming. In this case, the image position is not changed even when zooming is conducted in a state that an object at a close position is focused.

Also, in the present invention, it is preferable to satisfy the following condition (13) when Δ1 is a distance along the optical axis between a position of the first lens group G1 at which it is closest to the image surface and a position of the first lens group G1 at which it is farthest from the image surface during zooming:

$$\Delta 1/fw < 0.1 \tag{13}.$$

When the first lens group G1 is moved during zooming, if the condition (13) is satisfied, a change of the position of the first lens group G1 caused by zooming is small so that it is possible to reduce a change of the image position even if zooming is conducted when an object at a close distance is focused.

Also, in order to secure a large zoom ratio (a ratio between the focal length at the telephoto end and that at the wide angle end) in the above-mentioned lens constitution, it is preferable to move the third lens group G3 to the image side and the fourth lens group G4 to the object side during zooming from the wide angle end to the telephoto end. Note that a ratio between a movement amount for zooming of the third lens group G3 and that of the fourth lens group G4 may be fixed during zooming, or may be varied according to zooming. If the ratio of a movement amount for zooming is fixed during zooming, the lens barrel constitution can be simplified. Also, if the ratio of the movement amount for zooming is varied according to zooming, fluctuations in the aberrations caused by zooming can be reduced.

BRIEF DESCRIPTION OF THE DRAWINGS

FIG. 2 is a lens constitution drawing according to a first embodiment of the present invention;

FIGS. 3A to 3D are drawings to show aberrations at a wide angle end in an infinity photographing state according to the first embodiment;

FIG. 16 is a lens constitution drawing according to a third embodiment of the present invention;

FIGS. 24A to 24E are drawings to show aberrations at the wide angle end in the infinity photographing state according to the fourth embodiment;

FIGS. 25A to 25E are drawings to show aberrations at the intermediate focal length in the infinity photographing state according to the fourth embodiment;

FIGS. 27A to 27E are drawings to show aberrations at the wide angle end in the extreme close photographing state according to the fourth embodiment;

FIGS. 28A to 28E are drawings to show aberrations at the intermediate focal length in the extreme close photographing state according to the fourth embodiment;

FIGS. 29A to 29E are drawings to show aberrations at the telephoto end in the extreme close photographing state according to the fourth embodiment;

FIGS. 30A to 30E are drawings to show aberrations at the wide angle end in the infinity photographing state according to the fifth embodiment;

FIGS. 31A to 31E are drawings to show aberrations at the intermediate focal length in the infinity photographing state according to the fifth embodiment;

FIGS. 32A to 32E are drawings to show aberrations at the telephoto end in the infinity photographing state according to the fifth embodiment;

FIGS. 33A to 33E are drawings to show aberrations at the wide angle end in the extreme close photographing state according to the fifth embodiment;

FIGS. 34A to 34E are drawings to show aberrations at the intermediate focal length in the extreme close photographing state according to the fifth embodiment;

FIGS. 35A to 35E are drawings to show aberrations at the telephoto end in the extreme close photographing state according to the fifth embodiment;

FIGS. 37A to 37E are drawings to show aberrations at the wide angle end in the infinity photographing state according to the sixth embodiment;

FIGS. 38A to 38E are drawings to show aberrations at the intermediate focal length in the infinity photographing state according to the sixth embodiment;

FIGS. 39A to 39E are drawings to show aberrations at the telephoto end in the infinity photographing state according to the sixth embodiment;

FIGS. 40A to 40E are drawings to show aberrations at the wide angle end in the extreme close photographing state according to the sixth embodiment;

FIGS. 41A to 41E are drawings to show aberrations at the intermediate focal length in the extreme close photographing state according to the sixth embodiment;

FIGS. 42A to 42E are drawings to show aberrations at the telephoto end in the extreme close photographing state according to the sixth embodiment;

FIGS. 46A to 46E are drawings to show aberrations at the telephoto end in a the infinity photographing state according to the seventh embodiment;

FIGS. 47A to 47E are drawings to show aberrations at the wide angle end in the extreme close photographing state according to the seventh embodiment;

FIGS. 48A to 48E are drawings to show aberrations at the intermediate focal length in the extreme close photographing state according to the seventh embodiment;

FIGS. 49A to 49E are drawings to show aberrations at the telephoto end in the extreme close photographing state according to the seventh embodiment;

FIGS. 51A to 51E are drawings to show aberrations at the wide angle end in the infinity photographing state according to the eighth embodiment;

FIGS. 52A to 52E are drawings to show aberrations at the intermediate focal length in the infinity photographing state according to the eighth embodiment;

FIGS. 53A to 53E are drawings to show aberrations at the telephoto end in the infinity photographing state according to the eighth embodiment;

FIGS. 54A to 54E are drawings to show aberrations at the wide angle end in the extreme close photographing state according to the eighth embodiment;

FIGS. 56A to 56E are drawings to show aberrations at the telephoto end in the extreme close photographing state according to the eighth embodiment.

DESCRIPTION OF THE PREFERRED EMBODIMENTS

Figure 1A:
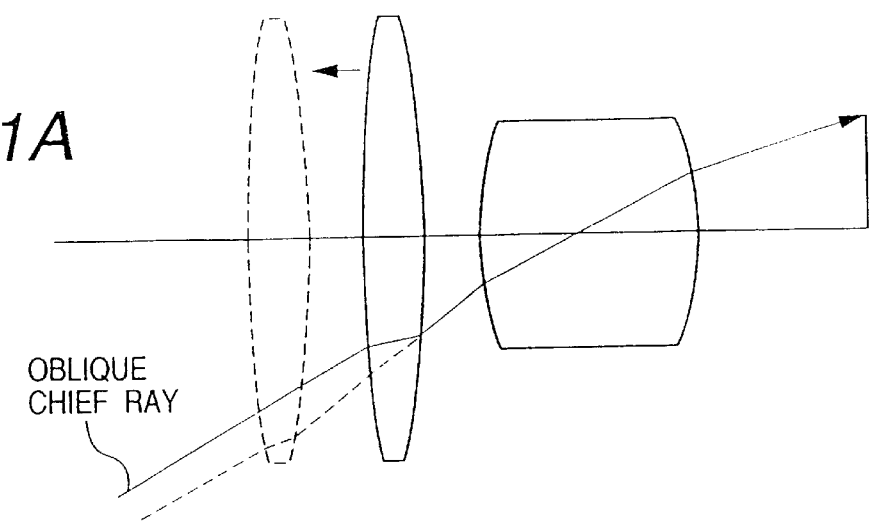
FIGS. 1A to 1C are schematic drawings to explain an effect of the present invention.
Figure 1B:
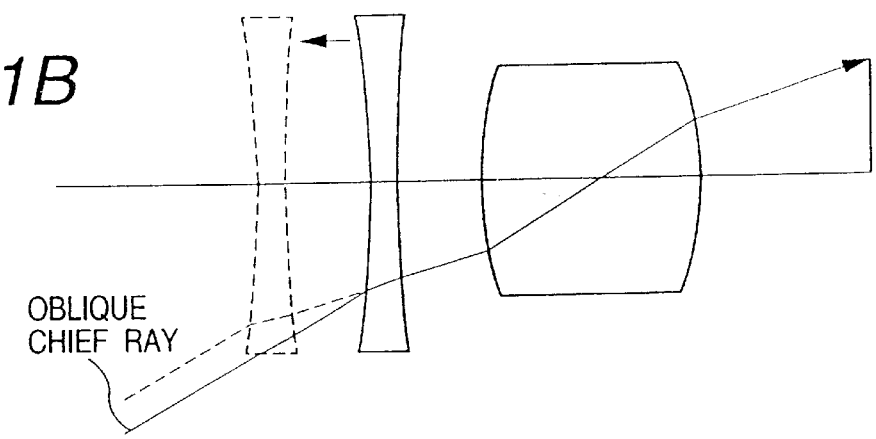
Figure 1C:
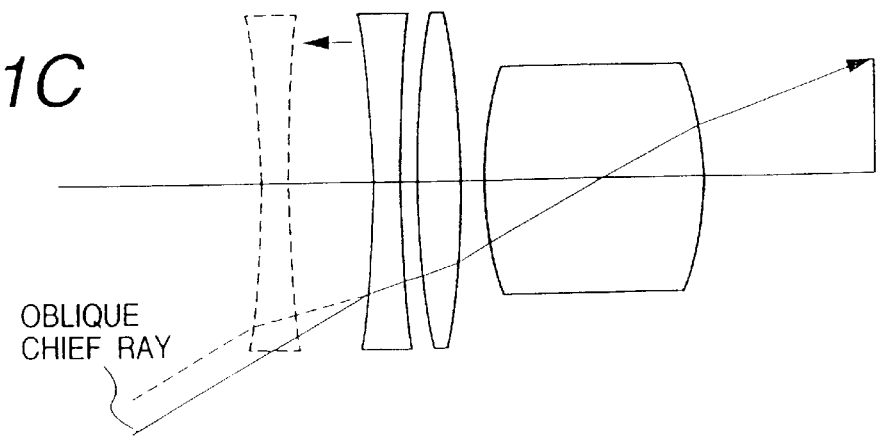
Figure 4A:
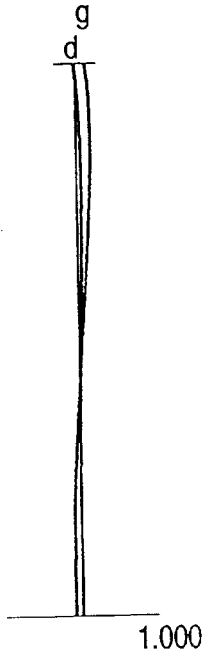
FIGS. 4A to 4D are drawings to show aberrations at an intermediate focal length in the infinity photographing state according to the first embodiment.
Figure 4B:
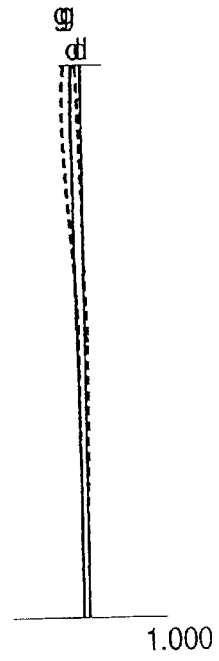
Figure 4C:
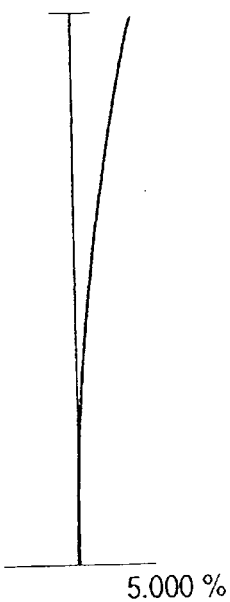
Figure 4D:
Figure 5A:
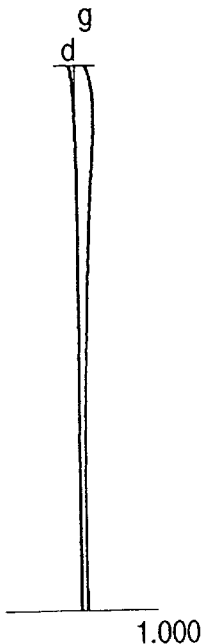
FIGS. 5A to 5D are drawings to show aberrations at the telephoto end in the infinity photographing state according to the first embodiment.
Figure 5B:
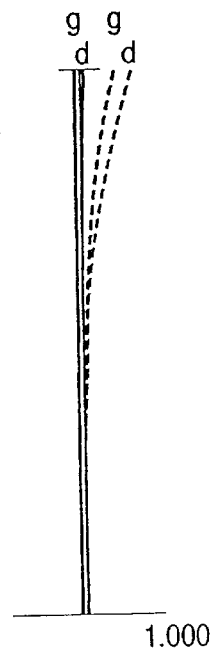
Figure 5C:
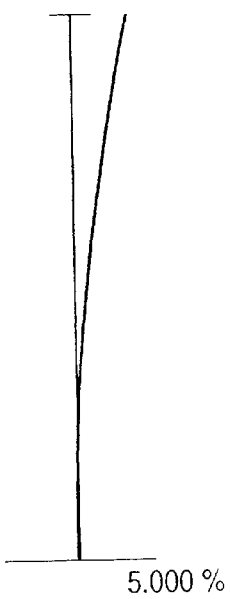
Figure 5D:
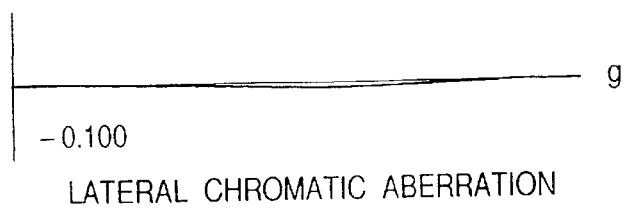
Figure 6A:
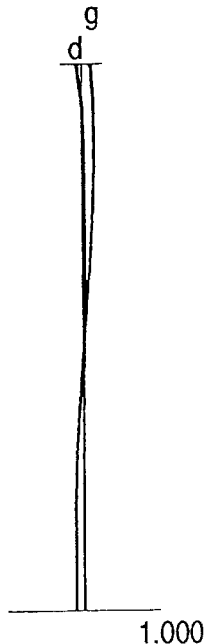
FIGS. 6A to 6D are drawings to show aberrations at the wide angle end in a extreme close photographing state according to the first embodiment.
Figure 6B:
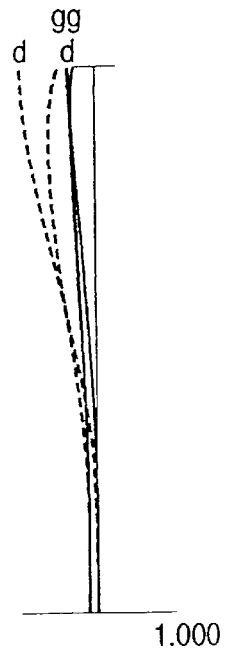
Figure 6C:
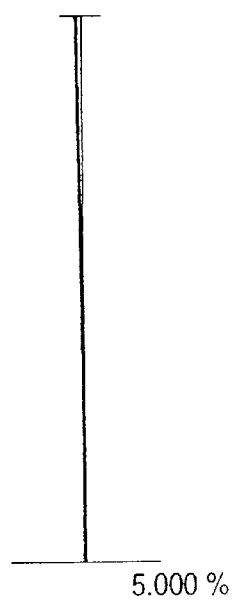
Figure 6D:
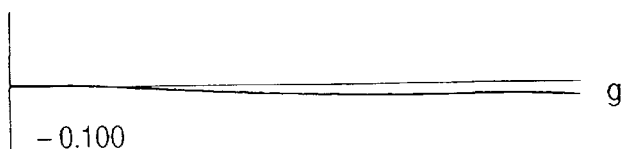
Figure 7A:
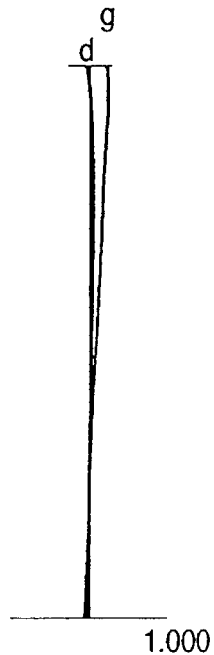
FIGS. 7A to 7D are drawings to show aberrations at the intermediate focal length in the extreme close photographing state according to the first embodiment.
Figure 7B:
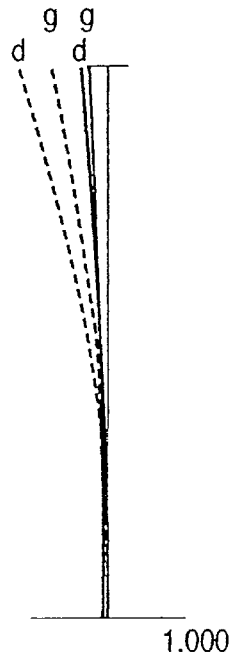
Figure 7C:
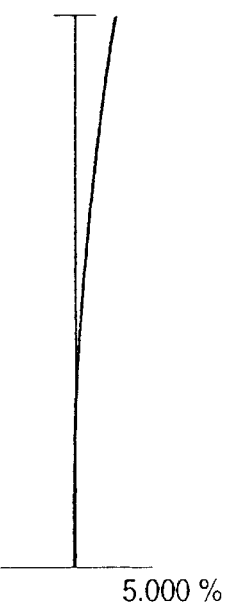
Figure 7D:
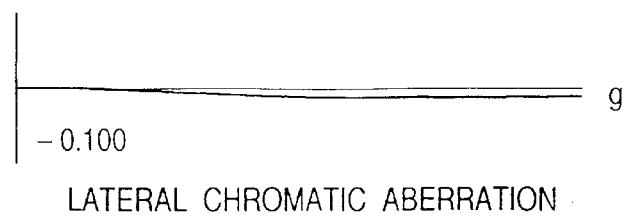
Figure 8A:
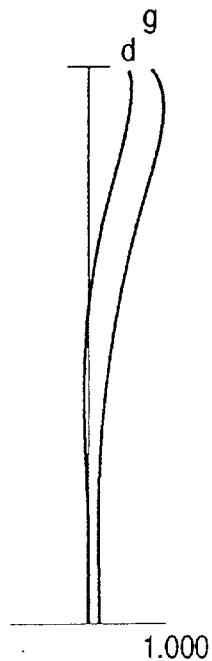
FIGS. 8A to 8D are drawings to show aberrations at the telephoto end in the extreme close photographing state according to the first embodiment.
Figure 8B:
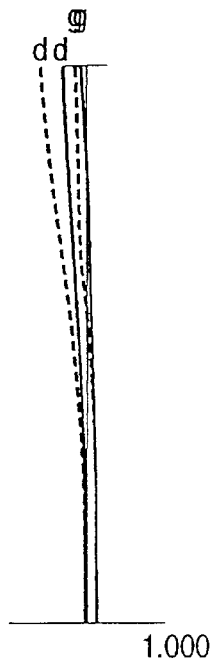
Figure 8C:
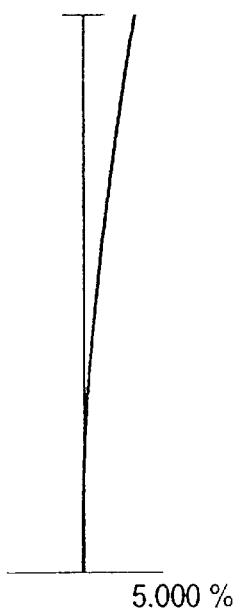
Figure 8D:
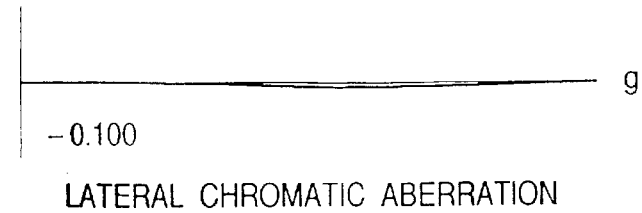
Figure 9:
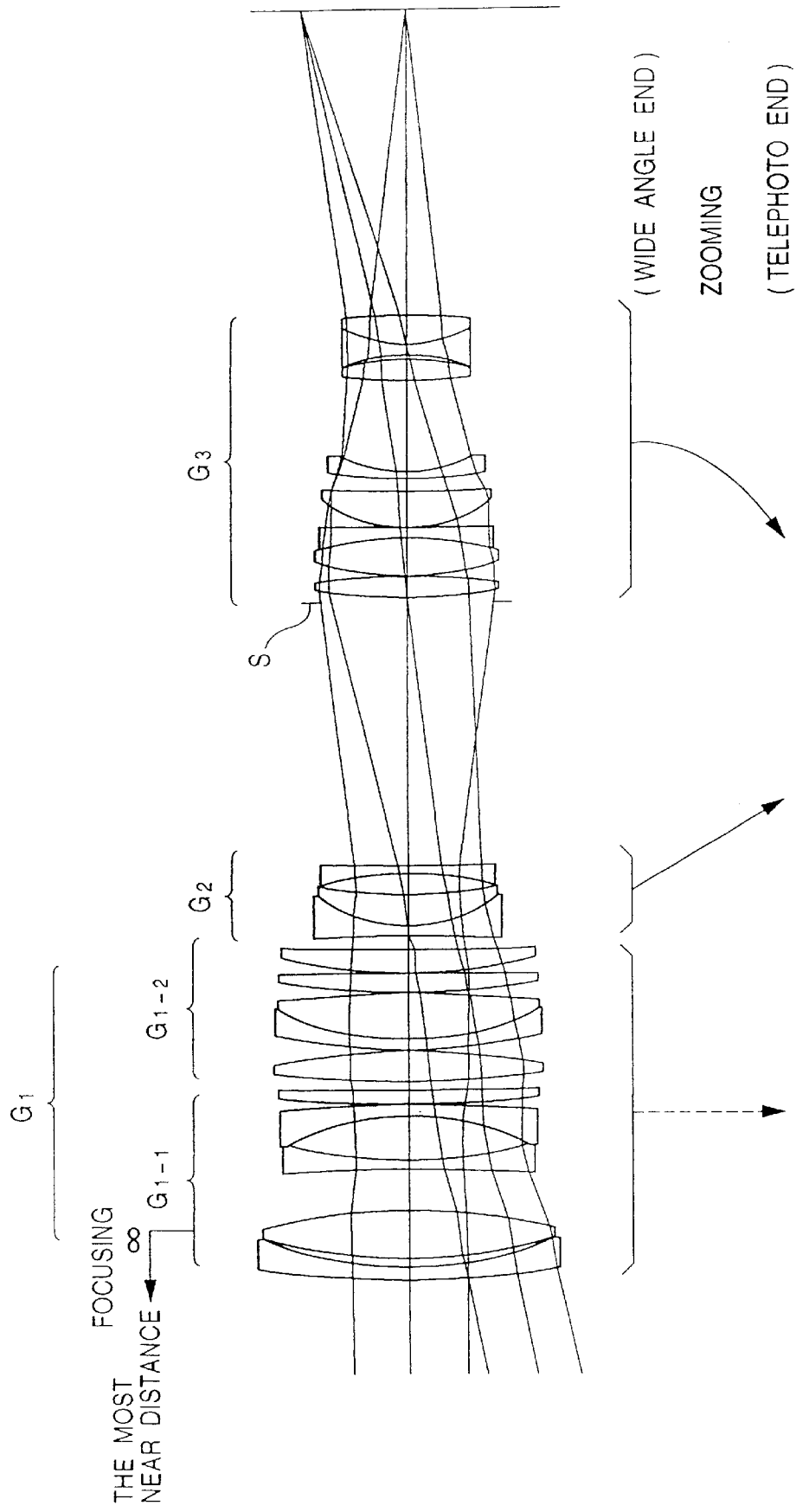
FIG. 9 is a lens constitution drawing according to a second embodiment of the present invention.
Figure 10A:
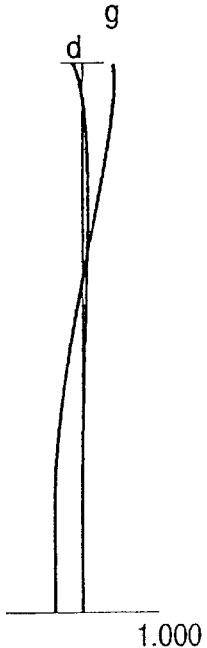
FIGS. 10A to 10D are drawings to show aberrations at the wide angle end in the infinity photographing state according to the second embodiment.
Figure 10B:
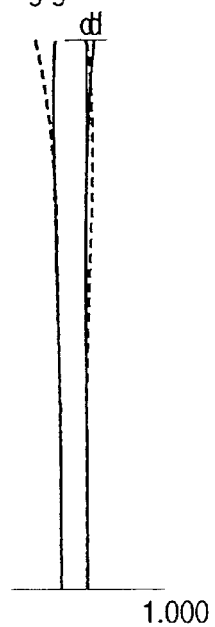
Figure 10C:
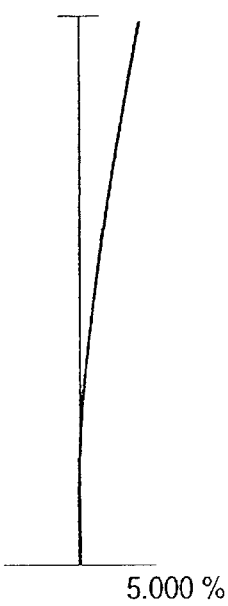
Figure 10D:
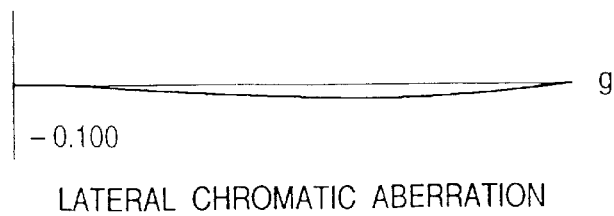
Figure 11A:
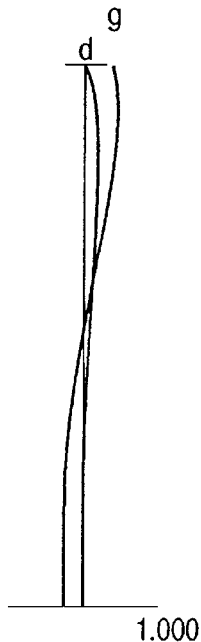
FIGS. 11A to 11D are drawings to show aberrations at the intermediate focal length in the infinity photographing state according to the second embodiment.
Figure 11B:
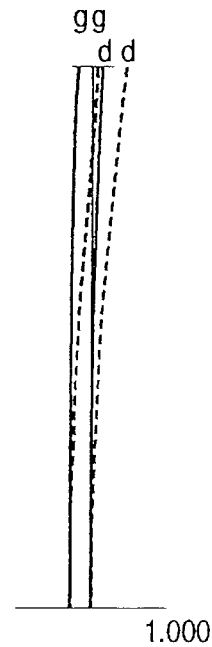
Figure 11C:
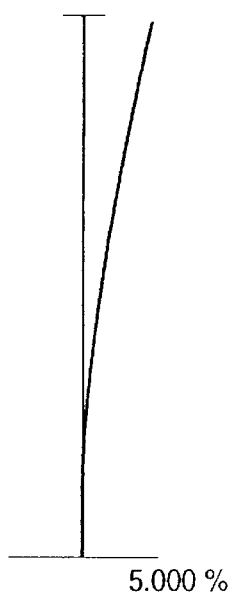
Figure 11D:
Figure 12A:
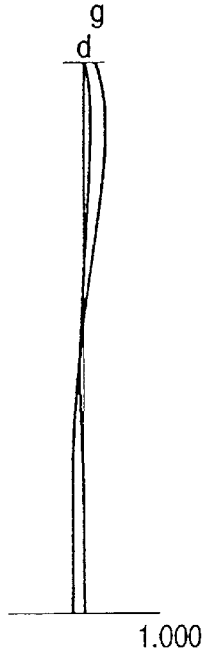
FIGS. 12A to 12D are drawings to show aberrations at the telephoto end in the infinity photographing state according to the second embodiment.
Figure 12B:
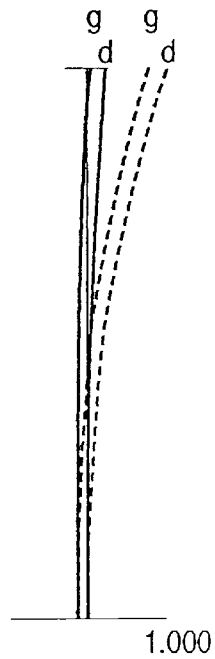
Figure 12C:
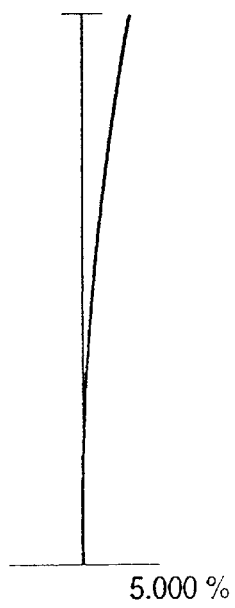
Figure 12D:
Figure 13A:
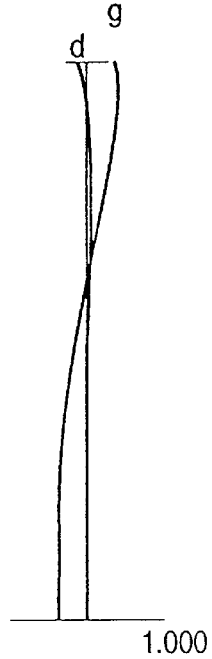
FIGS. 13A to 13D are drawings to show aberrations at the wide angle end in a state of extreme close photography according to the second embodiment.
Figure 13B:
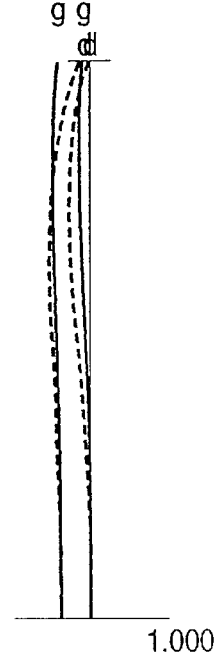
Figure 13C:
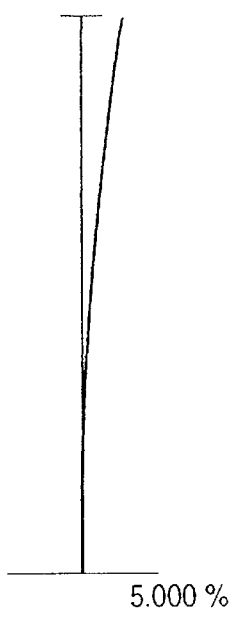
Figure 13D:
Figure 14A:
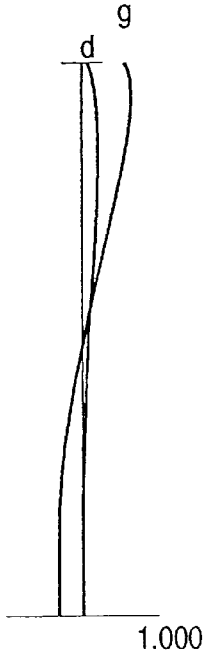
FIGS. 14A to 14D are drawings to show aberrations at the intermediate focal length in the extreme close photographing state according to the second embodiment.
Figure 14B:
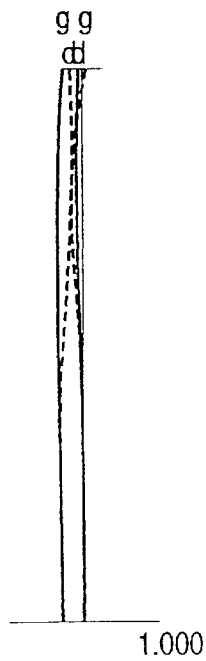
Figure 14C:
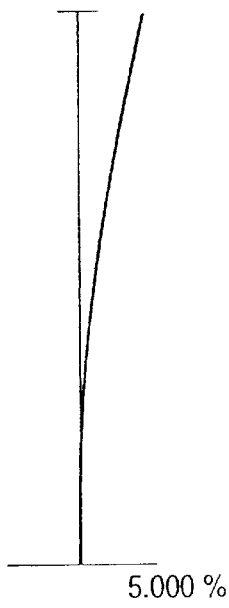
Figure 14D:
Figure 15A:
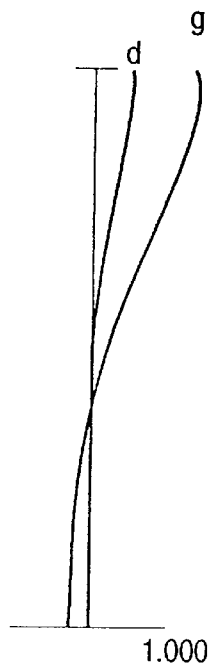
FIGS. 15A to 15D are drawings to show aberrations at the telephoto end in the extreme close photographing state according to the second embodiment.
Figure 15B:
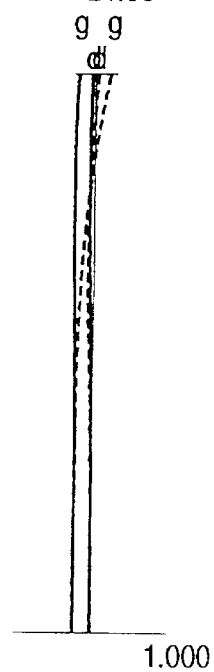
Figure 15C:
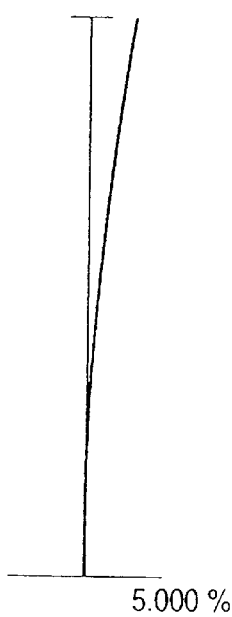
Figure 15D:
Figure 17A:
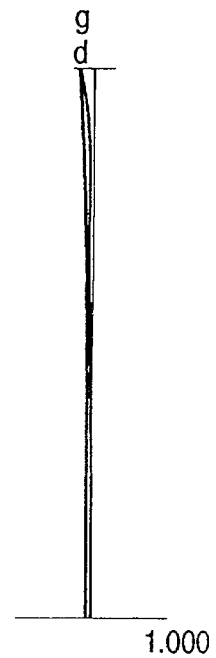
FIGS. 17A to 17D are drawings to show aberrations at the wide angle end in a state of infinity photography according to the third embodiment.
Figure 17B:
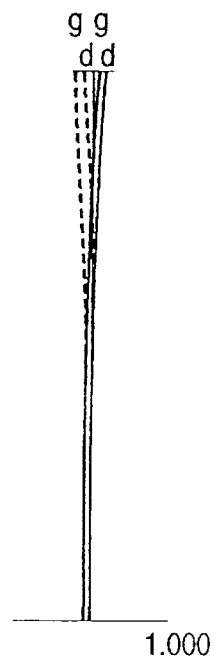
Figure 17C:
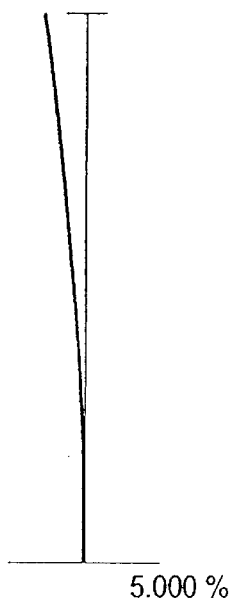
Figure 17D:
Figure 18A:
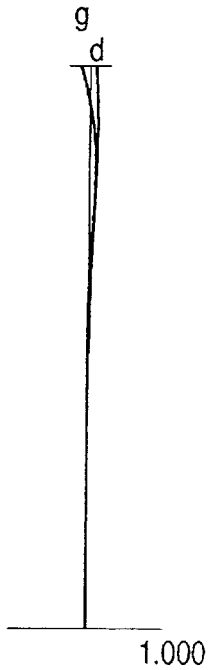
FIGS. 18A to 18D are drawings to show aberrations at the intermediate focal length in the infinity photographing state according to the third embodiment.
Figure 18B:
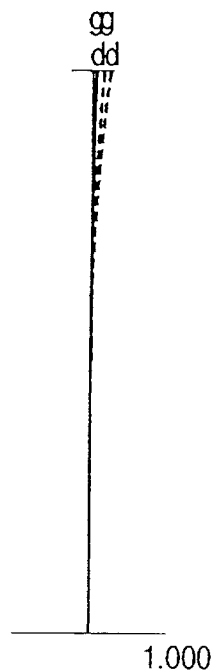
Figure 18C:
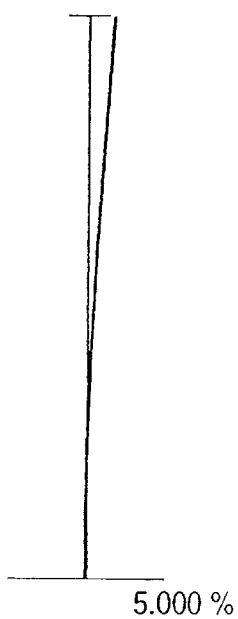
Figure 18D:
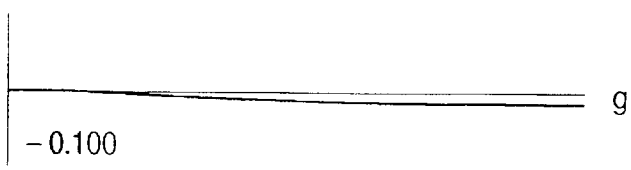
Figure 19A:
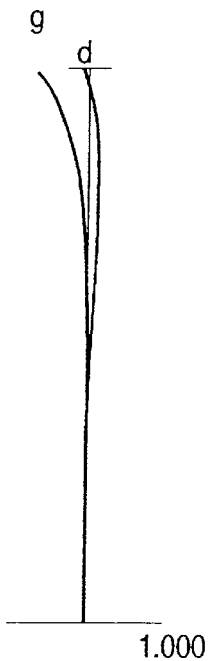
FIGS. 19A to 19D are drawings to show aberrations at the telephoto end in the infinity photographing state according to the third embodiment.
Figure 19B:
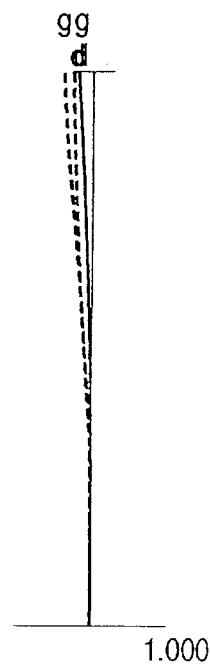
Figure 19C:
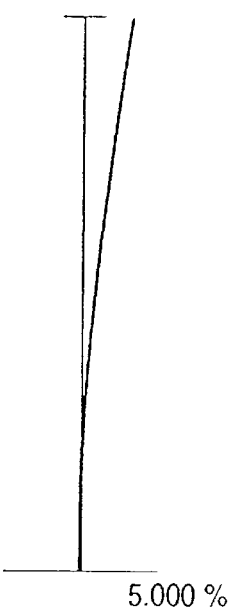
Figure 19D:
Figure 20A:
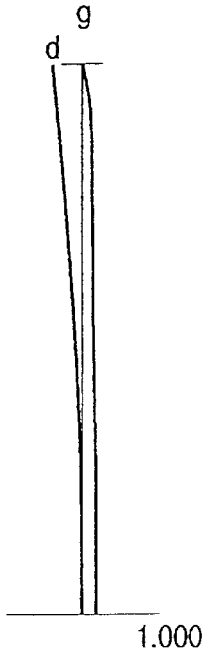
FIGS. 20A to 20D are drawings to show aberrations at the wide angle end in the extreme close photographing state according to the third embodiment.
Figure 20B:
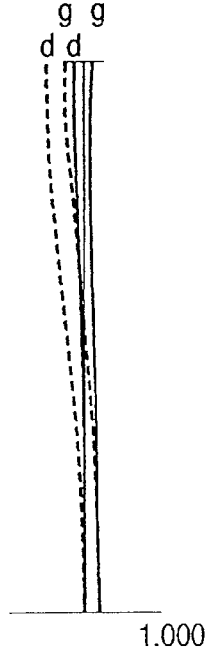
Figure 20C:
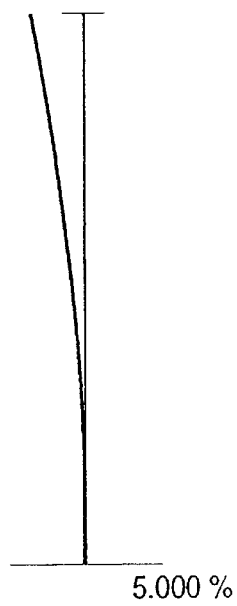
Figure 20D:
Figure 21A:
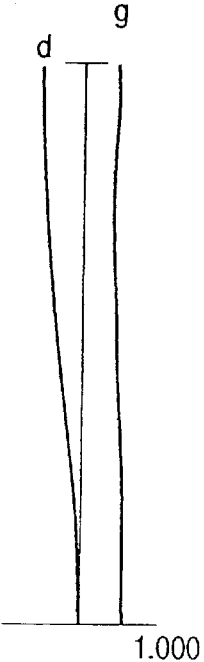
FIGS. 21A to 21D are drawings to show aberrations at the intermediate focal length in the extreme close photographing state according to the third embodiment.
Figure 21B:
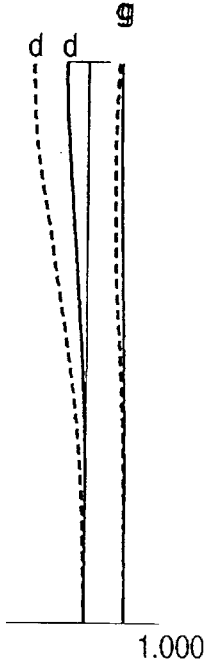
Figure 21C:
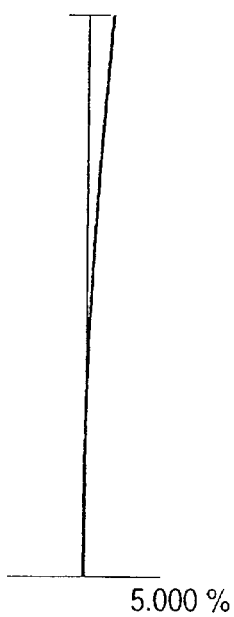
Figure 21D:
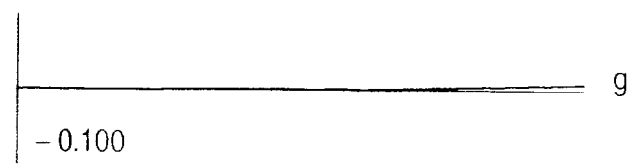
Figure 22A:
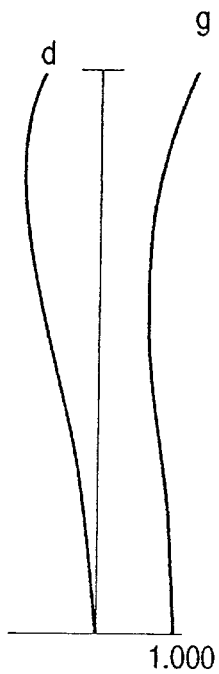
FIGS. 22A to 22D are drawings to show aberrations at the telephoto end in the extreme close photographing state according to the third embodiment.
Figure 22B:
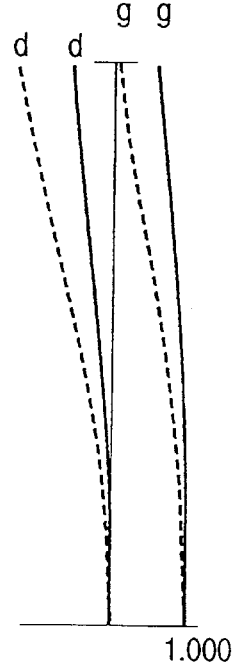
Figure 22C:
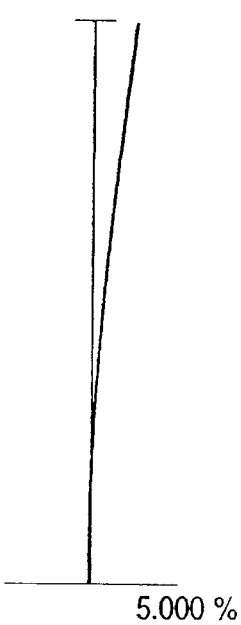
Figure 22D:

Embodiments of the present invention will be described below. FIGS. 2, 9 and 16 respectively show lens constitutions according to the first, second and third embodiments. In each of these embodiments, there are provided a first lens group G1 having a positive refracting power, a second lens group G2 having a negative refracting power, and a third lens group G3 having a positive refracting power, disposed in the named order from the object side, in which the first lens group G1 has a 1-1 lens group G1-1 having a negative refracting power and a 1-2 lens group G1-2 having a positive refracting power in the named order from the object side.

Zooming from a wide angle end to a telephoto end is effected by enlarging a gap between the first lens group G1 and the second lens group G2 and reducing a gap between the second lens group G2 and the third lens group G3, in a state that the first lens group G1 is fixed. Also, focusing from infinity to near is effected by moving the 1-1 lens group G1-1 to the object direction.

Tables 1, 2 and 3 below respectively show specific values of the first, second and third embodiments. In the "Total System Specific Values", f represents a focal length, F an f-number, and $2\omega$a field angle. In the "Lens Specific Values", the first column includes lens surface numbers in the order from the object side, r in the second column represents a radius of curvature of lens surface, d in the third column a lens surface separation, $\nu$ in the fourth column an Abbe's number which is a value for a d-line ($\lambda$=587.6 nm), n in the fifth column a refractive index for the d-line, and the sixth column includes the lens group numbers. In the "Lens Specific Values" and the "Zooming Data", B.f. represents a back focus. In the "Zooming Data for Extreme close Photographing", $\beta$ represents a photographing magnification.

In the following Table 4, values for parameters in each of the conditions for each of the embodiments.

TABLE 1

[Total System Specific Values]
f = 82.40 ~ 105.00 ~ 194.00
F/4.00
$2\omega$ = 28.8 ~ 22.5 ~ 12.3°
[Lens Specific Values]

|   | r | d | $\nu$ | n | |
|---|---|---|---|---|---|
| 1 | 91.5689 | 2.5000 | 23.01 | 1.86074 | $G_{1-1}$ |
| 2 | 54.6088 | 4.4623 | | | |
| 3 | 125.2484 | 8.1078 | 25.50 | 1.80458 | $G_{1-1}$ |
| 4 | −114.3868 | 1.4036 | | | |
| 5 | −717.9812 | 1.8000 | 57.53 | 1.67025 | $G_{1-1}$ |
| 6 | 64.8899 | 11.9531 | | | |
| 7 | −48.2282 | 1.8000 | 53.93 | 1.71300 | $G_{1-1}$ |
| 8 | −181.7976 | 0.1000 | | | |
| 9 | 132.4360 | 4.4439 | 50.19 | 1.72000 | $G_{1-1}$ |

TABLE 1-continued

| 10 | 959.6726 | $d_{10}$ | | | |
|---|---|---|---|---|---|
| 11 | 225.8299 | 6.6705 | 46.54 | 1.80411 | $G_{1-2}$ |
| 12 | −142.4932 | 0.1000 | | | |
| 13 | 194.7697 | 1.8000 | 23.01 | 1.86074 | $G_{1-2}$ |
| 14 | 65.8071 | 8.4092 | 82.52 | 1.49782 | $G_{1-2}$ |
| 15 | −855.2567 | 0.1000 | | | |
| 16 | 64.2082 | 7.0404 | 82.52 | 1.49782 | $G_{1-2}$ |
| 17 | 355.4772 | 0.1000 | | | |
| 18 | 108.6708 | 4.4253 | 82.52 | 1.49782 | $G_{1-2}$ |
| 19 | 406.2827 | $d_{19}$ | | | |
| 20 | −182.2134 | 1.8000 | 44.69 | 1.80218 | $G_2$ |
| 21 | 34.7719 | 6.3571 | 23.01 | 1.86074 | $G_2$ |
| 22 | 133.7423 | 2.8713 | | | |
| 23 | −137.7067 | 1.8000 | 46.54 | 1.80411 | $G_2$ |
| 24 | 99.1954 | $d_{24}$ | | | |
| 25 | Stop | 1.0000 | | | |
| 26 | 119.4745 | 5.2877 | 47.07 | 1.67003 | $G_3$ |
| 27 | −127.0264 | 0.1000 | | | |
| 28 | 54.4238 | 8.8922 | 70.41 | 1.48749 | $G_3$ |
| 29 | −71.2730 | 1.8000 | 23.01 | 1.86074 | $G_3$ |
| 30 | 293.7445 | 0.1000 | | | |
| 31 | 30.8625 | 9.4426 | 64.10 | 1.51680 | $G_3$ |
| 32 | 698.0400 | 0.1000 | | | |
| 33 | 29.5818 | 1.8000 | 46.54 | 1.80411 | $G_3$ |
| 34 | 22.8055 | 16.6395 | | | |
| 35 | 332.0543 | 3.7213 | 23.01 | 1.86074 | $G_3$ |
| 36 | −65.3245 | 2.6640 | | | |
| 37 | −28.3332 | 1.8000 | 46.54 | 1.80411 | $G_3$ |
| 38 | 28.8409 | 5.8422 | 35.51 | 1.59507 | $G_3$ |
| 39 | −168.7423 | B.f. | | | |

[Zooming data for infinity photographing]

| | Wide angle end | Intermediate position | Telephoto end |
|---|---|---|---|
| f | 82.3993 | 104.9989 | 193.9946 |
| $d_{10}$ | 2.0000 | 2.0000 | 2.0000 |
| $d_{19}$ | 3.3315 | 14.1165 | 22.4546 |
| $d_{24}$ | 42.4152 | 32.3130 | 3.8086 |
| B.f. | 50.0184 | 49.3354 | 69.4997 |

[Zooming data for extreme close photographing]
(Photographing distance R = 361.000)

| | | | |
|---|---|---|---|
| $\beta$ | −0.4247 | −0.5411 | −0.9998 |
| $d_{10}$ | 53.5369 | 53.5369 | 53.5361 |
| $d_{19}$ | 3.3315 | 14.1165 | 22.4546 |
| $d_{24}$ | 42.4152 | 32.3130 | 3.8086 |
| B.f | 50.0184 | 49.3354 | 69.4997 |

TABLE 2

[Total system specific values]
f = 103.00 ~ 180.00 ~ 291.00
F/4.42 ~ 4.87 ~ 5.75
$2\omega$ = 22.9 ~ 13.2 ~ 8.3°
[Lens specific values]

|   | r | d | $\nu$ | n | |
|---|---|---|---|---|---|
| 1 | 202.3833 | 2.5000 | 23.01 | 1.86074 | $G_{1-1}$ |
| 2 | 74.7234 | 2.0616 | | | |
| 3 | 103.7676 | 10.1010 | 28.19 | 1.74000 | $G_{1-1}$ |
| 4 | −117.3133 | 8.5700 | | | |
| 5 | −416.6663 | 1.8000 | 57.53 | 1.67025 | $G_{1-1}$ |
| 6 | 100.7133 | 9.3818 | | | |
| 7 | −54.6651 | 1.8000 | 53.93 | 1.71300 | $G_{1-1}$ |
| 8 | −786.3826 | 0.1000 | | | |
| 9 | 204.0600 | 3.3528 | 23.01 | 1.86074 | $G_{1-1}$ |
| 10 | 892.5335 | $d_{10}$ | | | |
| 11 | 227.4791 | 6.6286 | 46.54 | 1.80411 | $G_{1-2}$ |
| 12 | −130.5874 | 0.1000 | | | |
| 13 | 127.5199 | 1.8000 | 23.01 | 1.86074 | $G_{1-2}$ |
| 14 | 56.3193 | 9.8744 | 82.52 | 1.49782 | $G_{1-2}$ |
| 15 | −331.0902 | 0.1000 | | | |

TABLE 2-continued

| | | | | | |
|---|---|---|---|---|---|
| 16 | 144.6848 | 4.4213 | 82.52 | 1.49782 | $G_{1-2}$ |
| 17 | 7715.2325 | 0.1000 | | | |
| 18 | 113.8541 | 4.6776 | 82.52 | 1.49782 | $G_{1-2}$ |
| 19 | 1014.1073 | $d_{19}$ | | | |
| 20 | −270.8368 | 1.8000 | 39.61 | 1.80454 | $G_2$ |
| 21 | 28.8260 | 6.5396 | 23.01 | 1.86074 | $G_2$ |
| 22 | 90.5561 | 3.7961 | | | |
| 23 | −88.4184 | 1.8000 | 46.54 | 1.80411 | $G_2$ |
| 24 | 391.6283 | $d_{24}$ | | | |
| 25 | Stop | 1.0000 | | | |
| 26 | 119.7663 | 4.6332 | 45.00 | 1.74400 | $G_3$ |
| 27 | −148.0246 | 0.1000 | | | |
| 28 | 54.6985 | 7.7566 | 70.41 | 1.48749 | G3 |
| 29 | −63.6645 | 1.8000 | 23.01 | 1.86074 | G3 |
| 30 | 437.2122 | 0.1000 | | | |
| 31 | 27.3174 | 7.7335 | 51.66 | 1.52944 | G3 |
| 32 | 401.5286 | 2.1415 | | | |
| 33 | 65.8655 | 1.8000 | 46.54 | 1.80411 | G3 |
| 34 | 28.8881 | 18.7121 | | | |
| 35 | 129.1625 | 4.0621 | 25.48 | 1.73038 | G3 |
| 36 | −50.1532 | 1.6282 | | | |
| 37 | −26.5763 | 1.8000 | 46.54 | 1.80411 | G3 |
| 38 | 25.0964 | 5.7247 | 35.51 | 1.59507 | G3 |
| 39 | −158.4348 | B.f. | | | |

[Zooming data for infinity photographing]

| | Wide angle end | Intermediate position | Telephoto end |
|---|---|---|---|
| f | 103.0000 | 180.0000 | 294.0003 |
| $d_{10}$ | 2.0000 | 2.0000 | 2.0000 |
| $d_{19}$ | 2.8628 | 20.3587 | 27.8294 |
| $d_{24}$ | 54.7331 | 28.0038 | 2.4114 |
| B.f. | 64.1501 | 73.3835 | 91.5054 |

[Zooming data for extreme close photographing]
(Photographing distance R = 456.500)

| | | | |
|---|---|---|---|
| β | −0.3539 | −0.6185 | −0.9999 |
| $d_{10}$ | 36.3604 | 36.3604 | 36.3604 |
| $d_{19}$ | 2.8628 | 20.3587 | 27.8294 |
| $d_{24}$ | 54.7331 | 28.0038 | 2.4114 |
| B.f | 64.1501 | 73.3835 | 91.5054 |

TABLE 3

[Total system specific values]
f = 70.00 ~ 105.00 ~ 140.00
F/4.64 ~ 4.91 ~ 5.48
2ω = 35.0 ~ 22.9 ~ 17.1°
[Lens specific values]

| | r | d | ν | n | |
|---|---|---|---|---|---|
| 1 | 82.6447 | 2.0000 | 49.45 | 1.77279 | $G_{1-1}$ |
| 2 | 36.9605 | 8.6887 | | | |
| 3 | −138.6274 | 1.8000 | 60.03 | 1.64000 | $G_{1-1}$ |
| 4 | 151.8914 | 2.6551 | | | |
| 5 | 61.5613 | 4.7043 | 25.50 | 1.80458 | $G_{1-1}$ |
| 6 | 167.3722 | $d_6$ | | | |
| 7 | 74.5810 | 5.2300 | 60.03 | 1.64000 | $G_{1-2}$ |
| 8 | −422.1466 | 0.1000 | | | |
| 9 | 65.5006 | 1.8000 | 25.80 | 1.78472 | $G_{1-2}$ |
| 10 | 29.2835 | 7.6202 | 60.03 | 1.64000 | $G_{1-2}$ |
| 11 | 195.1004 | 0.2000 | | | |
| 12 | 59.9530 | 3.5978 | 70.41 | 1.48749 | $G_{1-2}$ |
| 13 | 143.2392 | $d_{13}$ | | | |
| 14 | 537.9466 | 1.4000 | 39.61 | 1.80454 | $G_2$ |
| 15 | 18.8956 | 6.8087 | 25.50 | 1.80458 | $G_2$ |
| 16 | 242.2438 | 4.2297 | | | |
| 17 | −81.0401 | 1.4000 | 33.89 | 1.80384 | $G_2$ |
| 18 | 64.1056 | $d_{18}$ | | | |
| 19 | Stop | 1.0000 | | | |
| 20 | 38.3674 | 3.9686 | 49.45 | 1.77279 | $G_3$ |
| 21 | −155.0001 | 2.2159 | | | |
| 22 | 51.6311 | 4.7267 | 64.10 | 1.51680 | $G_3$ |
| 23 | −30.1463 | 1.4000 | 28.56 | 1.79504 | $G_3$ |
| 24 | 22.2304 | 0.1172 | | | |
| 25 | 21.8052 | 4.9612 | 70.41 | 1.48749 | $G_3$ |
| 26 | −135.3967 | 5.0107 | | | |
| 27 | 48.0149 | 4.7230 | 23.01 | 1.86074 | $G_3$ |
| 28 | −47.6948 | 4.2264 | | | |
| 29 | −32.3971 | 1.4000 | 46.54 | 1.80411 | $G_3$ |
| 30 | 37.9077 | B.f. | | | |

[Zooming data for infinity photographing]

| | Wide angle end | Intermediate position | Telephoto end |
|---|---|---|---|
| f | 70.0000 | 105.0000 | 140.0000 |
| $d_6$ | 2.0000 | 2.0000 | 2.0000 |
| $d_{13}$ | 2.5929 | 15.2800 | 18.7705 |
| $d_{18}$ | 32.1834 | 15.2340 | 2.8260 |
| B.f. | 55.1376 | 59.3998 | 68.3173 |

[Zooming data for extreme close distance]
(Photographing distance R = 283.900)

| | | | |
|---|---|---|---|
| β | −0.5003 | −0.7504 | −1.0005 |
| $d_6$ | 56.0923 | 56.0923 | 56.0923 |
| $d_{13}$ | 2.5929 | 15.2800 | 18.7705 |
| $d_{18}$ | 32.1834 | 15.2340 | 2.8260 |
| B.f | 55.1376 | 59.3998 | 68.3173 |

TABLE 4

| embodiment No. | 1 | 2 | 3 |
|---|---|---|---|
| (1) $f_1/f_w$ | 1.138 | 1.041 | 1.305 |
| (2) $\|f_{1-1}/f_w\|$ | 1.214 | 0.971 | 1.243 |
| (3) $f_{1-2}/f_w$ | 0.691 | 0.546 | 0.775 |
| (4) $Z_2/Z_3$ | 1.186 | 1.335 | 1.126 |
| (5) $\|f_2/f_1\|$ | 0.447 | 0.418 | 0.449 |

FIGS. 3A to 5D respectively show aberrations at the wide angle end, intermediate focal length, and telephoto end in the infinity photographing state according to the first embodiment, and FIGS. 6A to 8D respectively show aberrations at the wide angle end, intermediate focal length, and telephoto end in the extreme close photographing state according to the first embodiment. Also, FIGS. 10A to 12D respectively show aberrations at the wide angle end, intermediate focal length, and telephoto end in the infinity photographing state according to the second embodiment, and FIGS. 13A to 15D respectively show aberrations at the wide angle end, intermediate focal length, and telephoto end in the extreme close photographing state according to the second embodiment. Also, FIGS. 17A to 19D respectively show aberrations at the wide angle end, intermediate focal length, and telephoto end in the infinity photographing state according the third embodiment, and FIGS. 20A to 22D respectively show aberrations at the wide angle end, intermediate focal length, and telephoto end in the extreme close photographing state according to the third embodiment.

In either of the drawings of aberrations, Fno represents an f-number, NA a numerical aperture, Y an image height, d a d-line (λ=587.6 nm), and g a g-line (λ=435.6 nm). In the drawings of astigmatism, each solid line represents a sagittal image surface, and a broken line represents a meridional image surface, respectively.

From the above-mentioned drawings, it is clearly seen that the aberrations are satisfactorily corrected in each of the first to third embodiments so as to render an excellent image formation performance.

Further, the fourth to sixth embodiments of the present invention will be explained with reference to the attached drawings.

Figure 23:
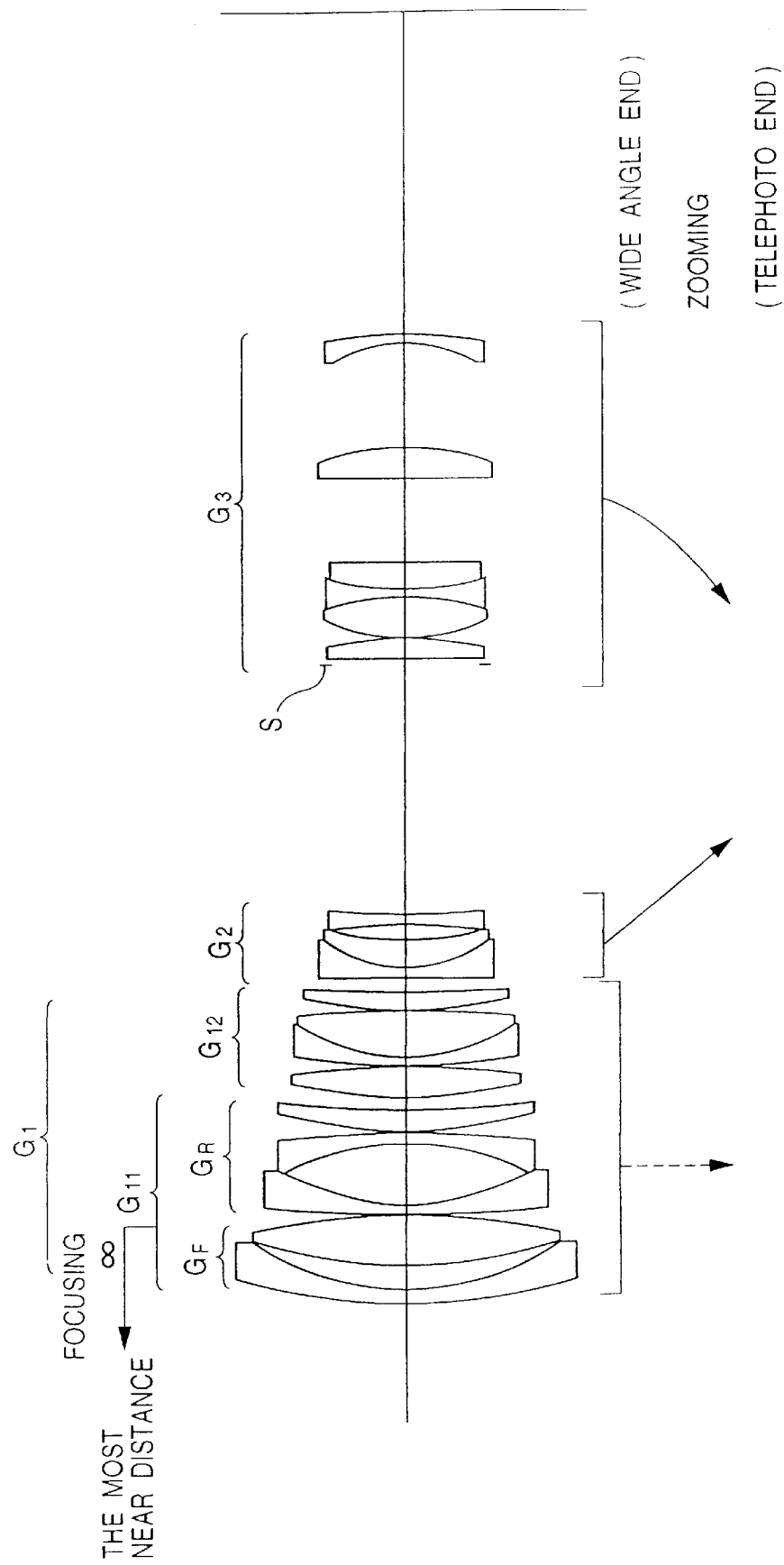
FIG. 23 is a drawing to show the constitution of a zoom lens according to fourth and fifth embodiments of the present invention.
Figures 26A, 26B, 26C:
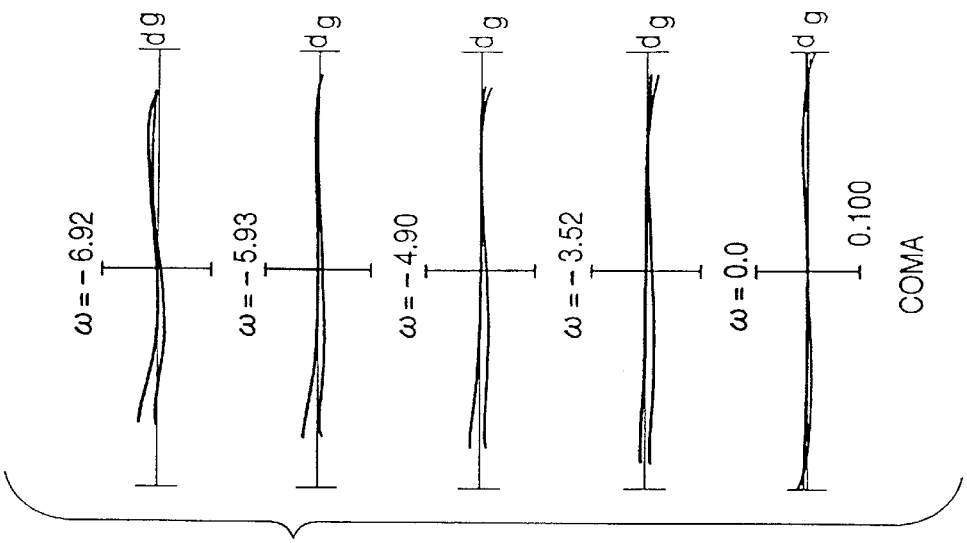
FIGS. 26A to 26E are drawings to show aberrations at the telephoto end in the infinity photographing state according to the fourth embodiment.
Figure 26D:
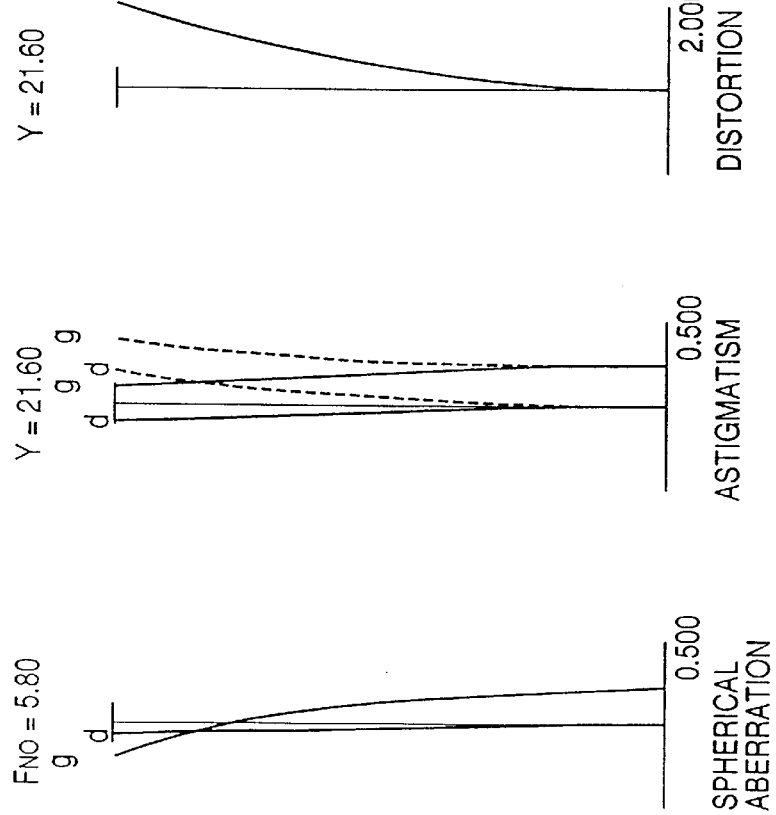
Figure 26E:
Figure 36:
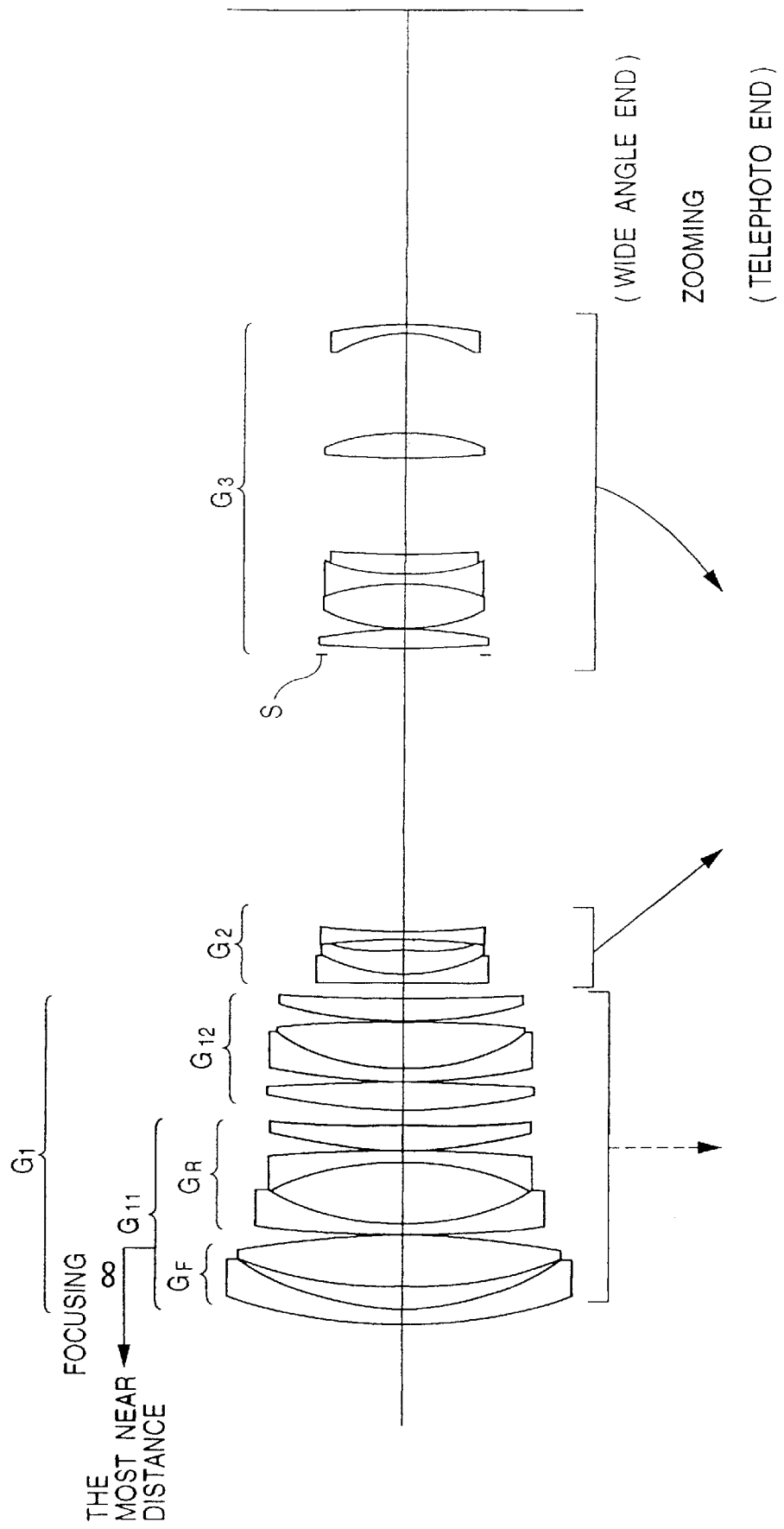
FIG. 36 is a drawing to show the constitution of a zoom lens according to a sixth embodiment of the present invention.

In each of FIGS. 23 and 36, a zoom lens of the present invention which is capable of extreme close photographing is provided with a first lens group G1 having a positive refracting power, a second lens group G2 having a negative refracting power, and a third lens group G3 having a positive refracting power in the named order from the object side. Then, the focal length is changed from a wide angle end to a telephoto end by enlarging an air gap between the first lens group G1 and the second lens group G2 and reducing an air gap between the second lens group G2 and the third lens group G3.

Also, in each of the fourth to sixth, the first lens group G1 is composed of a 1-1 lens group G11 having a negative refracting power and a 1-2 lens group G12 having a positive refracting power in the named order from the object side. Then, focusing from infinity to near is conducted by moving the 1-1 lens group G11 to the object side.

Further, in each of the embodiments, the 1-1 lens group G11 is composed of a front group GF having a positive refracting power and a rear group GR having a negative refracting power in the named order from the object side. Then, the front group GF is composed of a negative meniscus lens being convex on the object side and a biconvex lens in this order from the object side. Also, the rear group GR is composed of a negative lens having a surface with a larger curvature on the image side, a negative lens having a surface with a larger curvature on the object side, and a positive lens having a surface with a larger curvature on the object side, in the named order from the object side.

FIG. 23 is a drawing to show the lens constitution of a zoom lens which is capable of extreme close photographing according to the fourth and fifth embodiments of the present invention.

In the zoom lens shown in FIG. 23, the 1-1 lens group G11 in the first lens group G1 is composed of a front group GF which has a negative meniscus lens being convex on the object side and a biconvex lens, and a rear group GR which has a negative meniscus lens being convex on the object side, a negative meniscus lens being concave on the object side, and a positive meniscus lens being convex on the object side, in the named order from the object side. The 1-2 lens group G12 in the first lens group G1 is composed of a biconvex lens, a compound positive lens of a negative meniscus lens being convex on the object side and a biconvex lens, and a positive meniscus lens being convex on the object side, in the named order from the object side.

Also, the second lens group G2 is composed of a compound negative lens of a biconcave lens and a positive meniscus lens being convex on the object side, and a biconcave lens, in the named order from the object side.

Further, the third lens group G3 is composed of a biconvex lens, a compound positive lens of a biconvex lens, a biconcave lens and a positive meniscus lens being convex on the object side, a biconvex lens, and a negative meniscus lens being concave on the object side, in the named order from the object side.

Note that an aperture stop S is disposed between the second lens group G2 and the third lens group G3, and the aperture stop S is moved integrally with the third lens group G3 during zooming.

FIG. 23 shows a lens layout at the wide angle end, in which the respective lens groups are moved in the directions indicated by the arrows in the drawing during zooming to the telephoto end. That is, the first lens group G1 is fixed, the second lens group G2 is moved to the image side, and the third lens group G3 is moved to the object side when the focal length is changed from the wide angle end to the telephoto end.

Also, as stated above, focusing is effected from infinity to near by moving the 1-1 lens group G11 to the object side.

Fourth Embodiment

Specific values of the fourth embodiment of the present invention will be shown in the following Table 5. As to the specific values of the total system in Table 5, f represents a focal length, Fno an f-number, and $2\omega$ a field angle, respectively. Also, as to the lens specific values, the first column includes lens surface numbers in the order from the object side, r in the second column represents a radius of curvature of lens surface, d in the third column a lens surface separation, ν in the fourth column an Abbe's number, and n in the fifth column a refractive index for the d-line (ν=587.6 nm), respectively. Further, as to the lens specific values and the zooming data, B.f. represents a back focus, and TL an axial distance between the surface which is closest to the object side and the image surface, respectively. In addition, as to the zooming data for closest photographing, R represents an axial distance between the object and the image surface, and β a photographing magnification, respectively.

TABLE 5

(Total system specific values)
f = 72.10 ~ 105.00 ~ 174.59
$F_{NO}$ = 4.46 ~ 4.98 ~ 5.80
$2\omega$ = 33.4 ~ 22.9 ~ 13.80

(Lens specific values)

| | r | d | ν | n |
|---|---|---|---|---|
| 1 | 99.3894 | 2.5000 | 23.01 | 1.86074 |
| 2 | 46.6385 | 3.7000 | | |
| 3 | 80.5978 | 8.2000 | 23.01 | 1.86074 |
| 4 | −133.6957 | 0.1000 | | |
| 5 | 275.4711 | 1.8000 | 54.01 | 1.61720 |
| 6 | 44.0160 | 9.9000 | | |
| 7 | −47.9935 | 1.8000 | 33.89 | 1.80384 |
| 8 | −204.3786 | 0.1000 | | |
| 9 | 81.0130 | 3.9000 | 30.04 | 1.69895 |
| 10 | 244.6780 | (d10 = variable) | | |
| 11 | 98.8593 | 4.7000 | 49.52 | 1.74443 |
| 12 | −179.1193 | 0.1000 | | |
| 13 | 127.3209 | 1.8000 | 25.80 | 1.78472 |
| 14 | 34.4951 | 6.9000 | 60.03 | 1.64000 |
| 15 | −651.2001 | 0.1000 | | |
| 16 | 72.0354 | 3.5000 | 55.60 | 1.69680 |
| 17 | 260.0235 | (d17 = variable) | | |
| 18 | −518.6393 | 1.6000 | 46.54 | 1.80411 |
| 19 | 22.2992 | 5.2000 | 25.50 | 1.80458 |
| 20 | 86.4079 | 2.0000 | | |
| 21 | −102.2451 | 1.6000 | 46.54 | 1.80411 |
| 22 | 102.2451 | (d22 = variable) | | |
| 23 | ∞ | 1.0000 | (aperture stop S) | |
| 24 | 277.7932 | 3.4000 | 55.60 | 1.69680 |
| 25 | −76.0460 | 0.1000 | | |
| 26 | 29.0602 | 6.8000 | 70.41 | 1.48749 |
| 27 | −39.2003 | 1.4000 | 33.89 | 1.80384 |
| 28 | 39.2003 | 4.8000 | 70.41 | 1.48749 |
| 29 | 3998.0265 | 13.4000 | | |
| 30 | 480.0183 | 5.3000 | 27.63 | 1.74077 |
| 31 | −43.8032 | 16.7000 | | |
| 32 | −24.1714 | 1.4000 | 46.54 | 1.80411 |
| 33 | −82.9678 | (Bf) | | |

(Zooming data for infinity photographing)

| | Wide angle end | Intermediate position | Telephoto end |
|---|---|---|---|
| f | 72.09930 | 104.99706 | 174.58781 |
| d10 | 1.99556 | 1.99556 | 1.99556 |
| d17 | 2.07229 | 8.99829 | 16.40685 |
| d22 | 40.49327 | 24.78764 | 2.72357 |
| Bf | 51.77942 | 60.55770 | 75.21136 |

TABLE 5-continued

| TL | 210.14053 | 210.13918 | 210.13734 |
|---|---|---|---|

(Zooming data for closest photographing)

| β | −0.30977 | −0.45111 | −0.75009 |
|---|---|---|---|
| d10 | 36.79619 | 36.79619 | 36.79619 |
| d17 | 2.07229 | 8.99829 | 16.40685 |
| d22 | 40.49327 | 24.78764 | 2.72357 |
| Bf | 51.77942 | 60.55770 | 75.21136 |
| TL | 244.94173 | 244.94014 | 244.93797 |
| R | 372.00000 | 372.00000 | 372.00000 |

(Condition values)

fw = 72. 099
ft = 174.588
ft' = 88.976
$f_{11}$ = −90.000
fF = 126.483
R' = 476.818
TL = 210.137
TL' = 233.335
(6) $|f_{11}|$/fw = 1.25
(7) fF/$|f_{11}|$ = 1.41
(8) R'/ft = 2.73
(9) ft'/ft = 0.51
(10) TL'/TL = 1.11

FIGS. 24A to 29E are drawings to show aberrations in the fourth embodiment, in which FIGS. 24A to 24E are drawings to show the aberrations at a wide angle end in the infinity photographing, FIGS. 25A to 25E are drawings to show the aberrations at an intermediate focal length in the infinity photographing, and FIGS. 26A to 26E are drawings to show the aberrations at a telephoto end in the infinity photographing. On the other hand, FIGS. 27A to 27E are drawings to show the aberrations at the wide angle end in the closest photographing, FIGS. 28A to 28E are drawings to show the aberrations at the intermediate focal length in the closest photographing, and FIGS. 29A to 29E are drawings to show the aberrations at the telephoto end in the closest photographing.

In each of the drawings of aberrations, Fno represents an f-number, NA a numerical aperture, Y an image height, ω a half field angle, A an object height, d a d-line (λ=587.6 nm), and g a g-line (λ=435.8 nm), respectively.

Also, in the drawings of aberrations to show astigmatism, each solid line represents a sagittal image surface, and a broken line represents a meridional image surface.

From the above-mentioned drawings of aberrations, it is clearly seen that the aberrations are satisfactorily corrected at any object distance and at any focal length in this embodiment so as to secure an excellent image formation performance.

Fifth Embodiment

Specific values of the fifth embodiment of the present invention will be shown in the following Table 6. As to the specific values of the total system in Table 6, f represents a focal length, Fno an f-number, and 2ω a field angle, respectively. Also, as to the lens specific values, the first column includes lens surface numbers in the order from the object side, r in the second column represents a radius of curvature of lens surface, d in the third column a lens surface separation, ν in the fourth column an Abbe's number, and n in the fifth column a refractive index for the d-line (λ=587.6 nm), respectively. Further, as to the lens specific values and the zooming data, Bf represents a back focus, and TL an axial distance between the surface which is closest to the object side and the image surface, respectively. In addition, as to the zooming data for the closest photographing, R represents an axial distance between the object and the image surface, and β a photographing magnification, respectively.

TABLE 6

(Total system specific values)
f = 72.10 ~ 105.00 ~ 174.60
$F_{NO}$ = 4.47 ~ 4.99 ~ 5.80
2ω = 33.3 ~ 22.9 ~ 13.8°

(Lens specific values)

| | r | d | ν | n |
|---|---|---|---|---|
| 1 | 98.6601 | 2.5000 | 26.05 | 1.78470 |
| 2 | 46.1863 | 3.7000 | | |
| 3 | 85.2724 | 8.2000 | 25.50 | 1.80458 |
| 4 | −109.4798 | 0.1000 | | |
| 5 | 301.6851 | 1.8000 | 60.03 | 1.64000 |
| 6 | 47.0000 | 9.9000 | | |
| 7 | −44.4511 | 1.8000 | 33.89 | 1.80384 |
| 8 | −148.8178 | 0.1000 | | |
| 9 | 82.7586 | 3.9000 | 28.19 | 1.74000 |
| 10 | 185.5582 | (d10 = variable) | | |
| 11 | 80.1395 | 4.5000 | 49.45 | 1.77279 |
| 12 | −230.8690 | 0.1000 | | |
| 13 | 131.2066 | 1.8000 | 28.19 | 1.74000 |
| 14 | 34.7685 | 6.9000 | 82.52 | 1.49782 |
| 15 | −227.2212 | 0.1000 | | |
| 16 | 57.9478 | 3.5000 | 60.03 | 1.64000 |
| 17 | 198.8407 | (d17 = variable) | | |
| 18 | −634.3708 | 1.6000 | 49.45 | 1.77279 |
| 19 | 24.1129 | 4.2000 | 26.05 | 1.78470 |
| 20 | 77.0897 | 2.1000 | | |
| 21 | −88.6913 | 1.6000 | 55.60 | 1.69680 |
| 22 | 88.6913 | (d22 = variable) | | |
| 23 | ∞ | 1.0000 | (aperture stop S) | |
| 24 | 208.1505 | 3.4000 | 60.03 | 1.64000 |
| 25 | −75.7259 | 0.1000 | | |
| 26 | 28.8092 | 6.8000 | 70.41 | 1.48749 |
| 27 | −38.4094 | 1.4000 | 33.89 | 1.80384 |
| 28 | 38.4094 | 4.8000 | 70.41 | 1.48749 |
| 29 | 893.9460 | 13.4000 | | |
| 30 | 251.6073 | 4.3000 | 27.63 | 1.74077 |
| 31 | −44.6108 | 16.7000 | | |
| 32 | −24.1183 | 1.4000 | 45.37 | 1.79668 |
| 33 | −90.5006 | (Bf) | | |

(Zooming data for infinity photographing)

| | Wide angle end | Intermediate position | Telephoto end |
|---|---|---|---|
| f | 72.09930 | 105.00004 | 174.60000 |
| d10 | 2.62544 | 2.62544 | 2.62544 |
| d17 | 2.14865 | 9.07345 | 16.48300 |
| d22 | 40.42375 | 24.71704 | 2.65201 |
| Bf | 52.28636 | 61.06827 | 75.72373 |
| TL | 209.18420 | 209.18419 | 209.18418 |

(Zooming data for closest photographing)

| β | −0.30994 | −0.45137 | −0.75057 |
|---|---|---|---|
| d10 | 37.44552 | 37.44552 | 37.44552 |
| d17 | 2.14865 | 9.07345 | 16.48300 |
| d22 | 40.42375 | 24.71704 | 2.65201 |
| Bf | 52.28636 | 61.06827 | 75.72373 |
| TL | 244.00428 | 244.00428 | 244.00426 |
| R | 370.00000 | 370.00000 | 370.00000 |

(Condition values)

fw = 72. 099
ft = 174.600
ft' = 88.981
$f_{11}$ = 90.000
fF = 120.868
R' = 474.951
TL = 209.184
TL' = 232.380

TABLE 6-continued (6) $|f_{11}|/fw = 1.25$
(7) $fF/|f_{11}| = 1.34$
(8) $R'/ft = 2.72$
(9) $ft'/ft = 0.51$
(10) $TL'/TL = 1.11$ FIGS. 30A to 35E are drawings to show aberrations in the fifth embodiment, in which FIGS. 30A to 30E are drawings to show the aberrations at a wide angle end in the infinity photographing, FIGS. 31A to 31E are drawings to show the aberrations at an intermediate focal length in the infinity photographing, and FIGS. 32A to 32E are drawings to show the aberrations at a telephoto end in the infinity photographing. On the other hand, FIGS. 33A to 33E are drawings to show the aberrations at the wide angle end in the closest photographing, FIGS. 34A to 34E are drawings to show the aberrations at the intermediate focal length in the closest photographing, and FIGS. 35A to 35E are drawings to show the aberrations at the telephoto end in the closest photographing.

In each of the drawings of aberrations, Fno represents an f-number, NA a numerical aperture, Y an image height, ω a half field angle, A an object height, d a d-line ($\lambda$=587.6 nm), and g a g-line ($\lambda$=435.8 nm), respectively.

Also, in the drawings of aberrations to show astigmatism, each solid line represents a sagittal image surface, and a broken line represents a meridional image surface.

From the above-mentioned drawings of aberrations, it is clearly seen that the aberrations are satisfactorily corrected at any object distance and at any focal length in this embodiment so as to secure an excellent image formation performance.

Sixth Embodiment

Specific values of the sixth embodiment of the present invention will be shown in the following Table 7. As to the specific values of the total system in Table 7, f represents a focal length, Fno an f-number, and 2ω a field angle, respectively. Also, as to the lens specific values, the first column includes lens surface numbers in the order from the object side, r in the second column represents a radius of curvature of lens surface, d in the third column a lens surface separation, ν in the fourth column an Abbe's number, and n in the fifth column a refractive index for the d-line ($\lambda$=587.6 nm), respectively. Further, as to the lens specific values and the zooming data, Bf represents a back focus, and TL an axial distance between the surface which is closest to the object side and the image surface, respectively. In addition, as to the zooming data for the closest photographing, R represents an axial distance between the object and the image surface, and β a photographing magnification, respectively.

TABLE 7

[Total System Specific Values]
f = 72.05 ~ 105.00 ~ 174.60
$F_{no}$ = 4.45 ~ 5.01 ~ 5.81
2ω = 33.3 ~ 22.8 ~ 13.8

[Lens specific Values]

|   | r | d | ν | n |
|---|---|---|---|---|
| 1 | 89.0624 | 2.5000 | 26.05 | 1.78470 |
| 2 | 44.3511 | 3.6000 | | |
| 3 | 78.0116 | 8.2000 | 25.50 | 1.80458 |
| 4 | −138.0643 | 0.1000 | | |
| 5 | 206.1362 | 1.8000 | 60.03 | 1.64000 |
| 6 | 43.1948 | 10.1000 | | |
| 7 | −49.1950 | 1.8000 | 33.89 | 1.80384 |
| 8 | −267.1119 | 0.1000 | | |
| 9 | 80.6103 | 3.7000 | 28.19 | 1.74000 |
| 10 | 246.9456 | (d10 = variable) | | |
| 11 | 84.8796 | 4.5000 | 49.45 | 1.77278 |
| 12 | −280.3481 | 0.1000 | | |
| 13 | 101.6075 | 1.8000 | 28.19 | 1.74000 |
| 14 | 34.9930 | 7.6000 | 82.52 | 1.49782 |
| 15 | −238.6230 | 0.1000 | | |
| 16 | 72.6182 | 3.5000 | 60.03 | 1.64000 |
| 17 | 185.8599 | (d17 = variable) | | |
| 18 | −1893.6103 | 1.4000 | 49.45 | 1.77278 |
| 19 | 30.2490 | 3.9000 | 25.50 | 1.80458 |
| 20 | 99.9829 | 1.8000 | 0 | |
| 21 | −89.5000 | 1.4000 | 55.60 | 1.69680 |
| 22 | 89.5000 | (d22 = variable) | | |
| 23 | ∞ | 1.0000 | (aperture stop S) | |
| 24 | 147.6900 | 3.2000 | 60.03 | 1.64000 |
| 25 | −67.3328 | 0.1000 | | |
| 26 | 29.1657 | 7.1000 | 70.41 | 1.48749 |
| 27 | −38.1350 | 1.4000 | 33.89 | 1.80384 |
| 28 | 38.1350 | 3.1000 | 70.41 | 1.48749 |
| 29 | 127.1342 | 15.6000 | | |
| 30 | 411.4923 | 3.7000 | 28.19 | 1.74000 |
| 31 | −40.2846 | 15.6500 | | |
| 32 | −24.4631 | 1.4000 | 45.37 | 1.79668 |
| 33 | −102.6504 | (Bf) | | |

[Zooming data for infinity photographing]

|  | Wide angle end | Intermediate position | Telephoto end |
|---|---|---|---|
| f | 72.05204 | 105.00000 | 174.60000 |
| d10 | 2.63000 | 2.63000 | 2.63000 |
| d17 | 2.70000 | 10.73027 | 20.52761 |
| d22 | 43.91000 | 26.44398 | 2.65425 |
| Bf | 50.62048 | 60.05622 | 74.04862 |
| TL | 210.11048 | 210.11048 | 210.11048 |

[Zooming data for extreme close photographing]

|  |  |  |  |
|---|---|---|---|
| β | −0.31106 | −0.45330 | −0.75378 |
| d10 | 37.18051 | 37.18051 | 37.18051 |
| d17 | 2.70000 | 10.73027 | 20.52761 |
| d22 | 43.91000 | 26.44398 | 2.65425 |
| Bf | 50.62048 | 60.05622 | 74.04862 |
| TL | 244.66099 | 244.66099 | 244.66099 |
| R | 370.00000 | 370.00000 | 370.09000 |

[Condition values]

fw = 72.052
ft = 174.600
ft'= 88.928
f11 = −89.460
fF = 129.321
R'= 475.934
TL = 210.110
TL'= 233.029
(6) $|f11|/fw = 1.242$
(7) $fF/|f11| = 1.446$
(8) $R'/ft = 2.726$
(9) $ft'/ft = 0.509$
(10) $TL'/TL = 1.109$

FIG. 36 is a drawing to show the lens constitution of a zoom lens which is capable of extreme close photographing according to the sixth embodiment of the present invention.

FIGS. 37A to 42E are drawings to show aberrations in the sixth embodiment, in which FIGS. 37A to 37E are drawings to show the aberrations at a wide angle end in the infinity photographing, FIGS. 38A to 38E are drawings to show the aberrations at an intermediate focal length in the infinity photographing, and FIGS. 39A to 39E are drawings to show the aberrations at a telephoto end in the infinity photographing. On the other hand, FIGS. 40A to 40E are drawings to show the aberrations at the wide angle end in the closest photographing, FIGS. 41A to 41E are drawings to show the aberrations at the intermediate focal length in the closest photographing, and FIGS. 42A to 42E are drawings to show the aberrations at the telephoto end in the closest photographing.

In each of the drawings of aberrations, Fno represents an f-number, NA a numerical aperture, Y an image height, ω a half field angle, A an object height, d a d-line (λ=587.6 nm), and g a g-line (λ=435.8 nm), respectively.

Also, in the drawings of aberrations to show astigmatism, each solid line represents a sagittal image surface, and a broken line represents a meridional image surface.

From the above-mentioned drawings of aberrations, it is clearly seen that the aberrations are satisfactorily corrected at any object distance and at any focal length in this embodiment so as to secure an excellent image formation performance.

The seventh and eighth embodiments of the present invention will be explained with reference to FIGS. 43–56E.

In each of seventh and eighth the embodiments, a zoom lens of the present invention is provided with a first lens group G1 having a negative refracting power, a second lens group G2 having a positive refracting power, a third lens group G3 having a negative refracting power, and a fourth lens group G4 having a positive refracting power, in the named order from the object side. Then, the focal length is changed from a wide angle end to a telephoto end by changing an air gap between the first lens group G1 and the second lens group G2, enlarging an air gap between the second lens group G2 and the third lens group G3, and reducing an air gap between the third lens group G3 and the fourth lens group G4. In each of the embodiments, the first lens group G1 is moved to the object side so as to effect focusing from infinity to near.

Seventh Embodiment

Figure 43:
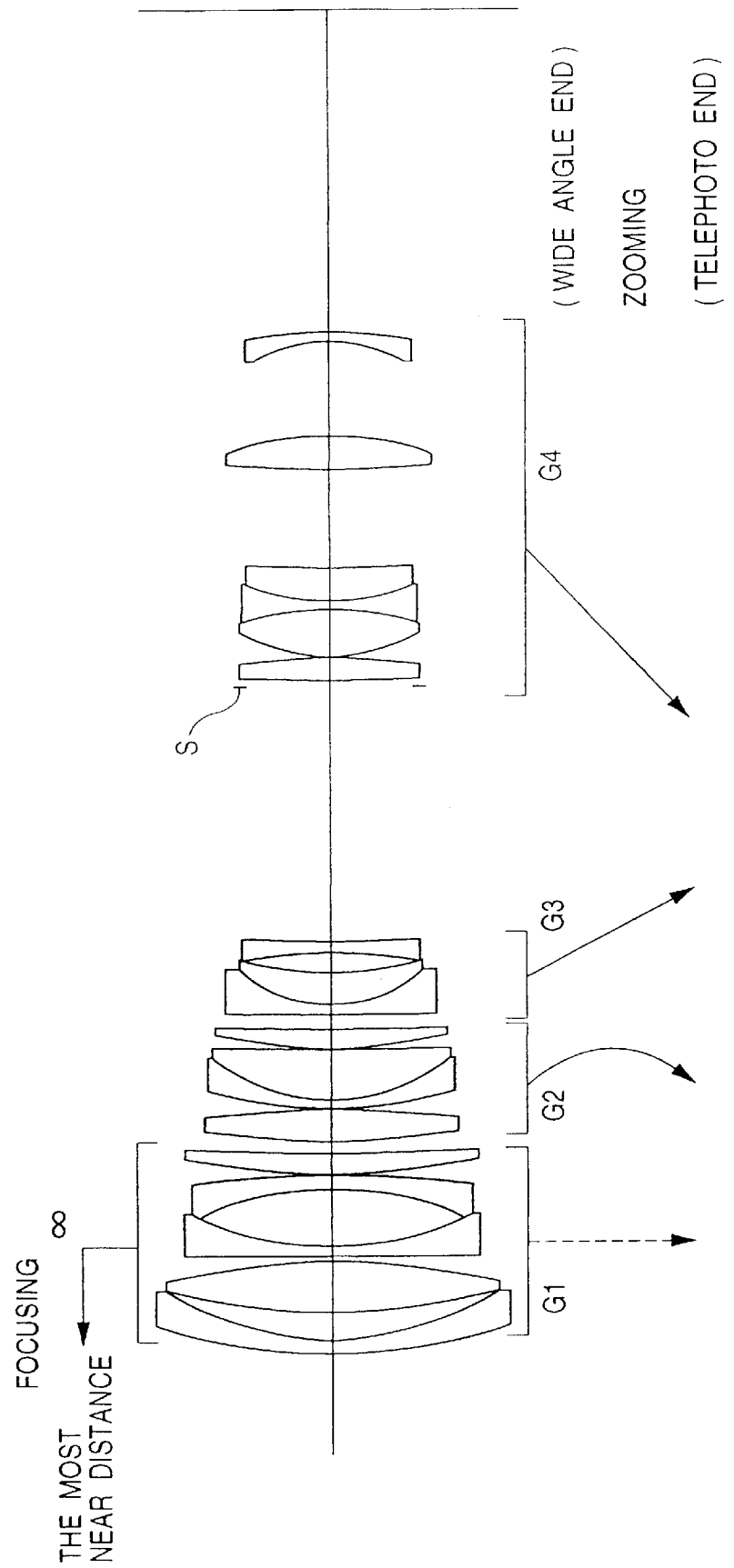
FIG. 43 is a drawing to show the constitution of a zoom lens according to a seventh embodiment of the present invention.
Figures 44A, 44B, 44C:
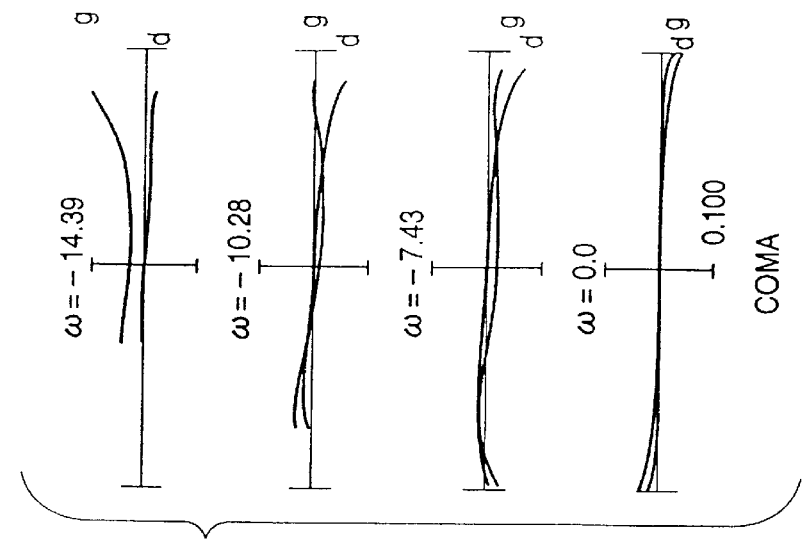
FIGS. 44A to 44E are drawings to show aberrations at the wide angle end in the infinity photographing state according to the seventh embodiment.
Figure 44D:
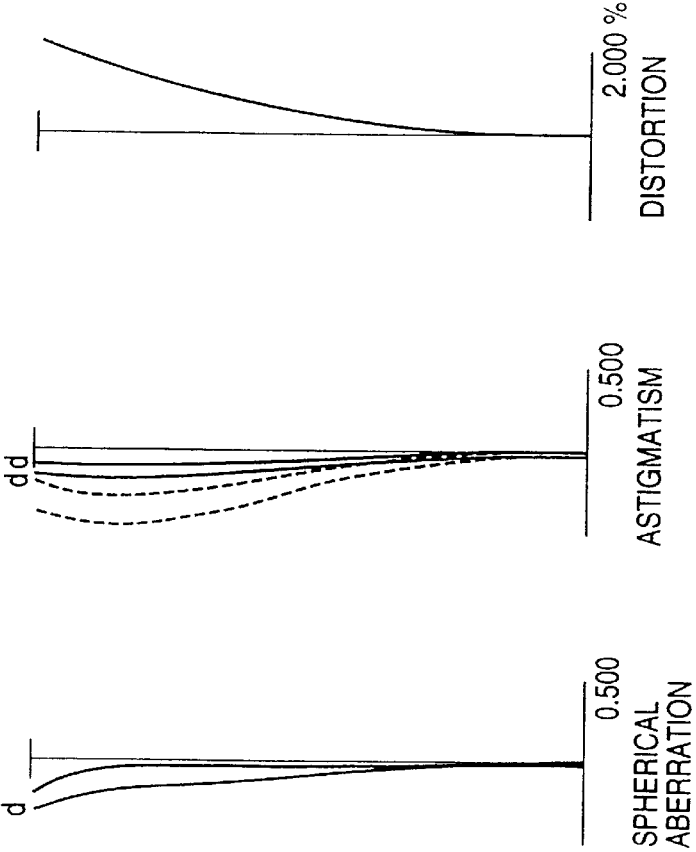
Figure 44E:
Figures 45A, 45B, 45C, 45D, 45E:
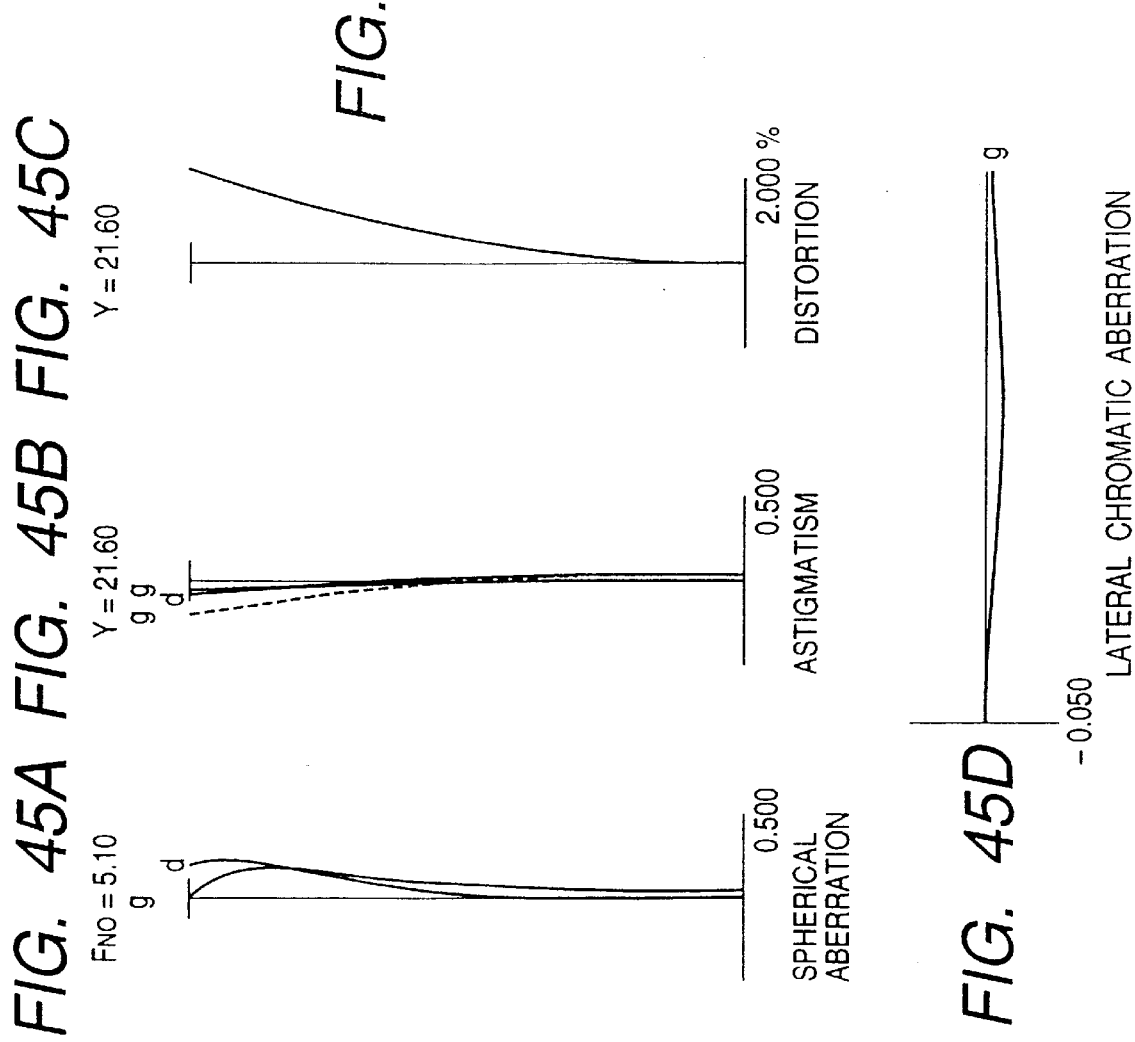
FIGS. 45A to 45E are drawings to show aberrations at the intermediate focal length in the infinity photographing state according to the seventh embodiment.

FIG. 43 is a drawing to show the lens constitution of a zoom lens according to the seventh embodiment of the present invention.

In the zoom lens shown in FIG. 43, the first lens group G1 is composed of a negative meniscus lens being convex on the object side, a biconvex lens, a negative meniscus lens being convex on the object side, a negative meniscus lens being concave on the object side, and a positive meniscus lens being convex on the object side, in the named order from the object.

Also, the second lens group G2 is composed of a biconvex lens, a compound positive lens of a negative meniscus lens being convex on the object side and a positive meniscus lens being convex on the object side, and a positive meniscus lens being convex on the object side, in the named order from the object side.

Further, the third lens group G3 is composed of a compound negative lens of a negative meniscus lens being convex on the object side and a positive meniscus lens being convex on the object side, and a biconcave lens, in the named order from the object side.

Also, the fourth lens group G4 is composed of a biconvex lens, a compound positive lens of a biconvex lens, a biconcave lens, and a positive meniscus lens being convex on the object side, a biconvex lens, and a negative meniscus lens being concave on the object side, in the named order from the object side.

Note that an aperture stop S is disposed between the third lens group G3 and the fourth lens group G4, and the aperture stop S is moved integrally with the fourth lens group G4 during zooming.

FIG. 43 shows a lens layout at the wide angle end, in which the respective lens groups are moved in the directions indicated by the arrows in the drawing when the magnification is changed to the telephoto end. More specifically, the first lens group G1 is fixed during zooming from the wide angle end to the telephoto end, the second lens group G2 is moved to the image side, and then, to the object side, the third lens group G3 is moved to the image side, and the fourth lens group G4 is moved to the object side. Then, a ratio between a movement amount for zooming of the third lens group G3 and that of the fourth lens group G4 is all the time constant during zooming.

Specific values of the seventh embodiment of the present invention will be shown in the following Table 8. As to the specific values of the total system in Table 8, f represents a focal length, Fno an f-number, and 2ω a field angle, respectively. Also, as to the lens specific values, the first column includes lens surface numbers in the order from the object side, r in the second column represents a radius of curvature of lens surface, d in the third column a lens surface separation, ν in the fourth column an Abbe's number, and n in the fifth column a refractive index for the d-line (λ=587.6 nm), respectively. Further, as to the lens specific values and the zooming data, Bf represents a back focus, and TL an axial distance between the surface which is closest to the object side and the image surface, respectively. In addition, as to the zooming data for the closest photographing, R represents an axial distance (object distance) between the object and the image surface, and β a photographing magnification, respectively.

TABLE 8

(Total system specific values)
f = 82.40 ~ 135.00 ~ 194.00
$F_{NO}$ = 4.14 ~ 5.10 ~ 5.73
2ω = 28.8 ~ 17.8 ~ 12.5°
(Lens specific values)

| | r | d | ν | n |
|---|---|---|---|---|
| 1 | 89.1784 | 2.5000 | 23.01 | 1.86074 |
| 2 | 49.0701 | 4.1000 | | |
| 3 | 106.7865 | 8.1000 | 23.01 | 1.86074 |
| 4 | −106.7865 | 0.5000 | | |
| 5 | 1559.0379 | 1.8000 | 54.01 | 1.61720 |
| 6 | 53.5159 | 9.6000 | | |
| 7 | −45.7095 | 1.8000 | 28.56 | 1.79504 |
| 8 | −171.4311 | 0.1000 | | |
| 9 | 100.4498 | 3.6000 | 25.80 | 1.78472 |
| 10 | 298.8453 | (d10 = variable) | | |
| 11 | 123.6358 | 5.0000 | 52.30 | 1.74810 |
| 12 | −123.6358 | 0.1000 | | |
| 13 | 75.6267 | 1.8000 | 25.80 | 1.78472 |
| 14 | 31.3233 | 7.5000 | 60.03 | 1.64000 |
| 15 | 284.6918 | 0.1000 | | |
| 16 | 70.5329 | 3.3000 | 70.41 | 1.48749 |
| 17 | 401.6337 | (d17 = variable) | | |
| 18 | 307.8626 | 1.6000 | 46.54 | 1.80411 |
| 19 | 21.1462 | 5.4000 | 25.50 | 1.80458 |
| 20 | 60.0066 | 2.9000 | | |
| 21 | −68.4511 | 1.6000 | 46.54 | 1.80411 |
| 22 | 179.6301 | (d22 = variable) | | |
| 23 | ∞ | 1.0000 | (aperture stop S) | |
| 24 | 163.2350 | 3.7000 | 55.60 | 1.69680 |
| 25 | −91.5164 | 0.1000 | | |
| 26 | 27.2830 | 7.4000 | 70.41 | 1.48749 |
| 27 | −44.9905 | 1.4000 | 33.89 | 1.80384 |
| 28 | 32.3110 | 4.9000 | 70.41 | 1.48749 |

TABLE 8-continued

| | | | | |
|---|---|---|---|---|
| 29 | 260.2126 | 15.6000 | | |
| 30 | 145.3796 | 5.8000 | 27.63 | 1.74077 |
| 31 | −45.9845 | 14.1000 | | |
| 32 | −23.6299 | 1.4000 | 46.54 | 1.80411 |
| 33 | −120.0792 | (Bf) | | |

(Zooming data for infinity photographing)

| | Wide angle end | Intermediate position | Telephoto end |
|---|---|---|---|
| f | 82.40000 | 135.00000 | 194.00000 |
| d10 | 2.01116 | 2.90403 | 2.01106 |
| d17 | 2.05261 | 6.74308 | 11.45570 |
| d22 | 40.31604 | 17.41585 | 1.74949 |
| Bf | 51.03263 | 68.34949 | 80.19619 |
| TL | 212.21243 | 212.21244 | 212.21244 |

(Zooming data for closest photographing)

| | | | |
|---|---|---|---|
| β | −0.31850 | −0.52182 | −0.74988 |
| d10 | 40.66459 | 41.55746 | 40.66449 |
| d17 | 2.05261 | 6.74308 | 11.45570 |
| d22 | 40.31604 | 17.41585 | 1.74949 |
| Bf | 51.03263 | 68.34949 | 80.19619 |
| TL | 250.86586 | 250.86588 | 250.86589 |
| R | 391.90000 | 391.90000 | 391.90000 |

(Condition values)

fw = 82.400
fl = −100.000
$D_{12w}$ = 2.011
Δ1 = 0.000
(11) |f1|/fw = 1.21
(12) $D_{12w}$/fw = 0.024
(13) Δ1/fw = 0.000

FIGS. 44A to 49E are drawings to show aberrations in the seventh embodiment, in which FIGS. 44A to 44E are drawings to show the aberrations at a wide angle end in the infinity photographing, FIGS. 45A to 45E are drawings to show the aberrations at an intermediate focal length in the infinity photographing, and FIGS. 46A to 46E are drawings to show the aberrations at a telephoto end in the infinity photographing. On the other hand, FIGS. 47A to 47F are drawings to show the aberrations at the wide angle end in the closest photographing, FIGS. 48A to 48E are drawings to show the aberrations at the intermediate focal length in the closest photographing, and FIGS. 49A to 49E are drawings to show the aberrations at the telephoto end in the closest photographing.

In each of the drawings of aberrations, Fno represents an f-number, NA a numerical aperture, Y an image height, ω a half field angle, A an object height, d a d-line (λ=587.6 nm), and g a g-line (λ=435.8 nm), respectively.

Also, in the drawings of aberrations to show astigmatism, each solid line represents a sagittal image surface, and a broken line represents a meridional image surface.

From the above-mentioned drawings of aberrations, it is clearly seen that the aberrations are satisfactorily corrected at any object distance and at any focal length in this embodiment so as to secure an excellent image formation performance.

Eighth Embodiment

Figure 50:
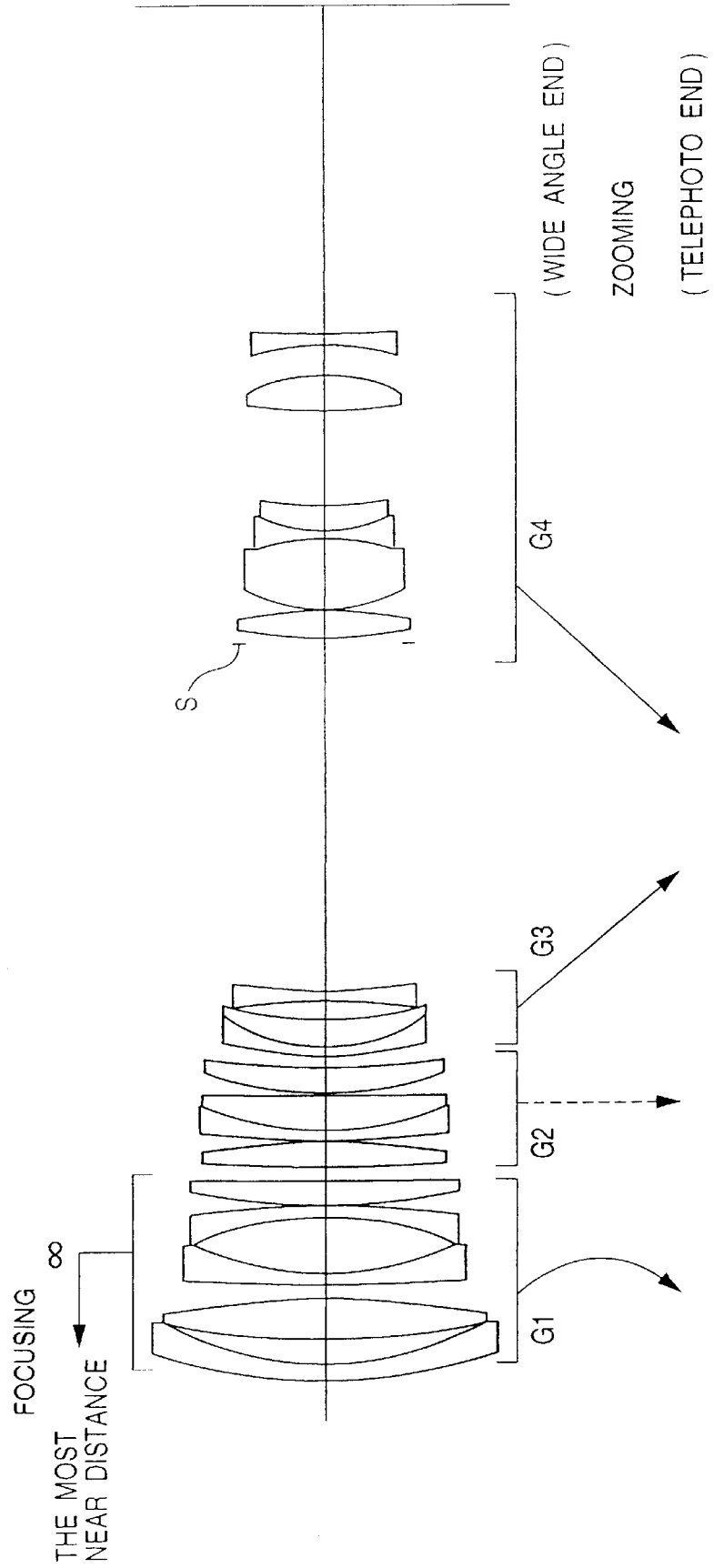
FIG. 50 is a drawing to show the constitution of a zoom lens according to an eighth embodiment of the present invention.
Figures 55A, 55B, 55C, 55D, 55E:
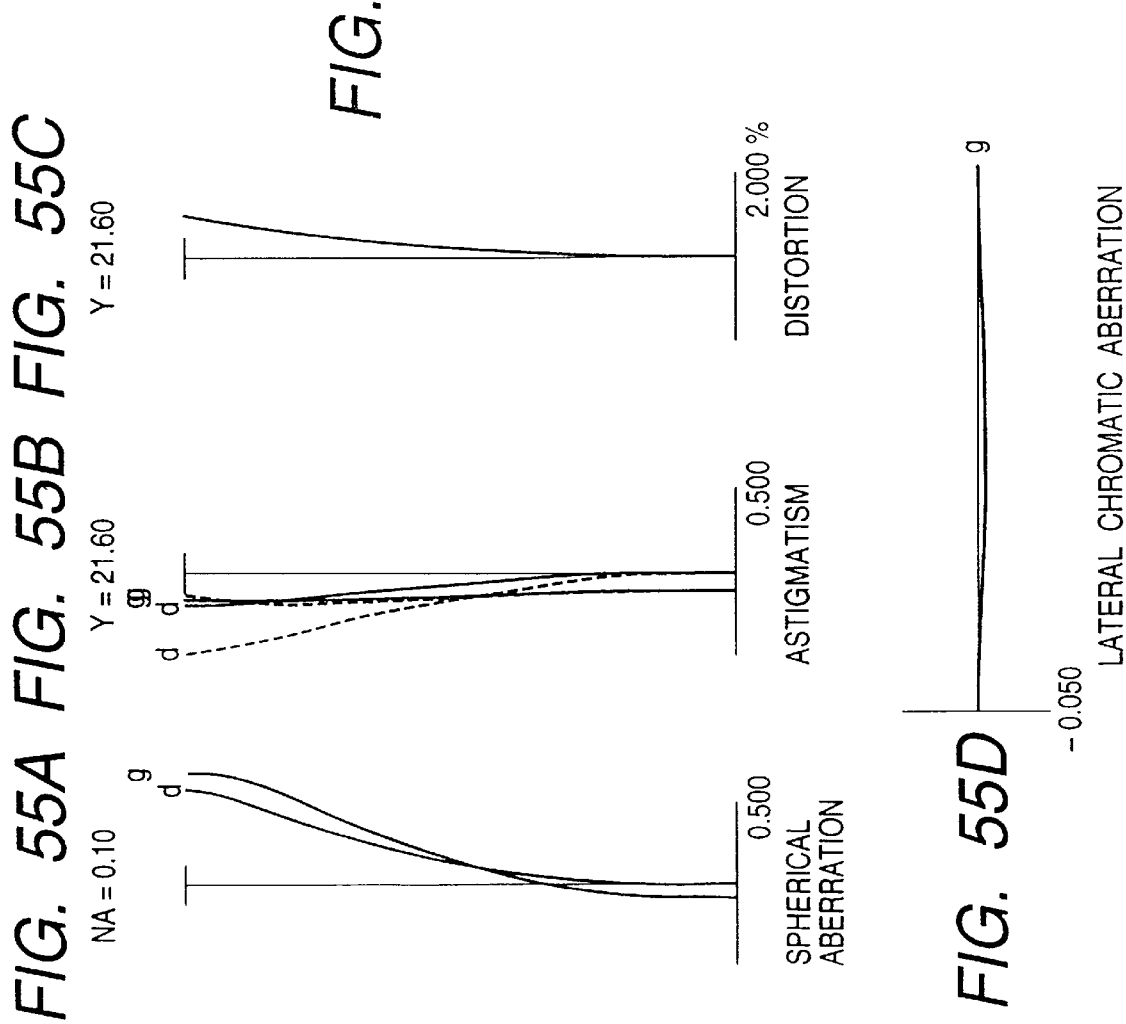
FIGS. 55A to 55E are drawings to show aberrations at the intermediate focal length in the extreme close photographing state according to the eighth embodiment.

FIG. 50 is a drawing to show the lens constitution of a zoom lens according to the eighth embodiment of the present invention.

In the zoom lens shown in FIG. 50, the first lens group G1 is composed of a negative meniscus lens being convex on the object side, a biconvex lens, a negative meniscus lens being convex on the object side, a negative meniscus lens being concave on the object side, and a positive meniscus lens being convex on the object side, in the named order from the object.

Also, the second lens group G2 is composed of a biconvex lens, a compound positive lens of a negative meniscus lens being convex on the object side and a biconvex lens, and a positive meniscus lens being convex on the object side, in the order from the object side.

Further, the third lens group G3 is composed of a compound negative lens of a negative meniscus lens being convex on the object side and a positive meniscus lens being convex on the object side, and a biconcave lens, in the named order from the object side.

Also, the fourth lens group G4 is composed of a biconvex lens, a compound positive lens of a biconvex lens, a biconcave lens, and a positive meniscus lens being convex on the object side, a biconvex lens, and a biconcave lens, in the named order from the object side.

Note that an aperture stop S is disposed between the third lens group G3 and the fourth lens group G4, and the aperture stop S is moved integrally with the fourth lens group G4 during zooming.

FIG. 50 shows a lens layout at the wide angle end, in which the respective lens groups are moved in the directions indicated by the arrows in the drawing when the focal length is changed to the telephoto end. More specifically, when the focal length is changed from the wide angle end to the telephoto end, the first lens group G1 is moved to the image side, and then, to the object side, the second lens group G2 is fixed, the third lens group G3 is moved to the image side, and the fourth lens group G4 is moved to the object side. Then, a ratio between a movement amount for zooming of the third lens group G3 and that of the fourth lens group G4 is all the time constant during zooming.

Specific values of the eighth embodiment of the present invention will be shown in the following Table 9. As to the specific values of the total system in Table 9, f represents a focal length, Fno an f-number, and 2ω a field angle, respectively. Also, as to the lens specific values, the first column includes lens surface numbers in the order from the object side, r in the second column represents a radius of curvature of lens surface, d in the third column a lens surface separation, ν in the fourth column an Abbe's number, and n in the fifth column a refractive index for the d-line (λ=587.6 nm), respectively. Further, as to the lens specific values and the zooming data, Bf represents a back focus, and TL an axial distance between the surface which is closest to the object side and the image surface, respectively. In addition, as to the zooming data at the closest photographing, R represents an axial distance (object distance) between the object and the image surface, and β a photographing magnification, respectively.

TABLE 9

(Total system specific values)
f = 82.40 ~ 135.00 ~ 194.00
$F_{NO}$ = 4.35 ~ 5.22 ~ 5.81
2ω = 29.4 ~ 17.9 ~ 12.5°

(Lens specific values)

| | r | d | ν | n |
|---|---|---|---|---|
| 1 | 95.6946 | 2.5000 | 23.01 | 1.86074 |
| 2 | 52.2106 | 4.40000 | | |

TABLE 9-continued

| | | | | |
|---|---|---|---|---|
| 3 | 123.9374 | 7.4000 | 23.01 | 1.86074 |
| 4 | −123.9374 | 2.5000 | | |
| 5 | 1338.4617 | 1.8000 | 54.01 | 1.61720 |
| 6 | 55.4141 | 9.5000 | | |
| 7 | −49.5438 | 1.8000 | 33.89 | 1.80384 |
| 8 | −202.7933 | 0.1000 | | |
| 9 | 111.6994 | 4.0000 | 30.04 | 1.69895 |
| 10 | 2627.6977 | (d10 = variable) | | |
| 11 | 192.3418 | 4.5000 | 52.30 | 1.74810 |
| 12 | −192.3418 | 0.1000 | | |
| 13 | 146.3540 | 1.8000 | 25.80 | 1.78472 |
| 14 | 50.8330 | 6.4000 | 60.03 | 1.64000 |
| 15 | −20243.6100 | 0.1000 | | |
| 16 | 64.9750 | 4.1000 | 70.41 | 1.48749 |
| 17 | 137.1326 | (d17 = variable) | | |
| 18 | 63.6793 | 1.6000 | 46.54 | 1.80411 |
| 19 | 31.2961 | 4.5000 | 25.50 | 1.80458 |
| 20 | 64.8973 | 2.9000 | | |
| 21 | −151.6662 | 1.6000 | 46.54 | 1.80410 |
| 22 | 78.5544 | (d22 = variable) | | |
| 23 | ∞ | 1.0000 | (aperture stop S) | |
| 24 | 80.4808 | 4.5000 | 55.60 | 1.69680 |
| 25 | −80.4808 | 0.1000 | | |
| 26 | 29.2569 | 11.6000 | 70.41 | 1.48749 |
| 27 | −52.5326 | 1.4000 | 33.89 | 1.80384 |
| 28 | 23.3810 | 4.5000 | 70.41 | 1.48749 |
| 29 | 50.6888 | 15.4000 | | |
| 30 | 121.1895 | 6.4000 | 27.63 | 1.74077 |
| 31 | −35.5712 | 5.2000 | | |
| 32 | −29.7009 | 1.4000 | 46.54 | 1.80411 |
| 33 | 231.2567 | (Bf) | | |

(Zooming data for infinity photographing)

| | Wide angle end | Intermediate position | Telephoto end |
|---|---|---|---|
| f | 82.39960 | 135.00002 | 193.99997 |
| d10 | 1.99577 | 0.82666 | 1.99584 |
| d17 | 2.00099 | 18.55398 | 30.93451 |
| d22 | 58.59474 | 26.40580 | 2.33063 |
| Bf | 54.01785 | 69.65380 | 81.34843 |
| TL | 229.90934 | 228.74023 | 229.90940 |

(Zooming data for closest photographing)

| | | | |
|---|---|---|---|
| β | −0.31863 | −0.51926 | −0.75016 |
| d10 | 40.66407 | 39.29069 | 40.66415 |
| d17 | 2.00099 | 18.55398 | 30.93451 |
| d22 | 58.59474 | 26.40580 | 2.33063 |
| Bf | 54.01784 | 69.65379 | 81.34843 |
| TL | 268.57764 | 267.20426 | 268.57771 |
| R | 408.80000 | 408.80000 | 408.80000 |

(Condition values)

fw = 82.400
f1 = −100.000
$D_{12W}$ = 1.996
Δ1 = 1.600
(11) |f1|/fw = 1.21
(12) $D_{12W}$/fw = 0.024
(13) Δ1/fw = 0.019

FIGS. 51A to 56E are drawings to show aberrations in the eighth embodiment, in which FIGS. 51A to 51E are drawings to show the aberrations at a wide angle end in the infinity photographing, FIGS. 52A to 52E are drawings to show the aberrations at an intermediate focal length in the infinity photographing, and FIGS. 53A to 53E are drawings to show the aberrations at a telephoto end in the infinity photographing. On the other hand, FIGS. 54A to 54E are drawings to show the aberrations at the wide angle end in the closest photographing, FIGS. 55A to 55E are drawings to show the aberrations at the intermediate focal length in the closest photographing, and FIGS. 56A to 56E are drawings to show the aberrations at the telephoto end in the closest photographing.

In each of the drawings of aberrations, Fno represents an f-number, NA a numerical aperture, Y an image height, ω a half field angle, A an object height, d a d-line (λ=587.6 nm), and g a g-line (λ=435.8 nm), respectively.

Also, in the drawings of aberrations to show astigmatism, each solid line represents a sagittal image surface, and a broken line represents a meridional image surface.

From the above-mentioned drawings of aberrations, it is clearly seen that the aberrations are satisfactorily corrected at any object distance and at any focal length in this embodiment so as to secure an excellent image formation performance.

According to the present invention, it is possibic to provide a zoom lens suitable for a single lens reflex camera, which is capable of zooming at any object distance from infinity to near, without any deviation of the image plane in zooming at any object distance, and is capable of obtaining the maximum image magnification of about −0.75 to about −1, has a zoom ratio of about 2 or more, and has an excellent image formation performance and a sufficient amount of light at marginal area in any photographing condition.

According to the present invention, it is also possible to realize a zoom lens capable of extreme close photographing and suitable for a single lens reflect camera, which zoom lens is capable of changing the focal length at any object distance from infinity to near, is capable of securing the maximum image magnification of about −0.75, and has an excellent image formation performance and a sufficient amount of light at marginal area in any object distance.

Further, according to the present invention, it is possible to realize a zoom lens suitable for a single lens reflex camera, which is capable of zooming at any object distance from infinity to near as about double the focal length at the telephoto end in the infinity photographing state, is capable of securing the maximum image magnification of about −0.75, and has an excellent image formation performance and a sufficient amount of light at marginal area in any object distance.

What is claimed is:

1. A zoom lens comprising, in order from an object side:
   a first lens group G1 having a negative refracting power, a second lens group G2 having a positive refracting power, a third lens group G3 having a negative refracting power, and a fourth lens group G4 having a positive refracting powers;
   wherein a focal length is changed from a wide angle end to a telephoto end by changing an air gap between said first lens group G1 and said second lens group G2, increasing an air gap between said second lens group G2 and said third lens group G3, and reducing an air gap between said third lens group G3 and said fourth lens group G4; and
   wherein when a focal length of said first lens group G1 is f1, a focal length of the total lens system at the wide angle end is fw, and an axial air gap between said first lens group G1 and said second lens group G2 in an infinity in-focus state at the wide angle end is D12W, the following conditions are satisfied:

$0.8 < |f1|/fw < 1.6,$ and $D12W/fw < 0.1.$

2. A zoom lens according to claim 1, wherein when a distance along the optical axis between a position of said first lens group G1 at which it is closest to an image surface and a position of said first lens group G1 at which it is farthest from said image surface during zooming is Δ1, and a focal length of the total system at the wide angle end is fw, the following condition is satisfied:

$$\Delta 1/fw < 0.1.$$

3. A zoom lens according to claim 2, wherein said third lens group G3 is moved to the image side and said fourth lens group G4 is moved to the object side during zooming from the wide angle end to the telephoto end.

4. A zoom lens according to claim 3, wherein a ratio between a movement amount of said third lens group G3 for zooming and that of said fourth lens group G4 is constant.

5. A zoom lens according to claim 4, wherein it is possible to effect focusing continuously from infinity to an object distance which is about double the focal length at the telephoto end in the infinity in-focus state at any focal length from the wide angle end to the telephoto end, by moving said first lens group G1.

6. A zoom lens according to claim 1, wherein said first lens group G1 is fixed during zooming.

7. A zoom lens according to claim 6, wherein said third lens group G3 is moved to an image side and said fourth lens group G4 is moved to the object side during zooming from the wide angle end to the telephoto end.

8. A zoom lens according to claim 7, wherein a ratio between a movement amount of said third lens group G3 for zooming and that of said fourth lens group G4 is constant.

9. A zoom lens according to claim 8, wherein it is possible to effect focusing continuously from infinity to an object distance which is about double the focal length at the telephoto end in the infinity in-focus state at any focal length from the wide angle end to the telephoto end, by moving said first lens group G1.

10. A zoom lens according to claim 1, wherein said second lens group G2 is fixed during zooming.

11. A zoom lens according to claim 10, wherein when a distance along the optical axis between a position of said first lens group G1 at which it is closest to an image surface and a position of said first lens group G1 at which it is farthest from said image surface during zooming is $\Delta_1$, and a focal length of the total system at the wide angle end is fw, the following condition is satisfied:

$$\Delta 1/fw < 0.1.$$

12. A zoom lens according to claim 11, wherein said third lens group G3 is moved to the image side and said fourth lens group G4 is moved to the object side during zooming from the wide angle end to the telephoto end.

13. A zoom lens according to claim 12, wherein a ratio between a movement amount of said third lens group G3 for zooming and that of said fourth lens group G4 is constant.

14. A zoom lens according to claim 13, wherein it is possible to effect focusing continuously from infinity to an object distance which is about double the focal length at the telephoto end in the infinity in-focus state at any focal length from the wide angle end to the telephoto end, by moving said first lens group G1.

* * * * *